United States Patent
DeBord et al.

(10) Patent No.: US 12,163,920 B2
(45) Date of Patent: *Dec. 10, 2024

(54) SYSTEMS AND METHODS FOR TWO-DIMENSIONAL MOBILITY BASED FILTERING OF IONS

(71) Applicant: MOBILion Systems, Inc., Chadds Ford, PA (US)

(72) Inventors: John Daniel DeBord, West Grove, PA (US); Liulin Deng, Chester Springs, PA (US); Sidney E. Buttrill, Jr., Palo Alto, CA (US)

(73) Assignee: MOBILion Systems, Inc., Chadds Ford, PA (US)

( * ) Notice: Subject to any disclaimer, the term of this patent is extended or adjusted under 35 U.S.C. 154(b) by 482 days.

This patent is subject to a terminal disclaimer.

(21) Appl. No.: 17/530,802

(22) Filed: Nov. 19, 2021

(65) Prior Publication Data

US 2022/0074891 A1    Mar. 10, 2022

Related U.S. Application Data

(63) Continuation-in-part of application No. 17/223,852, filed on Apr. 6, 2021, now Pat. No. 11,662,333.

(Continued)

(51) Int. Cl.
*G01N 27/623* (2021.01)
*H01J 49/02* (2006.01)
*H01J 49/06* (2006.01)

(52) U.S. Cl.
CPC .......... *G01N 27/623* (2021.01); *H01J 49/022* (2013.01); *H01J 49/025* (2013.01); *H01J 49/065* (2013.01)

(58) Field of Classification Search
CPC .... G01N 27/623; H01J 49/022; H01J 49/025; H01J 49/065
See application file for complete search history.

(56) References Cited

U.S. PATENT DOCUMENTS

| | | | |
|---|---|---|---|
| 4,855,595 | A | 8/1989 | Blanchard |
| 5,789,745 | A | 8/1998 | Martin et al. |

(Continued)

FOREIGN PATENT DOCUMENTS

| | | |
|---|---|---|
| EP | 1942340 A1 | 7/2008 |
| GB | 2457769 A | 9/2009 |

(Continued)

OTHER PUBLICATIONS

Brodeur et al., "Experimental Investigation of the Ion Surfing Transport Method," Int'l Journal of Mass Spec., vol. 336, pp. 53-60, Feb. 2013 (8 pages).

(Continued)

*Primary Examiner* — Nicole M Ippolito
*Assistant Examiner* — Hanway Chang
(74) *Attorney, Agent, or Firm* — McCarter & English, LLP

(57) ABSTRACT

A system for separating ions includes first and second surfaces extending along first and second perpendicular directions, an ion channel defined between the surfaces and configured to receive a stream of ions, first and second electrode arrays each including a plurality of electrodes extending in a third direction and respectively associated with the first and second surfaces, means for causing gas to flow across the ion channel in a fourth direction substantially opposite the first direction, and a controller configured to apply a DC voltage gradient to the electrode arrays. The electrode arrays are configured to generate an electric field based on the DC voltage gradient. The electric field and the (Continued)

flow of gas are configured to direct ions having mobilities in a first mobility range along a first path and ions having mobilities in a second mobility range along a second path.

30 Claims, 40 Drawing Sheets

Related U.S. Application Data

(60) Provisional application No. 63/005,568, filed on Apr. 6, 2020.

(56) References Cited

U.S. PATENT DOCUMENTS

| | | | |
|---|---|---|---|
| 6,107,628 | A | 8/2000 | Smith et al. |
| 6,791,078 | B2 | 9/2004 | Giles et al. |
| 6,794,641 | B2 | 9/2004 | Bateman et al. |
| 6,800,846 | B2 | 10/2004 | Bateman et al. |
| 6,812,453 | B2 | 11/2004 | Bateman et al. |
| 6,872,939 | B2 | 3/2005 | Bateman et al. |
| 6,884,995 | B2 | 4/2005 | Bateman et al. |
| 6,891,157 | B2 | 5/2005 | Bateman et al. |
| 6,914,241 | B2 | 7/2005 | Giles et al. |
| 7,064,321 | B2 | 6/2006 | Franzen |
| 7,071,467 | B2 | 7/2006 | Bateman |
| 7,095,013 | B2 | 8/2006 | Bateman et al. |
| 7,157,698 | B2 | 1/2007 | Makarov et al. |
| 7,205,538 | B2 | 4/2007 | Bateman et al. |
| 7,342,224 | B2 | 3/2008 | Makarov et al. |
| 7,405,401 | B2 | 7/2008 | Hoyes |
| 7,456,394 | B2 | 11/2008 | Cameron et al. |
| 7,459,693 | B2 | 12/2008 | Park et al. |
| 7,491,930 | B2 | 2/2009 | Shvartsburg et al. |
| 7,507,953 | B2 | 3/2009 | Makarov et al. |
| 7,514,676 | B1 | 4/2009 | Page et al. |
| 7,671,344 | B2 | 3/2010 | Tang et al. |
| 7,714,278 | B2 | 5/2010 | Boyle et al. |
| 7,781,728 | B2 | 8/2010 | Senko et al. |
| 7,829,841 | B2 | 11/2010 | Bateman et al. |
| 7,838,826 | B1 | 11/2010 | Park |
| 7,888,635 | B2 | 2/2011 | Belov et al. |
| 7,960,694 | B2 | 6/2011 | Hoyes |
| 8,288,717 | B2 | 10/2012 | Park |
| 8,299,443 | B1 | 10/2012 | Shvartsburg et al. |
| 8,319,177 | B2 | 11/2012 | Boyle et al. |
| 8,378,297 | B2 | 2/2013 | Vidal-De-Miguel |
| 8,384,024 | B2 | 2/2013 | Miller et al. |
| 8,389,933 | B2 | 3/2013 | Hoyes |
| 8,487,240 | B2 | 7/2013 | Koehl |
| 8,581,177 | B2 | 11/2013 | Kovtoun |
| 8,581,178 | B2 | 11/2013 | Miller et al. |
| 8,742,339 | B2 | 6/2014 | Hoyes |
| 8,809,769 | B2 | 8/2014 | Park |
| 8,829,464 | B2 | 9/2014 | Hoyes et al. |
| 8,835,839 | B1 | 9/2014 | Anderson et al. |
| 8,901,490 | B1 | 12/2014 | Chen et al. |
| 8,907,273 | B1 | 12/2014 | Chen et al. |
| 8,921,772 | B2 | 12/2014 | Verenchikov |
| 8,941,054 | B2 | 1/2015 | Park et al. |
| 8,941,055 | B2 | 1/2015 | Park et al. |
| 8,946,626 | B2 | 2/2015 | Giles et al. |
| 8,952,326 | B1 | 2/2015 | Ugarov |
| 8,969,800 | B1 | 3/2015 | Tolmachev et al. |
| 9,063,086 | B1 | 6/2015 | Garimella et al. |
| 9,123,516 | B2 | 9/2015 | Hasegawa et al. |
| 9,123,518 | B2 | 9/2015 | Giles et al. |
| 9,281,170 | B2 | 3/2016 | Park et al. |
| 9,281,172 | B2 | 3/2016 | Bateman et al. |
| 9,417,211 | B2 | 8/2016 | Verenchikov |
| 9,425,035 | B2 | 8/2016 | Giles et al. |
| 9,429,543 | B2 | 8/2016 | Jiang et al. |
| 9,455,132 | B2 | 9/2016 | Mordehai et al. |
| 9,683,964 | B2 | 6/2017 | Park et al. |
| 9,704,701 | B2 | 7/2017 | Ibrahim et al. |
| 9,741,552 | B2 | 8/2017 | Park et al. |
| 9,761,427 | B2 | 9/2017 | Wouters et al. |
| 9,799,503 | B2 | 10/2017 | Williams et al. |
| 9,812,311 | B2 | 11/2017 | Anderson et al. |
| 9,824,874 | B2 | 11/2017 | Brahim et al. |
| 9,865,442 | B2 | 1/2018 | Giles et al. |
| 9,880,129 | B2 | 1/2018 | Bateman |
| 9,887,074 | B2 | 2/2018 | Belov |
| 9,916,968 | B1 | 3/2018 | Kurulugama et al. |
| 9,939,408 | B2 | 4/2018 | Giles et al. |
| 9,939,409 | B2 | 4/2018 | Ibrahim et al. |
| 9,966,244 | B2 | 5/2018 | Anderson et al. |
| 10,018,592 | B2 | 7/2018 | Ibrahim et al. |
| 10,032,617 | B2 | 7/2018 | Welkie |
| 10,060,879 | B2 | 8/2018 | Silveira |
| 10,192,728 | B2 | 1/2019 | Zhang et al. |
| 10,224,194 | B2 | 3/2019 | Ibrahim et al. |
| 10,224,196 | B2 | 3/2019 | Giles et al. |
| 10,241,079 | B2 | 3/2019 | Betz et al. |
| 10,317,362 | B2 | 6/2019 | Harder et al. |
| 10,317,364 | B2 | 6/2019 | Garimella et al. |
| 10,319,575 | B2 | 6/2019 | Brown et al. |
| 10,332,723 | B1 | 6/2019 | Ibrahim et al. |
| 10,408,792 | B2 | 9/2019 | Betz et al. |
| 10,424,474 | B2 | 9/2019 | Ibrahim et al. |
| 10,446,381 | B2 | 10/2019 | Giles et al. |
| 10,460,920 | B1 | 10/2019 | Smith |
| 10,466,202 | B2 | 11/2019 | Ibrahim et al. |
| 10,473,620 | B2 | 11/2019 | Harder et al. |
| 10,497,552 | B2 | 12/2019 | Ibrahim et al. |
| 10,515,790 | B2 | 12/2019 | Cheng et al. |
| 10,522,337 | B2 | 12/2019 | Rizzo et al. |
| 10,665,443 | B2 | 5/2020 | Ibrahim et al. |
| 10,692,710 | B2 | 6/2020 | Prabhakaran et al. |
| 10,720,315 | B2 | 7/2020 | Taghioskoui |
| 10,741,375 | B2 | 8/2020 | Tamid et al. |
| 10,804,089 | B2 | 10/2020 | Ibrahim et al. |
| 10,811,244 | B2 | 10/2020 | Green et al. |
| 10,840,077 | B2 | 11/2020 | Taghioskoui |
| 10,861,687 | B2 | 12/2020 | Wildgoose et al. |
| 10,976,283 | B2 | 4/2021 | Ibrahim et al. |
| 11,209,393 | B2 | 12/2021 | Garimella et al. |
| 11,293,898 | B2 | 4/2022 | Prasad et al. |
| 11,322,340 | B2 | 5/2022 | Hamid et al. |
| 11,460,439 | B2 | 10/2022 | DeBord et al. |
| 11,543,384 | B2 | 1/2023 | DeBord et al. |
| 11,605,531 | B2 | 3/2023 | Ibrahim et al. |
| 11,662,333 | B2 | 5/2023 | DeBord et al. |
| 11,670,495 | B2 | 6/2023 | DeBord et al. |
| 2001/0038069 | A1 | 11/2001 | Whitehouse et al. |
| 2008/0308721 | A1 | 12/2008 | Senko et al. |
| 2014/0353496 | A1 | 12/2014 | Thomson |
| 2016/0071715 | A1 | 3/2016 | Anderson et al. |
| 2018/0236426 | A1 | 8/2018 | Finlay |
| 2019/0004011 | A1 | 1/2019 | Garimella et al. |
| 2019/0103261 | A1 | 4/2019 | Ibrahim et al. |
| 2019/0348268 | A1 | 11/2019 | Hamid et al. |
| 2019/0369049 | A1 | 12/2019 | Ridgeway |
| 2019/0369050 | A1 | 12/2019 | Garimella et al. |
| 2020/0035472 | A1 | 1/2020 | Richardson et al. |
| 2020/0161119 | A1 | 5/2020 | Richardson et al. |
| 2020/0200708 | A1 | 6/2020 | Ibrahim et al. |
| 2020/0227247 | A1 | 7/2020 | Boumsellek et al. |
| 2020/0278319 | A1 | 9/2020 | Melhirst et al. |
| 2020/0321190 | A1 | 10/2020 | Ibrahim et al. |
| 2020/0321208 | A1 | 10/2020 | Cooks et al. |
| 2020/0326304 | A1 | 10/2020 | Giles et al. |
| 2020/0373139 | A1 | 11/2020 | DeBord et al. |
| 2020/0378922 | A1 | 12/2020 | Ibrahim et al. |
| 2020/0381241 | A1 | 12/2020 | Park et al. |
| 2021/0080429 | A1 | 3/2021 | DeBord et al. |
| 2021/0156822 | A1 | 5/2021 | DeBord et al. |
| 2021/0310989 | A1 | 10/2021 | DeBord et al. |
| 2021/0364467 | A1 | 11/2021 | DeBord et al. |
| 2021/0382006 | A1 | 12/2021 | DeBord et al. |
| 2022/0128509 | A1 | 4/2022 | Giles et al. |
| 2022/0136999 | A1 | 5/2022 | Garimella et al. |
| 2022/0365027 | A1 | 11/2022 | Makarov |
| 2023/0008420 | A1 | 1/2023 | Krioutchkov et al. |

(56) References Cited

U.S. PATENT DOCUMENTS

| | | |
|---|---|---|
| 2023/0052193 A1 | 2/2023 | Krioutchkov et al. |
| 2023/0103674 A1 | 4/2023 | DeBord et al. |
| 2023/0187194 A1 | 6/2023 | Deng et al. |

FOREIGN PATENT DOCUMENTS

| | | |
|---|---|---|
| WO | 2020/201732 A1 | 10/2020 |
| WO | 2020/243194 A1 | 12/2020 |
| WO | 2021/207235 A1 | 10/2021 |
| WO | 2023/091594 A1 | 5/2023 |

OTHER PUBLICATIONS

Donohoe, et al., "A New Ion Mobility-Linear Ion Trap Instrument for Complex Mixture Analysis," Anal. Chem., vol. 86, Iss. 16, pp. 8121-8128, Aug. 19, 2014 (17 pages).

F. W. Schmidlin, "A New Nonlevitated Mode of Traveling Wave Toner Transport," IEEE, Copyright 1988 (5 pages).

G. Bollen, "'Ion Surfing' with Radiofrequency Carpets," Int'l Journal of Mass Spec., vol. 299, pp. 131-138, Jan. 2011 (8 pages).

Hamid et al., "Characterization of Traveling Wave Ion Mobility Separations in Structures for Lossless Ion Manipulations," Anal. Chem., 2015, 87, pp. 11301-11308, published Oct. 28, 2015 (8 pages).

Henderson et al., "ESI/Ion Trap/Ion Mobility/Time-of-Flight Mass Spectrometry for Rapid and Sensitive Analysis of Biomolecular Mixtures," Anal. Chem., vol. 71, Iss. 2, pp. 291-301, Jan. 15, 1999 (Abstract only—1 page).

Hoaglund-Hyzer et al., "Ion Trap/Ion Mobility/Quadrupole/Time-of-Flight Mass Spectrometry for Peptide Mixture Analysis," Anal. Chem., vol. 73, Iss. 2, pp. 177-184, Jan. 15, 2001 (Abstract only—1 page).

Ibrahim et al., "Development of a New Ion Mobility (Quadrupole) Time-of-Flight Mass Spectrometer," Int'l Journal of Mass Spectrometry, 377 (2015) 655-662, Jul. 28, 2014 (8 pages).

Jiang et al., "Ion Mobility—Mass Spectrometry," Encyclopedia of Anal. Chem., 2013, DOI: 10.1002/9780470027318.a9292 (21 pages).

Li et al., "Ion Mobility Spectrometry with High Ion Utilization Efficiency Using Traveling Wave-Based Structures for Lossless Ion Manipulations (SLIM)," poster presented at the Proceedings of the 68th ASMS Conference on Mass Spectrometry and Allied Topics, Online Meeting, Jun. 1-12, 2020 (1 page).

Li et al., "Ion Mobility Spectrometry with High Ion Utilization Efficiency Using Traveling Wave-Based Structures for Lossless Ion Manipulations," Anal. Chem., vol. 92, Iss. 22, pp. 14930-14938, Oct. 26, 2020 (9 pages).

Masuda et al., "Movement of Blood Cells in Liquid by Nonuniform Traveling Field," IEEE Transactions on Industry Applications, vol. 24, No. 2, pp. 217-222, Mar./Apr. 1988 (6 pages).

N. Agbonknkon, "Counter-flow Ion Mobility Analysis: Design, Instrumentation, and Characterization," Theses and Dissertations 1215, Nov. 14, 2007, https://scholarsarchive.byu.edu/etd/1215 (230 pages).

Wu et al., "Separation of Isomeric Peptides Using Electrospray Ionization/High-Resolution Ion Mobility Spectrometry," Anal. Chem., vol. 72, Iss. 2, pp. 391-395, Jan. 15, 2000 (Abstract only—1 page).

Zhang et al., "Ion Trapping, Storage, and Ejection in Structures for Lossless Ion Manipulations," Anal. Chem. 2015, 87, 6010-6016, May 14, 2015 (7 pages).

PCT International Search Report and Written Opinion dated Aug. 6, 2021, for Int'l Application No. PCT/US2021/026006 (17 pages).

PCT International Search Report and Written Opinion dated Mar. 14, 2023, for Int'l Application No. PCT/US2022/050293 (8 pages).

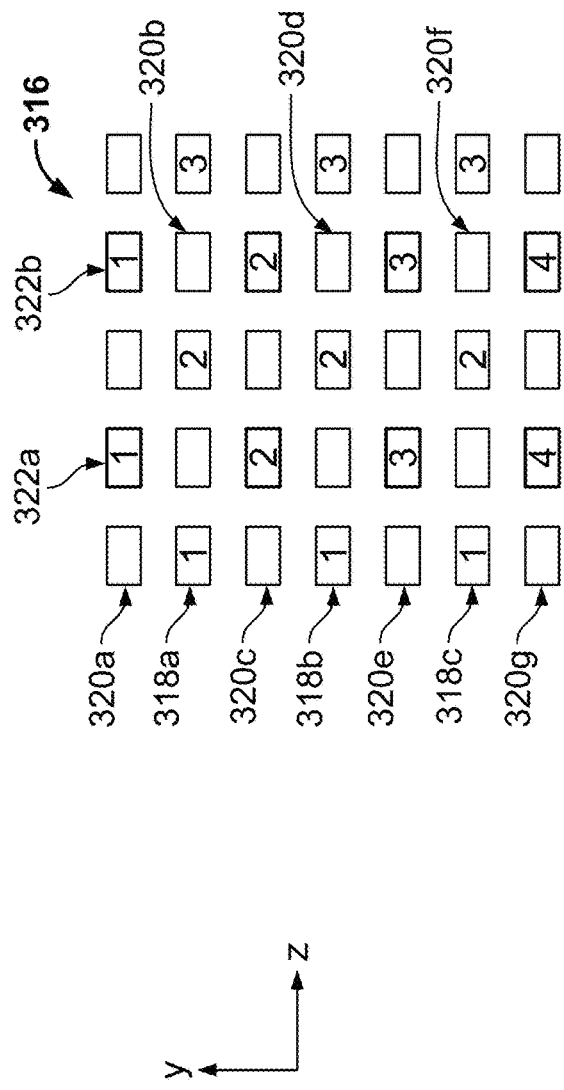
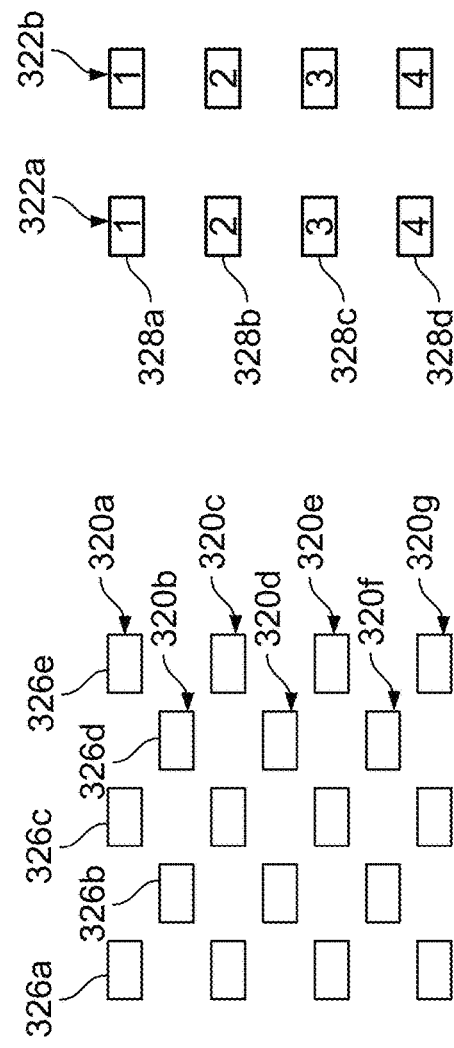
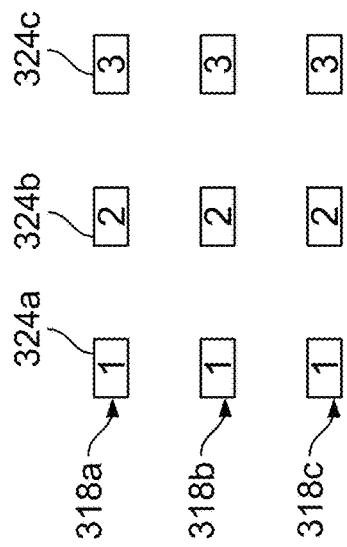
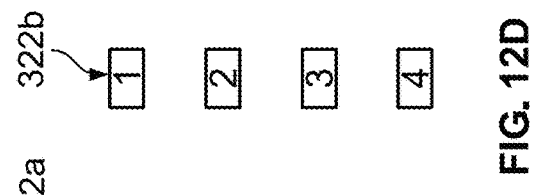
FIG. 12A
FIG. 12B
FIG. 12C
FIG. 12D

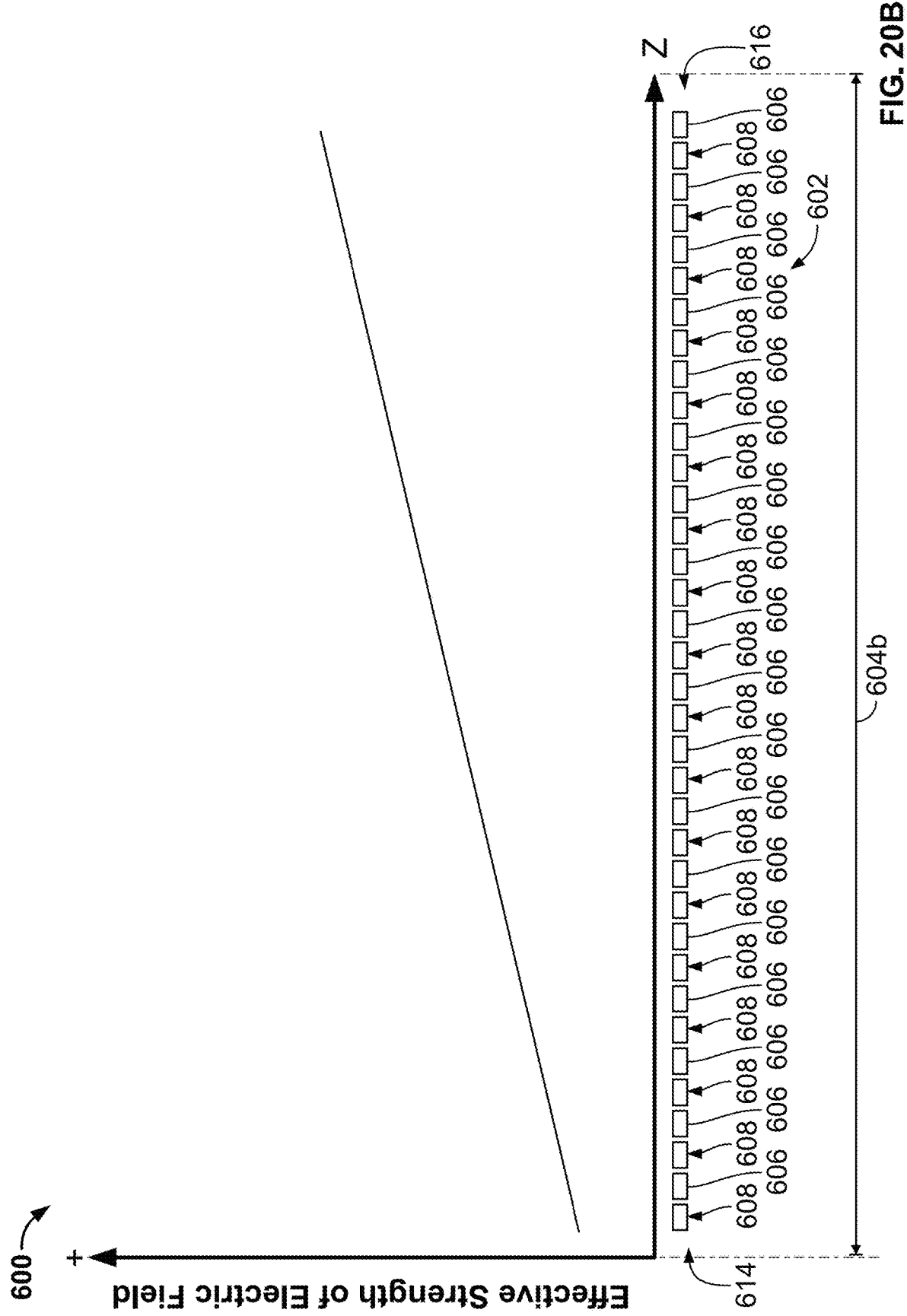

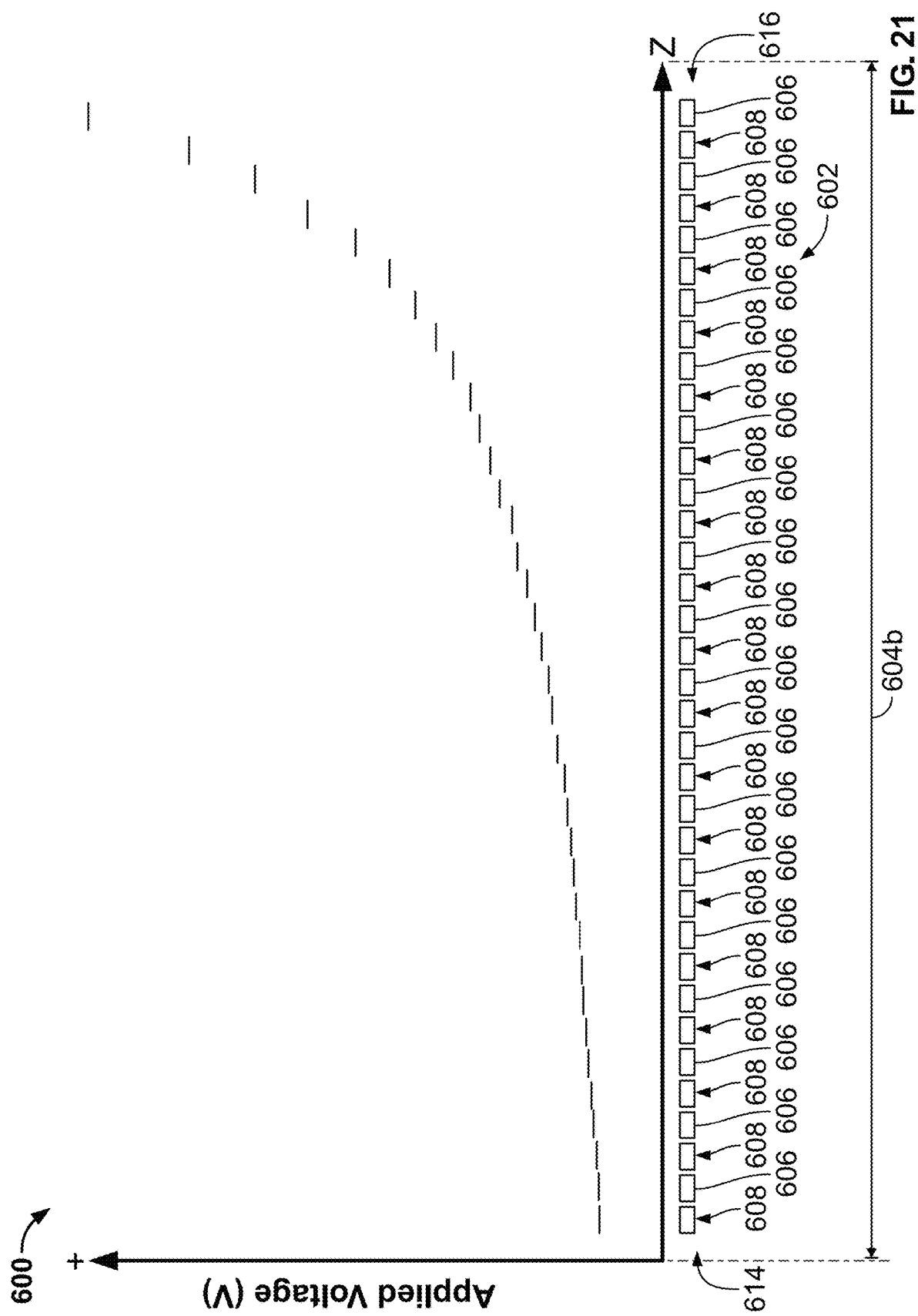

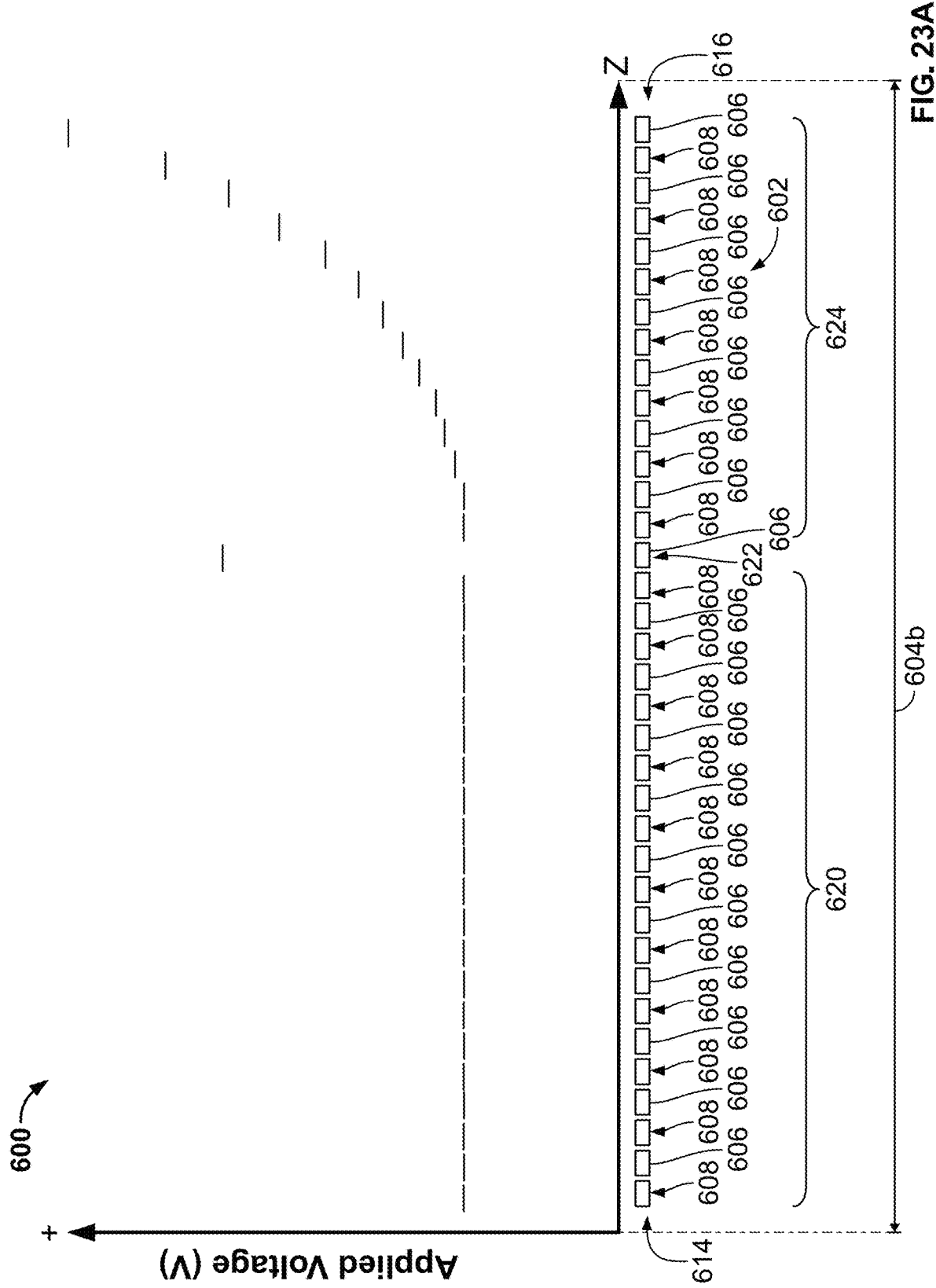

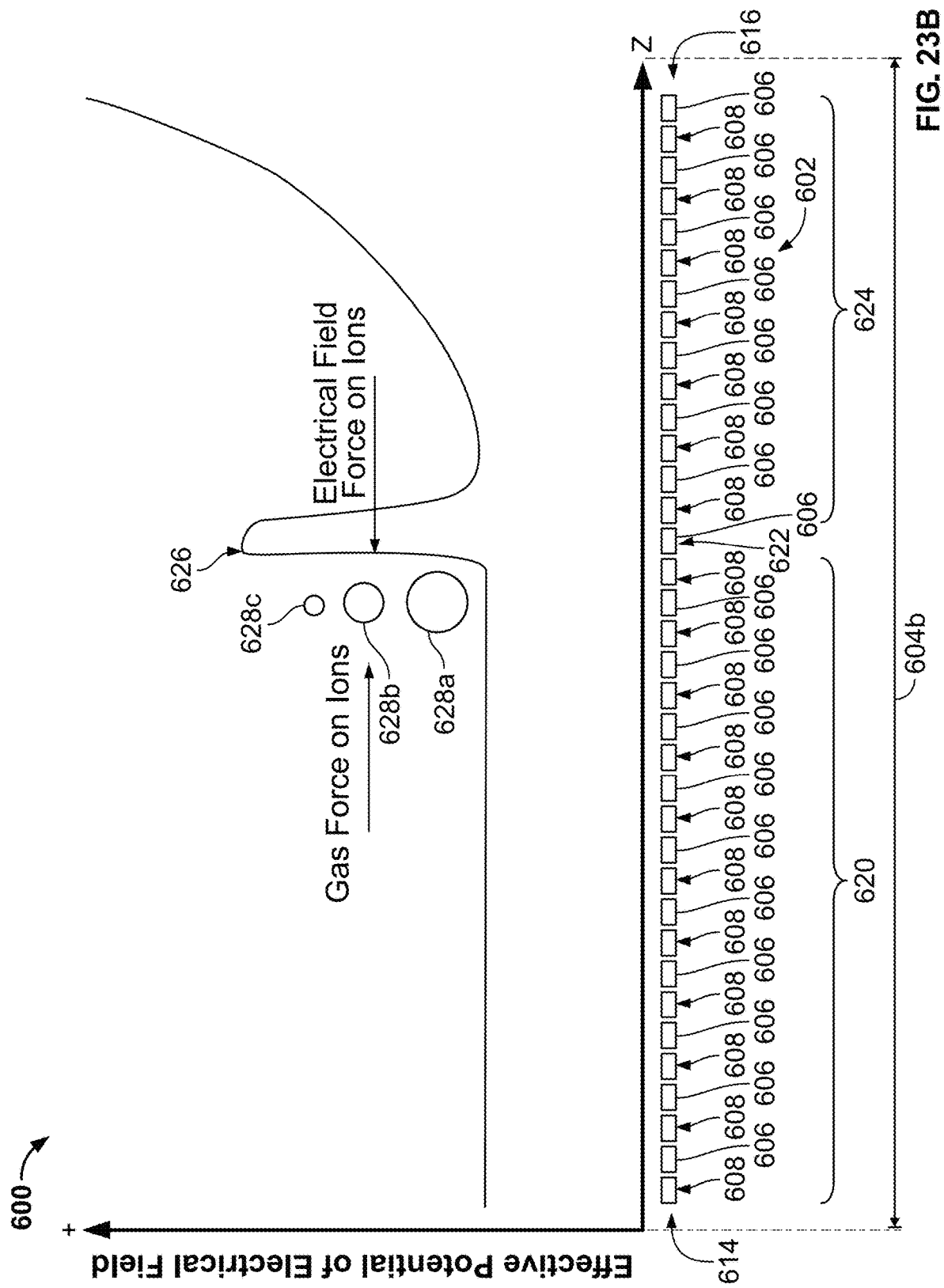

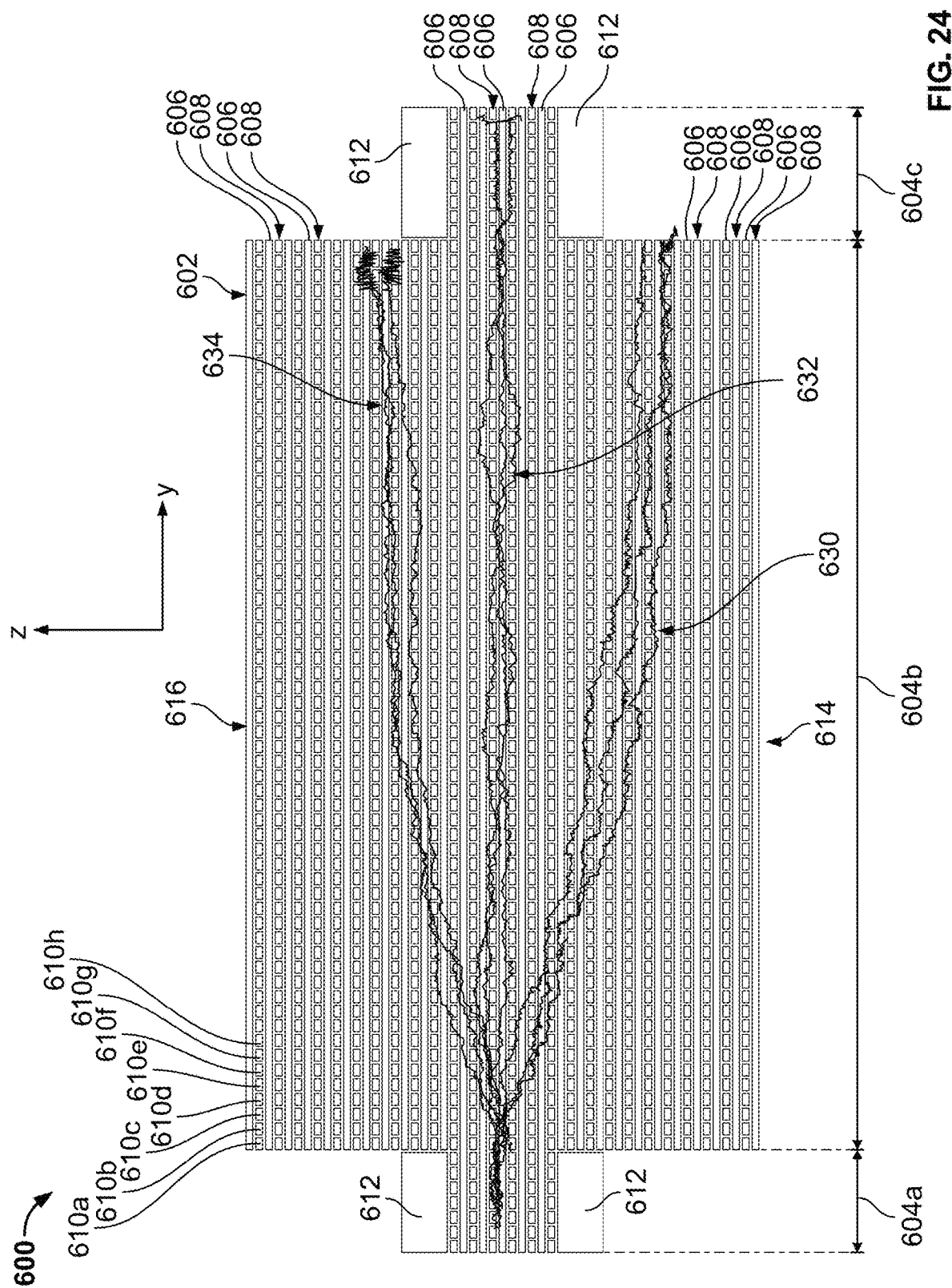

SYSTEMS AND METHODS FOR TWO-DIMENSIONAL MOBILITY BASED FILTERING OF IONS

CROSS-REFERENCE TO RELATED APPLICATIONS

The present application is a continuation-in-part of U.S. patent application Ser. No. 17/223,852, filed Apr. 6, 2021, which claims the benefit of priority to U.S. Provisional Patent Application No. 63/005,568, filed on Apr. 6, 2020, both of which are herein incorporated by reference in their entirety.

TECHNICAL FIELD

The present disclosure relates generally to the fields of ion mobility spectrometry (IMS) and mass spectrometry (MS). More specifically, the present disclosure relates to systems and methods for separating and/or filtering ions based on two-dimensional ion mobility separations.

BACKGROUND

IMS is a technique for separating and identifying ions in gaseous phase based on their mobilities. For example, IMS can be employed to separate structural isomers and macromolecules that have different mobilities. IMS relies on applying a constant or a time-varying electric field to a mixture of ions within a static or dynamic background gas. An ion having a larger mobility (or smaller collision cross section [CCS]) moves faster under the influence of the electric field compared to an ion with a smaller mobility (or larger CCS). By applying the electric field over a separation distance (e.g., in a drift tube) of an IMS device, ions from an ion mixture can be temporally or spatially separated based on their mobility. Because ions with different mobilities arrive at the end of the drift tube at different times (temporal separation) they can be identified based on the time of detection by a detector at the end of the drift tube. Resolution of the mobility separation can be varied by changing the separation distance.

MS is an analytical technique that can separate a mixture of chemical species based on their mass-to-charge ratio. MS involves ionizing the mixture of chemical species followed by acceleration of the ion mixture in the presence of electric and/or magnetic fields. In some mass spectrometers, ions having the same mass-to-charge ratio undergo the same deflection or time dependent response. Ions with different mass-to-charge ratios can undergo different deflections or time dependent response, and can be identified based on the spatial or temporal position of detection by a detector (e.g., electron multiplier).

Additionally, some prior art systems form a packet of ions, separate the ions of the packet according to their mobility, and deliver the separated ions to, for example, a mass spectrometer. The foregoing separation can occur one packet at a time. As such, the ions detected by the mass spectrometer are all from the same packet of ions, and, thus, represent only the ions produced during the time period in which ions were accumulated and the packet was formed. Accordingly, ions produced during other time periods, e.g., in which ions were not being accumulated, are lost during the analysis.

Accordingly, there is a need for additional systems and methods for filtering ions based on mobility, and transmitting ions within a narrow mobility range.

SUMMARY

The present disclosure relates to systems and methods for filtering ions based on two-dimensional mobility.

In accordance with embodiments of the present disclosure, exemplary systems for filtering ions are provided. A system for filtering ions includes a first ion channel and a controller. The first ion channel is defined between a first surface and a second surface, and extends along a first longitudinal direction and a first lateral direction. The first ion channel is configured to receive a stream of ions. The first surface includes a first plurality of electrodes arranged along the first longitudinal direction. The controller is configured to apply a first voltage signal to the first plurality of electrodes, which are configured to generate, based on the first voltage signal, a first traveling drive potential that travels along the first longitudinal direction and is configured to guide ions across the first ion channel. The controller is also configured to apply a second voltage signal along the first lateral direction. A first portion of the stream of ions having ions with mobilities in a first mobility range are directed along a first direction, and a second portion of the stream of ions having ions with mobilities in a second mobility range are directed along a second direction.

In some aspects, the first surface can include a second plurality of electrodes comprising a first electrode and a second electrode spaced apart from the first electrode along the first lateral direction, and the first plurality of electrodes can be located between the first electrode and the second electrode. In such aspects, the second voltage signal can be applied to the first electrode, the second electrode, and at least a third electrode of the first plurality of electrodes, such that the first electrode, the second electrode, and the third electrode are configured to generate, based on the second voltage signal, a first DC potential decreasing along the first lateral direction. Additionally, the second plurality of electrodes can include a third electrode spaced from the first electrode along the longitudinal direction, and a fourth electrode spaced from the second electrode along the longitudinal direction.

In other aspects, the system can include a barrier having a first aperture configured to allow passage of the first portion of the stream of ions through the barrier, which can be configured to block the second portion of the stream of ions. In such aspects, the system can include a second ion channel defined between a third surface and a fourth surface and extending along a second longitudinal direction and a second lateral direction. The second ion channel can be configured to receive the first portion of the stream of ions, and the third surface can include a third plurality of electrodes arranged along the second longitudinal direction. Additionally, the controller can be configured to apply a third voltage signal to the third plurality of electrodes, which can be configured to generate, based on the third voltage signal, a second traveling drive potential that travels along the second longitudinal direction and is configured to guide ions across the second ion channel. The controller can also be configured to apply a fourth voltage signal along the second lateral direction. A third portion of the first portion of the stream of ions having ions with mobilities in a third mobility range can be directed along a third direction, and a fourth portion of the first portion of the stream of ions having ions with mobilities in a fourth mobility range can be directed along a fourth direction.

Furthermore, the third surface can include a fourth plurality of electrodes having a fourth electrode and a fifth electrode spaced apart from the fourth electrode along the second lateral direction, such that the third plurality of electrodes are located between the fourth electrode and the fifth electrode. Still further, the fourth voltage signal can be applied to the fourth electrode, the fifth electrode, and at least a sixth electrode of the third plurality of electrodes, such that the fourth electrode, the fifth electrode, and the sixth electrode can generate, based on the fourth voltage signal, a second DC potential decreasing along the second lateral direction.

Additionally, the system can include an ion transfer channel extending between a first end and a second end. The ion transfer channel can be configured to receive the first portion of the stream of ions from the first ion channel via the first aperture at the first end, and transfer the first portion of the stream of ions to the second ion channel at the second end. In such aspects, a first potential associated with the first portion of the stream of ions at the first end can be lower than a second potential associated with the first portion of the stream of ions. The received stream of ions can travel along the first longitudinal direction, and/or along the first lateral direction.

In some aspects, the system can include an ion manipulation device and a DC trap. The ion manipulation device can be configured to receive the first portion of the stream of ions from the first ion channel and transfer the first portion of the stream of ions, and the DC trap can be configured to attract and eliminate the second portion of the stream of ions.

In some aspects, the controller can be configured to apply a third voltage signal along a second lateral direction opposite the first lateral direction, and the first direction can be the same as the second direction. In such aspects, the first surface can include a second plurality of electrodes having a first electrode and a second electrode spaced apart from the first electrode along the first lateral direction, and the first plurality of electrodes can be located between the first electrode and the second electrode. The first surface can also include a third plurality of electrodes arranged along the first longitudinal direction and configured to receive the first voltage signal and generate, based on the first voltage signal, the first traveling drive potential that travels along the first longitudinal direction and is configured to guide ions across the first ion channel. The first surface can also include a fourth plurality of electrodes having a third electrode and a fourth electrode spaced apart from the third electrode along the first lateral direction, and the third plurality of electrodes can be located between the third electrode and the fourth electrode. In such aspects, the third voltage signal can be applied by the controller to the third electrode, the fourth electrode, and at least a fifth electrode of the third plurality of electrodes, which can be configured to generate, based on the third voltage signal, a second DC potential decreasing along a second lateral direction opposite the first lateral direction, and the first direction can be the same as the second direction.

In other aspects, the system can include a gas diffuser configured to discharge gas into the first ion channel and cause the gas to flow across the first ion channel in a second longitudinal direction opposite the first longitudinal direction. In those aspects, the system can include a gas valve in electrical communication with the controller and in fluidic communication with a gas source and an inlet of the gas diffuser. The gas valve can be adjustable to regulate the flow rate and pressure of gas being provided to the inlet of the gas diffuser, and the controller can operate the valve to regulate the flow of gas to the gas diffuser. The diffuser can also provide a laminar flow of gas to the first ion channel.

Moreover, the system can also include one or more pressure sensors that can sense the pressure within the first ion channel. The controller can be configured to receive a pressure measurement from the one or more pressure sensors and regulate the flow of gas to the gas diffuser based on the pressure measurement.

In other aspects, the first plurality of electrodes can include a first group of electrodes and a second group of electrodes. In these aspects, the controller can be configured to apply the first voltage signal to the first group of electrodes and a third voltage signal to the second group of electrodes, and the second group of electrodes configured to generate, based on the third voltage signal, a second traveling drive potential that travels along a second longitudinal direction opposite the first longitudinal direction and guides ions across the first ion channel. In such aspects, the first direction can be the same as the second direction. Additionally, the system can include a gas diffuser configured to discharge gas into the first ion channel and cause the gas to flow across the first ion channel in the second longitudinal direction.

A method of filtering ions involves introducing a stream of ions into a first ion channel of an ion filtering device. The first ion channel is defined between a first surface and a second surface, and extends along a first longitudinal direction and a first lateral direction. The first surface includes a first plurality of electrodes arranged along the first longitudinal direction. The method further includes applying, by a controller, a first voltage signal to the first plurality of electrodes, and generating, by the first plurality of electrodes, a first traveling drive potential that travels along the first longitudinal direction based on the first voltage signal and is configured to guide the stream of ions across the first ion channel. The method also includes applying, by the controller, a second voltage signal along the first lateral direction. The method also includes directing a first portion of the stream of ions having ions with mobilities in a first mobility range along a first direction based on the first traveling drive potential and the second voltage signal, and directing a second portion of the stream of ions having ions with mobilities in a second mobility range along a second direction, based on the first traveling drive potential and the second voltage signal. The method further includes filtering the first portion of the stream of ions from the second portion of the stream of ions.

In one aspect, the first surface can include a second plurality of electrodes having a first electrode and a second electrode spaced apart from the first electrode along the first lateral direction, and the first plurality of electrodes can be located between the first electrode and the second electrode. In such an aspect, the second plurality of electrodes can include a third electrode spaced from the first electrode along the longitudinal direction, and a fourth electrode spaced from the second electrode along the longitudinal direction. The second voltage signal can be applied to the first electrode, the second electrode, and at least a third electrode of the first plurality of electrodes. The method can further include generating, by the first electrode, the second electrode, and the third electrode, a first DC potential decreasing along the first lateral direction based on the second voltage signal.

In yet another aspect, the filtering step can involve passing the first portion of the stream of ions through an aperture in a barrier, blocking the second portion of the stream of ions with the barrier. In such aspects, the method can also involve receiving the first portion of the stream of ions in a second ion channel defined between a third surface and a fourth surface. The second ion channel can extend along a second longitudinal direction and a second lateral direction, and the third surface can include a third plurality of electrodes arranged along the second longitudinal direction. The method can also include applying, by the controller, a third voltage signal to the third plurality of electrodes, and generating, by the third plurality of electrodes, a second traveling drive potential that travels along the second longitudinal direction based on the third voltage signal and is configured to guide the first portion of the stream of ions across the second ion channel. The method can also include applying, by the controller, a fourth voltage signal along the second lateral direction, directing a third portion of the first portion of the stream of ions having ions with mobilities in a third mobility range along a third direction based on the second traveling drive potential and the fourth voltage signal, and directing a fourth portion of the first portion of the stream of ions having ions with mobilities in a fourth mobility range along a fourth direction based on the second traveling drive potential and the fourth voltage signal. In such methods, the third surface can include a fourth plurality of electrodes having a fourth electrode and a fifth electrode spaced apart from the fourth electrode along the second lateral direction, and the third plurality of electrodes can be located between the fourth electrode and the fifth electrode. The fourth voltage signal can be applied to the fourth electrode, the fifth electrode, and at least a sixth electrode of the third plurality of electrodes, and the method can include generating, by the fourth electrode, the fifth electrode, and the sixth electrode, a second DC potential decreasing along the second lateral direction based on the fourth voltage signal.

In one aspect, the method further includes receiving the first portion of the stream of ions from the first ion channel via the first aperture at a first end of an ion transfer channel extending between the first end and a second end, and transferring the first portion of the stream of ions to the second ion channel at the second end. A first potential associated with the first portion of the stream of ions at the first end can be lower than a second potential associated with the first portion of the stream of ions, and the received stream of ions can travel along the first longitudinal direction and/or the first lateral direction.

In some aspects, the filtering step of the method can involve receiving, by an ion manipulation device, the first portion of the stream of ions from the first ion channel, transferring, by the ion manipulation device, the first portion of the stream of ions, and attracting and eliminating the second portion of the stream of ions with a DC trap.

A system for filtering ions includes a first ion channel and a controller. The first ion channel is defined between a first surface and a second surface, extends along a first longitudinal direction and a first lateral direction, and is configured to receive a stream of ions. The first surface includes a first plurality of electrodes arranged along the first lateral direction, a second plurality of electrodes arranged along the first lateral direction, a third plurality of electrodes arranged along the first lateral direction and spaced apart from the second plurality of electrodes along the first longitudinal direction, and a fourth plurality of electrodes arranged along the first longitudinal direction. The first plurality of electrodes are arranged at least partially between the second plurality of electrodes and the third plurality of electrodes, and between individual electrodes of the second plurality of electrodes. The controller is configured to apply a first voltage signal to the first plurality of electrodes, apply a second voltage signal to the second plurality of electrodes, and apply a third voltage signal to the fourth plurality of electrodes. The first plurality of electrodes are configured to generate, based on the first voltage signal, a first traveling drive potential that travels along the first lateral direction and is configured to guide ions across the first ion channel. The second plurality of electrodes are configured to generate, based on the second voltage signal, at least a portion of a pseudopotential that inhibits ions in the first ion channel from approaching the first surface. The fourth plurality of electrodes are configured to generate, based on the third voltage signal, a second traveling drive potential that travels along the first longitudinal direction and is configured to guide ions across the first ion channel.

In some aspects, the controller can be configured to apply a fourth voltage signal to the third plurality of electrodes, and the third plurality of electrodes can be configured to generate, based on the fourth voltage signal, at least a second portion of the pseudo potential. In such aspects, the second voltage signal can be a first radio frequency (RF) voltage signal and the fourth voltage signal is a second RF voltage signal, and a phase difference between the first RF voltage signal and the second RF voltage signal can have a value in the range of about 0° to 180°.

In some aspects, the system can include a barrier having a first aperture. The first aperture can be configured to allow passage of the first portion of the stream of ions through the barrier, and the barrier can be configured to block the second portion of the stream of ions. In some other aspects, the system can include an ion manipulation device and a DC trap. The ion manipulation device can be configured to receive the first portion of the stream of ions from the first ion channel and transfer the first portion of the stream of ions, and the DC trap can be configured to attract and eliminate the second portion of the stream of ions.

In some aspects, the second plurality of electrodes can include a first electrode and a second electrode spaced apart from the first electrode along the first longitudinal direction. The third plurality of electrodes can include a third electrode spaced apart from the first electrode along the first lateral direction, and a fourth electrode spaced apart from the second electrode along the first lateral direction and spaced apart from the third electrode along the first longitudinal direction. The fourth plurality of electrodes can include a fifth electrode and a sixth electrode, such that the sixth electrode is spaced apart from the fifth electrode along the first longitudinal direction, the fifth electrode is arranged between the first electrode and the third electrode, the sixth electrode is arranged between the second electrode and the fourth electrode. In such aspects, the first plurality of electrodes can be arranged between the fifth electrode and the sixth electrode.

A system for filtering ions includes a first ion channel, a gas diffuser, and a controller. The first ion channel is defined between a first surface and a second surface, and extends along a first longitudinal direction and a first lateral direction. The first ion channel is configured to receive a stream of ions. The first surface includes a first plurality of electrodes arranged along the first longitudinal direction. The gas diffuser is configured to discharge gas into the first ion channel and cause the gas to flow across the first ion channel in the first lateral direction. The controller is configured to apply a first voltage signal to the first plurality of electrodes, and regulate the flow of gas to the gas diffuser. The first plurality of electrodes are configured to generate, based on the first voltage signal, a first traveling drive potential that travels along the first longitudinal direction and is configured to guide ions across the first ion channel. A first portion of the stream of ions having ions with mobilities in a first mobility range is directed along a first direction, and a second portion of the stream of ions having ions with mobilities in a second mobility range is directed along a second direction.

In some aspects, the first surface can include a second plurality of electrodes having a first electrode and a second electrode spaced apart from the first electrode along the first lateral direction. The first plurality of electrodes can be located between the first electrode and the second electrode. In such aspects, the second plurality of electrodes can include a third electrode spaced from the first electrode along the longitudinal direction, and a fourth electrode spaced from the second electrode along the longitudinal direction.

In some aspects, the system can include a barrier having a first aperture. The first aperture can be configured to allow passage of the first portion of the stream of ions through the barrier, and the barrier can be configured to block the second portion of the stream of ions. In yet other aspects, the system can include a gas valve in electrical communication with the controller and in fluidic communication with a gas source and an inlet of the gas diffuser. The gas valve can be adjustable to regulate the flow rate and pressure of gas being provided to the inlet of the gas diffuser. The controller can operate the valve to regulate the flow of gas to the gas diffuser.

In some other aspects, the diffuser provides a laminar flow of gas to the first ion channel. In yet other aspects, the system can include one or more pressure sensors that sense the pressure within the first ion channel. In such aspects, the controller can be configured to receive a pressure measurement from the one or more pressure sensors and regulate the flow of gas to the gas diffuser based on the pressure measurement.

In still further aspects, the system can include an ion manipulation device and a DC trap. The ion manipulation device can be configured to receive the first portion of the stream of ions from the first ion channel and transfer the first portion of the stream of ions, and the DC trap can be configured to attract and eliminate the second portion of the stream of ions.

In other aspects, the controller can be further configured to apply a second voltage signal along the first lateral direction, and a first DC potential increasing along the first lateral direction can be generated based on the second voltage signal. The first portion of the stream of ions having ions with mobilities in a first mobility range can be directed along the first direction based on the flow of gas and the first DC potential, and a second portion of the stream of ions having ions with mobilities in a second mobility range can be directed along a second direction based on the flow of gas and the first DC potential.

In some other aspects, the first surface can include a second plurality of electrodes having a first electrode and a second electrode spaced apart from the first electrode along the first lateral direction, and the first plurality of electrodes can be located between the first electrode and the second electrode. In such aspects, a second voltage signal can be applied by the controller to the first electrode, the second electrode, and at least a third electrode of the first plurality of electrodes, which can be configured to generate, based on the second voltage signal, a first DC potential increasing along the first lateral direction.

In still other aspects, the controller can be configured to apply a second voltage signal along the first lateral direction and a third voltage signal along a second lateral direction that is opposite to the first lateral direction, and the first direction can be the same as the second direction.

In additional aspects, the first surface can include a second plurality of electrodes having a first electrode and a second electrode spaced apart from the first electrode along the first lateral direction, with the first plurality of electrodes located between the first electrode and the second electrode. A second voltage signal can be applied by the controller to the first electrode, the second electrode, and at least a third electrode of the first plurality of electrodes, which can be configured to generate, based on the second voltage signal, a first DC potential decreasing along the first lateral direction. In such aspects, the first surface can include a third plurality of electrodes arranged along the first longitudinal direction and configured to receive the first voltage signal and generate, based on the first voltage signal, the first traveling drive potential that travels along the first longitudinal direction and is configured to guide ions across the first ion channel. Additionally, the first surface can include a fourth plurality of electrodes having a third electrode and a fourth electrode spaced apart from the third electrode along the first lateral direction, with the third plurality of electrodes located between the third electrode and the fourth electrode.

In still further aspects, a third voltage signal can be applied by the controller to the third electrode, the fourth electrode, and at least a fifth electrode of the third plurality of electrodes, which can be configured to generate, based on the third voltage signal, a second DC potential decreasing along a second lateral direction opposite the first lateral direction, and the first direction can be the same as the second direction.

A system for filtering ions includes an ion channel, a gas diffuser, and a controller. The ion channel is defined between a first surface and a second surface, extends along a first longitudinal direction and a first lateral direction, and is configured to receive a stream of ions. The first surface includes an array of electrodes including at least a first plurality of electrodes spaced along the first longitudinal direction. The gas diffuser is configured to discharge gas into the ion channel and cause the gas to flow across the ion channel in the first lateral direction. The controller is configured to apply a first voltage signal to the first plurality of electrodes, which are configured to generate, based on the first voltage signal, a first traveling drive potential that travels along the first longitudinal direction and is configured to guide the stream of ions across the first ion channel. The controller is also configured to apply a voltage gradient to the array of electrodes that increases along the first lateral direction and causes the array of electrodes to generate an electrical potential that increases along the first lateral direction, or apply a voltage gradient to the array of electrodes that decreases along the first lateral direction and causes the array of electrodes to generate an electrical potential that decreases along the first lateral direction. A first portion of the stream of ions having ions with mobilities in a first mobility range is directed along a first path based on the flow of gas across the ion channel and the electrical potential, and a second portion of the stream of ions having ions with mobilities in a second mobility range is directed along a second path based on the flow of gas across the ion channel and the electrical potential.

In some aspects, the controller can be configured to regulate a flow of gas to the gas diffuser.

In some aspects, the voltage gradient can be non-linear. In such aspects, the array of electrodes can include a plurality of rows of electrodes spaced along the first lateral direction, and the controller can be configured to apply the non-linear voltage gradient to alternating rows of the plurality of rows of electrodes, and, in other aspects, can also be configured to apply a second voltage signal to the plurality of rows of electrodes opposite the alternating rows.

In other aspects, the array of electrodes can include a second plurality of electrodes including a first electrode and a second electrode spaced apart from the first electrode along the first lateral direction. The first plurality of electrodes can be located between the first electrode and the second electrode, and the controller can be configured to apply the voltage gradient to the first plurality of electrodes and the second plurality of electrodes.

In still other aspects, the system can include an outlet section with which the first path is aligned. The outlet section can be configured to receive the first portion of the stream of ions directed along the first path and extract or transfer the first portion of the stream of ions. In some such aspects, the outlet section can include guard electrodes positioned on lateral sides of the outlet section, and which can include an angled front end.

In some aspects, the system can include a gas valve that is in electrical communication with the controller, and in fluidic communication with a gas source and an inlet of the gas diffuser. The gas valve can be adjustable to regulate the flow rate and pressure of gas provided to the inlet of the gas diffuser, and the controller can adjust the gas valve to regulate the flow of gas to the gas diffuser.

In other aspects, the diffuser can provide a laminar (e.g., non-turbulent) flow of gas to the ion channel.

In still other aspects, the system can include one or more pressure sensors configured to sense the pressure within the ion channel. In such aspects, the controller can be configured to receive a pressure measurement from the one or more pressure sensors and regulate the flow of gas to the gas diffuser based on the pressure measurement.

In some aspects, the controller can be configured to apply a blocking DC voltage signal to at least one electrode of the first plurality of electrodes and cause the at least one electrode to generate a blocking DC potential. The blocking DC potential can prevent ions from moving in the first lateral direction beyond the blocking DC potential.

A method of filtering ions includes introducing a stream of ions into an ion channel of an ion filtering device, which is defined between a first surface and a second surface and extends along a first longitudinal direction and a first lateral direction. The first surface includes an array of electrodes having at least a first plurality of electrodes spaced along the first longitudinal direction. The method also involves applying a first voltage signal to the first plurality of electrodes and generating, by the first plurality of electrodes, a first traveling drive potential that travels along the first longitudinal direction based on the first voltage signal. The first traveling drive potential is configured to guide the stream of ions across the ion channel. The method also involves applying a voltage gradient to the array of electrodes that increases or decreases along the first lateral direction, and generating, by the array of electrodes, an electrical potential that increases or decreases along the first lateral direction. The method further includes discharging gas from a gas diffuser into the ion channel to cause the gas to flow across the ion channel in the first lateral direction. The method also includes directing a first portion of the stream of ions having ions with mobilities in a first mobility range along a first path based on the flow of gas across the ion channel and the electrical potential, and directing a second portion of the stream of ions having ions with mobilities in a second mobility range along a second path based on the flow of gas across the ion channel and the electrical potential.

In some aspects, the method can include regulating a flow of gas to the gas diffuser.

In some aspects, the voltage gradient can be non-linear. In such aspects, the array of electrodes can include a plurality of rows of electrodes spaced along the first lateral direction, and the step of applying the voltage gradient to the array of electrodes can include applying the non-linear voltage gradient to alternating rows of the plurality of rows of electrodes, and, in other aspects, can also include the step of applying a second voltage signal to the plurality of rows of electrodes opposite the alternating rows.

In other aspects, the array of electrodes can include a second plurality of electrodes including a first electrode and a second electrode spaced apart from the first electrode along the first lateral direction. The first plurality of electrodes can be located between the first electrode and the second electrode, and the voltage gradient can be applied to the first plurality of electrodes and the second plurality of electrodes.

In still other aspects, the ion filtering device can include an outlet section with which the first path is aligned. The outlet section can be configured to receive the first portion of the stream of ions directed along the first path and extract or transfer the first portion of the stream of ions. In some such aspects, the outlet section can include guard electrodes positioned on lateral sides of the outlet section, and which can include an angled front end.

In some aspects, a gas valve can be in fluidic communication with a gas source and an inlet of the gas diffuser. The gas valve can be adjustable to regulate the flow rate and pressure of gas provided to the inlet of the gas diffuser. In such aspects, the method can include adjusting the gas valve to regulate the flow of gas to the gas diffuser.

In other aspects, the diffuser can provide a laminar flow of gas to the ion channel.

In still other aspects, the method can involve receiving a measurement of the pressure within the ion channel from one or more pressure sensors, and regulating the flow of gas to the gas diffuser or conductance of the vacuum pumping port based on the pressure measurement.

In some aspects, the method can involve applying a blocking DC voltage signal to at least one electrode of the first plurality of electrodes, generating a blocking DC potential with the at least one electrode, and preventing ions from moving in the first lateral direction beyond the blocking DC potential.

A system for filtering ions includes a first surface, a second surface, an ion channel defined between the first surface and the second surface, a first array of electrodes, a second array of electrodes, and a controller. The first and second surfaces extend along a first direction and a second direction perpendicular to the first direction. The ion channel is configured to receive a stream of ions. The first array of electrodes is associated with the first surface while the second array of electrodes is associated with the second surface. Each of the first and second arrays of electrodes include a first plurality of electrodes arranged along the first direction and a second plurality of electrodes arranged along the second direction. The controller is configured to apply a first voltage signal to the first plurality of electrodes and apply a second voltage signal to the first array of electrodes and the second array of electrode. The first plurality of electrodes are configured to generate, based on the first voltage signal, a drive potential that travels along the first direction, while the first and second arrays of electrodes are configured to generate an electric potential based on the second voltage signal. The drive potential and the electric potential are configured to direct a first portion of the stream of ions having ions with mobilities in a first mobility range along a first path and a second portion of the stream of ions having ions with mobilities in a second mobility range along a second path.

In some aspects, only ions of the first mobility range that are directed along the first path can be permitted to exit the system.

In other aspects, the second plurality of electrodes can include a first electrode and a second electrode spaced apart from the first electrode along the second direction. The first plurality of electrodes can be located between the first electrode and the second electrode. In such aspects, the second voltage signal can be applied to the first electrode, the second electrode, and at least a third electrode of the first plurality of electrodes, which can be configured to generate, based on the second voltage signal, the electric potential. Additionally, the electric potential can be a DC potential gradient that either decreases along the second direction or increases along the second direction.

In still other aspects, the second voltage signal can be a DC voltage gradient and the electric potential can be a DC potential gradient that decreases along the second direction or increases along the second direction. In such aspects, the first voltage signal can be a traveling wave voltage signal and the drive potential can be a traveling drive potential that travels along the first direction.

In other aspects, the system can include a barrier having an aperture. The aperture can be configured to allow passage of the first portion of the stream of ions through the barrier while the barrier can be configured to block the second portion of the stream of ions.

In some other aspects, the controller can be configured to apply a third voltage signal to the first array of electrodes and the second array of electrodes along a third direction that is opposite the second direction. In such aspects, the first path can be substantially the same as the second path. Additionally, in such aspects the second voltage signal can be a first DC voltage gradient that decreases along the second direction and the third voltage signal can be a second DC voltage gradient that decreases along the third direction.

In other aspects, each of the first and second arrays of electrodes can include a third plurality of electrodes arranged along the first direction, the first voltage signal can be a first traveling wave voltage signal, and the drive potential can be a traveling drive potential that travels along the first direction. In such aspects, the controller can be configured to apply a third voltage signal to the third plurality of electrodes, which can be a second traveling wave voltage signal, and the third plurality of electrodes can be configured to generate, based on the third voltage signal, a second drive potential that travels in a third direction opposite the first direction. Additionally, in such aspects, the first path can be substantially the same as the second path.

In some aspects, the system can include a gas diffuser that is configured to discharge gas into the ion channel and cause the gas to flow across the ion channel in a third direction that can be opposite the first direction or the second direction. In such aspects, the second voltage signal can be a DC voltage gradient and the electric potential can be a DC potential gradient that decreases along the second direction or increases along the second direction. Furthermore, the DC potential gradient can cause the first portion of the stream of ions to assume a first equilibrium position along the second direction and the second portion of the stream of ions to assume a second equilibrium position along the second direction. Still further, at least a portion of the first path and at least a portion of the second path can be substantially parallel. Moreover, in some such aspects, the DC voltage gradient can be non-linear.

A method of filtering ions involves introducing a stream of ions into an ion channel of an ion filtering device. The ion filtering device includes a first surface, a second surface, a first array of electrodes, and a second array of electrodes. The first and second surfaces extend along a first direction and a second direction perpendicular to the first direction. The first array of electrodes is associated with the first surface and the second array of electrodes is associated with the second surface. Each of the first and second arrays of electrodes includes a first plurality of electrodes arranged along the first direction and a second plurality of electrodes arranged along the second direction. The ion channel, in which the stream of ions is introduced, is defined between the first surface and the second surface. The method also involves applying, by a controller, a first voltage signal to the first plurality of electrodes, and generating, by the first plurality of electrodes, a drive potential based on the first voltage signal. The drive travels along the first direction. The method further involves applying, by the controller, a second voltage signal to the first array of electrodes and the second array of electrodes, and generating, by the first and second arrays of electrodes, an electric potential based on the second voltage signal. The method also involves directing a first portion of the stream of ions having ions with mobilities in a first mobility range along a first path with the drive potential and the electric potential, and directing a second portion of the stream of ions having ions with mobilities in a second mobility range along a second path with the drive potential and the electric potential.

In some aspects, the method can involve removing, from the ion filtering device, only ions of the first mobility range directed along the first path.

In other aspects, the second plurality of electrodes can include a first electrode and a second electrode spaced apart from the first electrode along the second direction, and the first plurality of electrodes can be located between the first electrode and the second electrode. In such aspects, the method can also involve applying the second voltage signal to the first electrode, the second electrode, and at least a third electrode of the first plurality of electrodes, and generating, by the first electrode, the second electrode, and the third electrode, the electric potential based on the second voltage signal. In such aspects, the electric potential can be a DC potential gradient that either decreases along the second direction or increases along the second direction.

In other aspects, the second voltage signal can be a DC voltage gradient and the electric potential can be a DC potential gradient that decreases along the second direction or increases along the second direction. In such aspects, the first voltage signal can be a traveling wave voltage signal and the drive potential can be a traveling drive potential that travels along the first direction.

In some other aspects, the method can involve passing the first portion of the stream of ions through an aperture in a barrier, and blocking the second portion of the stream of ions with the barrier. In still other aspects, the method can involve applying, by the controller, a third voltage signal to the first array of electrodes and the second array of electrodes along a third direction opposite the second direction. In such aspects, the first path can be substantially the same as the second path. Additionally, in some such aspects, the second voltage signal can be a first DC voltage gradient that decreases along the second direction and the third voltage signal can be a second DC voltage gradient that decreases along the third direction.

In other aspects, each of the first and second arrays of electrodes can include a third plurality of electrodes arranged along the first direction, and the first voltage signal can be a first traveling wave voltage signal and the drive potential can be a traveling drive potential that travels along the first direction. In such aspects, the method can involve applying, by the controller, a third voltage signal, which can be a second traveling wave voltage signal, to the third plurality of electrodes, and generating, by the third plurality of electrodes, a second drive potential based on the third voltage signal. The second drive potential can travel in a third direction opposite the first direction, and the first path can be substantially the same as the second path.

In still other aspects, the method can involve discharging, with a gas diffuser, gas into the ion channel and causing the gas to flow across the ion channel in a third direction opposite the first direction or the second direction. In such aspects, the second voltage signal can be a DC voltage gradient and the electric potential can be a DC potential gradient that decreases along the second direction or increases along the second direction. Furthermore, in some such aspects, the method can involve causing, by the DC potential gradient, the first portion of the stream of ions to assume a first equilibrium position along the second direction and the second portion of the stream of ions to assume a second equilibrium position along the second direction. Still further, at least a portion of the first path and at least a portion of the second path can be substantially parallel. Moreover, in some such aspects, the DC voltage gradient can be non-linear.

In accordance with additional aspects of the present disclosure, exemplary systems for separating ions are provided. A system for separating ions includes a first surface extending along a first direction and a second direction perpendicular to the first direction, a second surface extending along the first direction and the second direction, an ion channel defined between the first surface and the second surface and configured to receive a stream of ions, a first array of electrodes associated with the first surface and a second array of electrodes associated with the second surface, means for causing gas to flow across the ion channel in a fourth direction that is substantially opposite the first direction, and a controller configured to apply a DC voltage gradient to the first array of electrodes and the second array of electrodes. Each of the first and second arrays of electrodes includes a first plurality of electrodes extending in a third direction. The first and second arrays of electrodes are configured to generate an electric field based on the DC voltage gradient. The electric field and the flow of gas are configured to direct a first portion of the stream of ions having ions with mobilities in a first mobility range along a first path and a second portion of the stream of ions having ions with mobilities in a second mobility range along a second path.

In some aspects, the third direction can be oriented at an angle with respect to the first direction. In such aspects, an effective potential of the electric field can decrease along the first direction and decreases along the second direction.

In other aspects, only ions of the first mobility range that are directed along the first path are detected or transmitted to an ion detector.

In some aspects, the first plurality of electrodes can include a first electrode and a second electrode spaced apart from the first electrode along a fifth direction that is perpendicular to the third direction. In such aspects, the DC voltage gradient can be applied to the first electrode and the second electrode. Additionally, the first electrode and the second electrode can be configured to generate, based on the DC voltage gradient, the electric field, and an effective potential of the electric field can decrease along the first direction.

In still other aspects, an effective potential of the electric field can decrease along the first direction.

In some other aspects, the electric field can cause the first portion of the stream of ions to assume a first equilibrium position along the fourth direction and the second portion of the stream of ions to assume a second equilibrium position along the fourth direction. In such aspects, at least a portion of the first path and at least a portion of the second path can be substantially parallel.

In other aspects, the DC voltage gradient can be non-linear.

In some aspects, the third direction can be the same as the second direction. In such aspects, a second DC voltage gradient can be applied to the first plurality of electrodes, the first plurality of electrodes can be configured to generate a second electric field based on the second DC voltage gradient, and an effective potential of the second electric field can decrease along the second direction. In such aspects, the system can comprise at least one resistor chain electrically connected to the first plurality of electrodes, and the second DC voltage gradient applied to the first plurality of electrodes can be generated by the at least one resistor chain.

In some aspects, the system can include an inlet and an outlet, and the inlet can be offset from the outlet along the first direction.

In other aspects, a DC voltage signal can be applied to at least one of the first plurality of electrodes, which can be configured to generate a blocking potential based on the DC voltage signal. The blocking potential can prevent ions from passing.

In other aspects, the system can include an inlet and at least two outlets, and a first outlet of the at least two outlets can be aligned with the first path while a second outlet of the at least two outlets can be aligned with the second path.

A method of separating ions involves introducing a stream of ions into an ion channel of an ion separation device. The ion separation device includes a first surface extending along a first direction and a second direction perpendicular to the first direction, a second surface extending along the first direction and the second direction, a first array of electrodes associated with the first surface, and a second array of electrodes associated with the second surface. The ion channel is defined between the first surface and the second surface. Each of the first and second arrays of electrodes includes a first plurality of electrodes extending in a third direction. The method further includes discharging gas into the ion channel and causing the gas to flow across the ion channel in a fourth direction opposite the first direction. The method further includes applying a DC voltage gradient to the first array of electrodes and the second array of electrodes and generating, by the first and second arrays of electrodes, an electric field based on the DC voltage gradient. The method additionally includes directing a first portion of the stream of ions having ions with mobilities in a first mobility range along a first path with the electric field and the flow of gas and directing a second portion of the stream of ions having ions with mobilities in a second mobility range along a second path with the electric field and the flow of gas.

In some aspects, the third direction can be oriented at an angle with respect to the first direction. In such aspects, an effective potential of the electric field can decrease along the first direction and decreases along the second direction.

In some aspects, the method can further include detecting or transmitting to an ion detector only ions of the first mobility range directed along the first path.

In other aspects, the first plurality of electrodes can include a first electrode and a second electrode spaced apart from the first electrode along a fifth direction that is perpendicular to the third direction. In such aspects, the method can further include applying the DC voltage gradient to the first electrode and the second electrode, and generating, by the first electrode and the second electrode, the electric field based on the DC voltage gradient. Additionally, an effective potential of the electric field can decrease along the first direction.

In some aspects, an effective potential of the electric field can decrease along the first direction.

In some aspects, the method further can include causing, by the electric field, the first portion of the stream of ions to assume a first equilibrium position along the fourth direction and the second portion of the stream of ions to assume a second equilibrium position along the fourth direction. In such aspects, at least a portion of the first path and at least a portion of the second path can be substantially parallel.

In other aspects, the DC voltage gradient can be non-linear.

In some aspects, the third direction can be the same as the second direction and a second DC voltage gradient can be applied to the first plurality of electrodes. The first plurality of electrodes can be configured to generate a second electric field based on the second DC voltage gradient. An effective potential of the second electric field can decrease along the second direction. In such aspects, the ion separation device can include at least one resistor chain electrically connected to the first plurality of electrodes and the second DC voltage gradient can be applied to the first plurality of electrodes through the resistor chain.

In some aspects, the ion separation device can include an inlet and an outlet, and the inlet can be offset from the outlet along the first direction.

In some aspects, the method can further include applying a DC voltage signal to at least one of the first plurality of electrodes, and generating, by the at least one of the first plurality of electrodes, a blocking potential based on the DC voltage signal that prevents ions from passing.

In some aspects, the ion separation device can include an inlet and at least two outlets. In such aspects, a first outlet of the at least two outlets can be aligned with the first path and a second outlet of the at least two outlets can be aligned with the second path.

Other features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

The foregoing features of the present disclosure will be apparent from the following Detailed Description of the Invention, taken in connection with the accompanying drawings, in which:

FIG. 12A is a schematic diagram illustrating another exemplary arrangement of electrodes of an electrode array for implementation with the 2D SLIM filter of the present disclosure;

FIG. 12B illustrates a plurality of segmented TW electrode rows of the electrode array of FIG. 12A;

FIG. 12C illustrates a plurality of segmented RF electrode rows of the electrode array of FIG. 12A;

FIG. 12D illustrates a plurality of TW electrode columns of the electrode array of FIG. 12A;

FIG. 20B shows the resulting effective field strength of the electric field generated by the first exemplary configuration of applied voltage signals applied shown in FIG. 20A;

FIG. 21 is a partial sectional view taken along line 20-20 of FIG. 18 and showing a second exemplary configuration of a voltage gradient applied to the electrodes of the 2D SLIM filter;

FIG. 23A is a partial sectional view taken along line 20-20 of FIG. 18 and showing a third exemplary configuration of voltage signals applied to the electrodes of the 2D SLIM filter including a high amplitude blocking voltage;

FIG. 23B shows the resulting effective potential of the electric field generated by the third exemplary configuration of applied voltage signals shown in FIG. 23A;

FIG. 24 is a plot of computer simulation results showing the path of travel through the 2D SLIM filter of FIG. 18 for 322 m/z ions, 622 m/z ions, and 922 m/z ions;

DETAILED DESCRIPTION

The present disclosure relates to systems and methods for separating and/or filtering ions, as described in detail below in connection with FIGS. 1-38.

Ions can be separated based on their mobility via ion mobility spectrometry (IMS). Mobility separation can be achieved, for example, by applying one or more potential waveforms (e.g., traveling potential waveforms, direct current (DC) potential, or both) on a collection of ions. IMS based mobility separation can be achieved by structures for lossless ion manipulation (SLIM) that can systematically apply traveling and/or DC potential waveforms to a collection of ions. This can result in a continuous stream of ions that are temporally/spatially separated based on their mobility. In some implementations, it can be desirable to select ions having a predetermined mobility range from a collection of ions. This can be achieved by mobility-based filtering of ions in SLIM devices ("SLIM filters"). SLIM filters (e.g., low pass filters, high pass filters, band pass filters, etc.) can apply a superposition to multiple potential waveforms that are directed (e.g., traveling) in different directions (e.g., in two-dimensions). Properties of the potential waveforms (e.g., amplitude, shape, frequency, etc.) can determine the properties of the SLIM filter (e.g., bandwidth, cut-off mobility values, etc.).

Notwithstanding the foregoing, these technologies, including that of the present disclosure, should not be understood to be limited to analyzing ions only. In some implementations, other types of charged particles, for example, proteins, viruses, bacteria, and inorganic nanoparticles or microparticles, etc., can also be analyzed.

Figure 1:
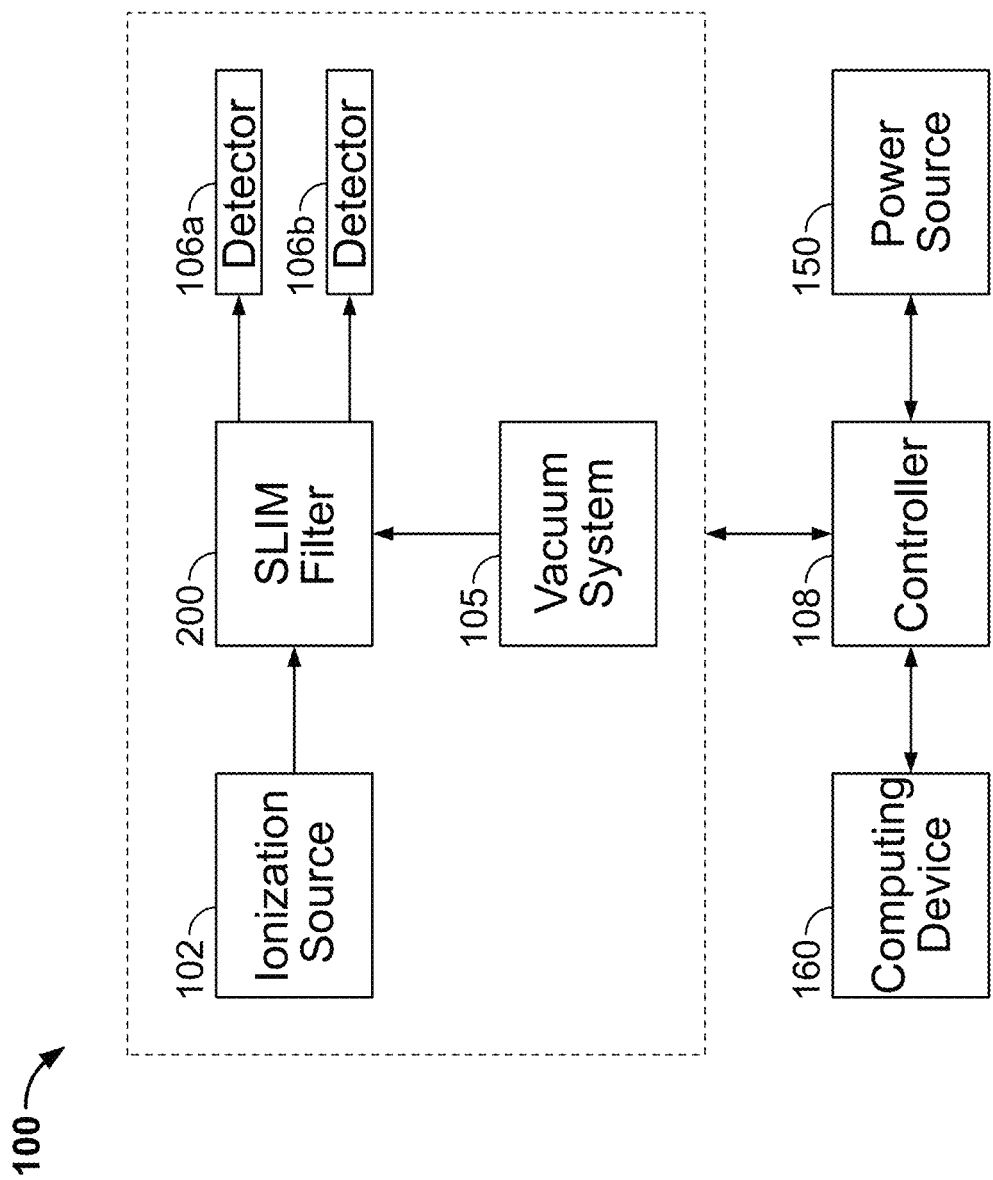
FIG. 1 is a schematic diagram of an exemplary mobility filter system of the present disclosure.

FIG. 1 is a schematic diagram of an exemplary mobility filter system 100. The mobility filter system 100 includes an ionization source 102 that can generate ions (e.g., ions having varying mobility and mass-to-charge-ratios) and inject the ions into a 2D SLIM filter 200 (discussed in connection with FIGS. 4-12). Alternatively, the ionization source 102 can inject the ions into a SLIM ion transfer device 104 (discussed in connection with FIGS. 2 and 3), which can transfer ions from one point to another, e.g., from the ionization source 102 to the 2D SLIM filter 200, without separating the ions based on mobility. As another alternative, ions could be formed within the SLIM ion transfer device 104. For example, a laser source could be provided that generates a laser beam that shines into the SLIM ion transfer device 104, e.g., through an ion channel thereof, and interacts with particles, e.g., a spray of particles, within the SLIM ion transfer device 104 to create ions for filtering and detection. Once created, the ions are transferred to the 2D SLIM filter 200. The 2D SLIM filter 200 can select ions with one or more predetermined ranges of mobility and direct the selected band (or bands) of ions to a detector (or detectors). For example, if two bands of ion mobility are selected, the first band can be directed to detector 106a and the second band can be directed to detector 106b. The ion transfer system 100 of FIG. 1 can also include a vacuum system 105 in fluidic communication with the 2D SLIM filter 200 that regulates the gas pressure provided to and/or within the 2D SLIM filter 200. Specifically, the vacuum system 105 can provide nitrogen to the 2D SLIM filter 200 at a consistent pressure while maintaining the pressure therein at a consistent pressure gradient. Additionally and/or alternatively, the vacuum system 105 can be implemented to cause gas to flow across the 2D SLIM filter 200 at a set speed (velocity) in order to separate ions, as discussed in connection with FIG. 12.

The 2D SLIM filter 200 can generate potential waveforms (e.g., by application of a radio frequency (RF) and/or AC and/or DC voltage on electrodes in the 2D SLIM filter 200). For example, a pair of potential waveforms directed perpendicular to each other can be generated by a first separation region of the 2D SLIM filter 200 and configured to drive different ions in different directions. The properties of the pair of waveforms can determine a first threshold mobility around which the ions ("ion packet") are separated. Ions with mobility higher than the first threshold mobility (first ion sub-packet) are directed in a first direction and ions with mobility smaller than the first threshold mobility (second ion sub-packet) are directed in a second direction. A second separation region of the 2D SLIM filter 200 can receive the first ion sub-packet. The second separation region can generate a second pair of potential waveforms directed perpendicular to each other (e.g., traveling in perpendicular directions). Ions in the first ion sub-packet with mobility higher than a second threshold mobility (third ion sub-packet) are directed in a third direction and ions with mobility smaller than the second threshold mobility (fourth ion sub-packet) are directed in a fourth direction. The foregoing is discussed in greater detail in connection with FIGS. 4-12.

In the operation described above, the 2D SLIM filter 200 can operate as a mobility band pass filter. For example, the fourth ion sub-packet comprises ions having an ion mobility greater than the first threshold mobility and lower than the second threshold mobility. The second/third/fourth ion sub-packet can be directed to the detectors 106a, 106b for further detection and analysis.

A controller 108 can control the operation of an ionization source 102, 2D SLIM filter 200, the vacuum system 105, and the detectors 106a, 106b. For example, the controller 180 can control the rate of injection of ions into the 2D SLIM filter 200 by the ionization source 102, targeted mobility of 2D SLIM filter 200, and ion detection by the detectors 106a, 106b. The controller 108 can also control the characteristics and motion of potential waveforms in the 2D SLIM filter 200 (e.g., by applying RF/AC/DC potentials to electrodes in the 2D SLIM filter 200).

The controller 108 can control the generation of potential waveforms by applying RF/AC/DC potentials to electrodes in the 2D SLIM filter 200. The controller 108 can control the properties of the potential waveforms (e.g., amplitude, shape, frequency, etc.) by varying the properties of the applied RF/AC/DC potential (or current). In some implementations, the controller 108 can vary the properties (e.g., iteratively) of the pair of potential waveform in the separation regions of the 2D SLIM filter 200 to improve the separation of ions (e.g., achieve sharp separation around a targeted mobility). Once the desirable properties are determined, the corresponding values can be stored in a database for future reference. The controller 108 can also synchronize the arrival time of the ion packet in the 2D SLIM filter 200 (e.g., arrival at the first and second separation regions of the 2D SLIM filter 200) with the generation of pairs of traveling/DC potential waveforms directed in perpendicular directions.

The controller 108 can include multiple power supply modules (e.g., current and/or voltage supply circuits) that generate various voltage (or current) signals that drive the electrodes in the 2D SLIM filter 200. For example, the controller 108 can include RF control circuits that generate RF voltage signals, traveling wave control circuits that generate traveling wave voltage signals, DC control circuits that generate DC voltage signals, etc. The RF voltage signals, traveling wave voltage signals, and DC voltage signal can be applied to electrodes in the 2D SLIM filter 200. The controller 108 can include DC control circuits that can generate DC voltage signals which in turn can generate a DC potential field in the 2D SLIM filter 200. The DC control circuits can vary the amplitudes of the various DC voltage signals which can determine the gradient (or slope) of the DC potential field.

In some implementations, the controller 108 can generate traveling potential waveforms that are traveling perpendicular to each other in the separation regions of the 2D SLIM filter 200. In some implementations, the controller 108 can generate a traveling potential waveform that is traveling in one direction and a DC potential field with a gradient that can drive the ions in a perpendicular direction. The controller 108 can also include a master control circuit that can control the operation of the RF/traveling wave/DC control circuits. For example, the master control circuit can control the amplitude and/or phase of voltage (or current) signals generated by the RF/traveling wave/DC control circuits to achieve a desirable operation of the mobility filter system 100.

As discussed above, the 2D SLIM filter 200 can generate DC/traveling potential waveform (e.g., resulting from potentials generated by multiple electrodes in the 2D SLIM filter 200). The traveling potential waveform can travel at a predetermined velocity based on, for example, frequency of voltage signals applied to the electrodes. In some implementations, the speed/amplitude/shape of the traveling potential waveform and/or gradient of the DC potential waveform can determine the properties of the 2D SLIM filter 200. For example, the type of filter (e.g., low pass, band pass, high pass, etc.), and the cut-off mobility values of the filter can be determined by the properties of the traveling/DC potential waveforms.

In some implementations, the traveling potential waveform can be spatially periodic and the spatial periodicity can depend on the phase differences between the voltage signals applied to adjacent electrode pairs. In some implementations, the phase differences can determine the direction of propagation of the potential waveform. The master control circuit can control the frequency and/or phase of voltage outputs of RF/traveling wave control circuits such that the traveling potential waveform has a desirable (e.g., predetermined) spatial periodicity and/or speed.

In some implementations, the controller 108 can be communicatively coupled to a computing device 160. For example, the computing device 160 can provide operating parameters of the mobility filter system 100 via a control signal to the master control circuit. In some implementations, a user can provide the computing device 160 (e.g., via a user interface) with the operating parameters. Based on the operating parameters received via the control signal, the master control circuit can control the operation of the RF/AC/DC control circuits which in turn can determine the operation of the coupled 2D SLIM filter 200. In some implementations, RF/AC/DC control circuits can be physically distributed over the mobility filter system 100. For example, one or more of the RF/AC/DC control circuits can be located in the mobility filter system 100. The controller 108 can receive power from a power source 150 (e.g., DC power source that provides a DC voltage to the controller 108). The various RF/AC/DC control circuits can operate based on the power from the power source 150.

Figure 2:
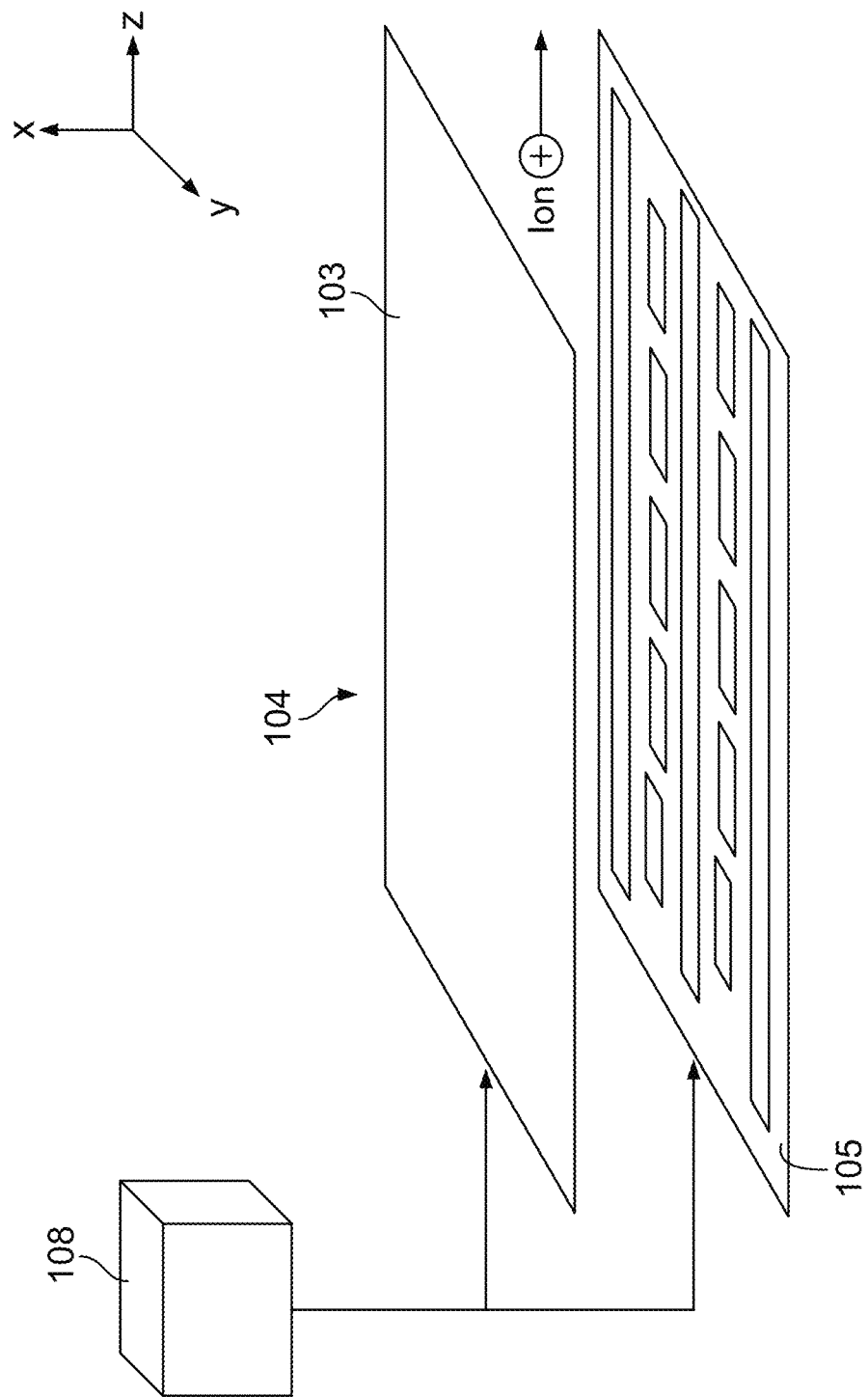
FIG. 2 a diagrammatic view of a portion of a SLIM ion transfer device that can be used with the mobility filter system of FIG. 1 of the present disclosure.

FIG. 2 is a diagrammatic view of an exemplary embodiment of a portion of the SLIM ion transfer device 104 (e.g., SLIM for transferring ions between, to, or from separation regions, etc.). The SLIM ion transfer device 104 can include a first surface 103 and a second surface 105. The first and second surfaces 103, 105 can be arranged (e.g., parallel to one another) to define one or more ion channels there between. The first surface 103 and second surface 105 can include electrodes, e.g., arranged as arrays of electrodes on the surfaces facing the ion channel. The electrodes on the first surface 103 and second surface 105 can be electrically coupled to the controller 108 and receive voltage (or current) signals or waveforms therefrom. In some implementations, the first surface 103 and second surface 105 can include a backplane that includes multiple conductive channels that allow for electrical connection between the controller 108 and the electrodes on the first surface 103 and second surface 105. In some implementations, the number of conductive channels can be fewer than the number of electrodes. In other words, multiple electrodes can be connected to a single electrical channel. As a result, a given voltage (or current) signal can be transmitted to multiple electrodes simultaneously. Based on the received voltage (or current) signals, the electrodes can generate one or more potentials (e.g., a superposition of various potentials) that can confine, drive and/or separate ions along a propagation axis (e.g., z-axis).

Figure 3:
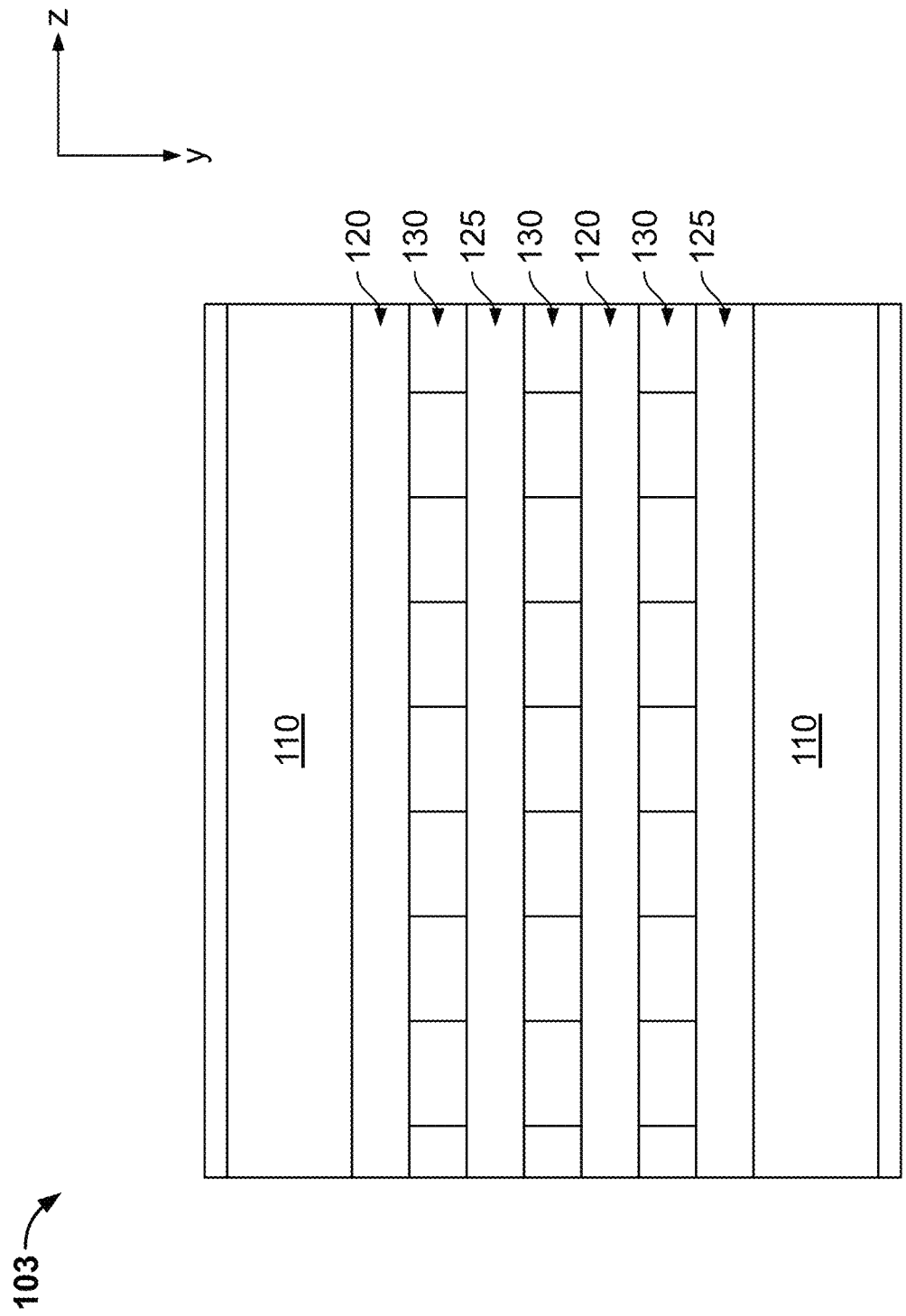
FIG. 3 is a schematic diagram of the SLIM ion transfer device of FIG. 2 illustrating electrode placement.

The first and the second surfaces 103, 105 can include a plurality of electrodes, as shown in FIG. 3, which is a schematic diagram of the SLIM ion transfer device 104 of FIG. 2 illustrating an exemplary arrangement of electrodes on the first surface 103. Although the electrode arrangement on the first surface 103 is described below, the second surface 105 can include electrodes with a similar electrode arrangement. The first surface 103 includes a first plurality of electrodes 120, 125 including first electrodes 120 and second electrodes 125. The first plurality of electrodes 120, 125 can receive RF voltage (or current) signals (or are connected to ground potential), and can generate a pseudo-potential that can prevent or inhibit ions from approaching the first surface 103, e.g., the ions are prevented from traveling in the x axis shown in FIG. 2. The RF voltage applied to adjacent electrodes of the first plurality of electrodes 120, 125 can be 180° out of phase, respectively. Accordingly, the first electrodes 120 can have a positive RF signal, while the second electrodes 125 can have a negative RF signal. The first plurality of electrodes 120, 125 can be rectangular with the longer edge thereof arranged along the direction of propagation of ions undergoing mobility separation ("propagation axis"). For example, in FIG. 3, the propagation axis is parallel to the z-axis. The first plurality of electrodes 120, 125 can be separated from each other along a lateral direction, e.g., along the y-axis, and can span substantially the entire length of the first surface 103. For example, the lateral direction can be perpendicular to the propagation axis, e.g., the z axis. It should be understood that the first plurality of electrodes 120, 125 need not be continuous electrodes, but instead can be segmented RF electrodes such as those shown and described in connection with FIGS. 9, 10A-C, and 12A-D, which are described in further detail below.

The first surface 103 can also include a second plurality of electrodes 130 that can be located between the electrodes of the first plurality of electrodes 120, 125 (e.g., in the space between the first electrodes 120 and the second electrodes 125). The second plurality of electrodes 130 can include multiple electrodes that are segmented or arranged along, e.g., parallel to, the propagation axis. The second plurality of electrodes 130 can receive a second voltage signal and generate a drive potential that can drive ions along the propagation axis. The drive potential can lead to separation of ions based on their mobility as they move along the propagation axis. For example, the second plurality of electrodes 130 can receive a traveling wave AC, DC, or pulsed current voltage signal. In such a configuration, the same AC or DC voltage signal can be applied to each of the electrodes of the second plurality of electrodes 130, but phase shifted for adjacent electrodes in the direction of propagation, e.g., along the z-axis. For example, where there are eight electrodes in each row of the second plurality of electrodes 130, the voltage signal applied to the adjacent electrodes can be phase shifted by 45°.

The first surface 103 can include guard electrodes 110 that are positioned adjacent to the outer most of the first and second plurality of electrodes 120, 125, 130. For example, the guard electrodes 110 can be located at the edges of the first surface 103 along the lateral direction. The guard electrodes 110 can receive a voltage signal (e.g., DC voltage signal from a DC control circuit) and generate a guard potential that can confine ions in the ion channels between the guard electrodes along the lateral direction.

The first plurality of electrodes 120,125, the second plurality of electrodes 130, and the guard electrodes 110 can be connected to one or more voltage control circuits (e.g., voltage control circuits in the controller 150). In some implementations, the first plurality of electrodes 120, 125 can receive radio frequency (RF) signals that are phase shifted with respect to each other. In some implementations, the master control circuit can control the operation of two RF control circuits to generate two RF voltage signals that are phase shifted from one another.

Figure 4:
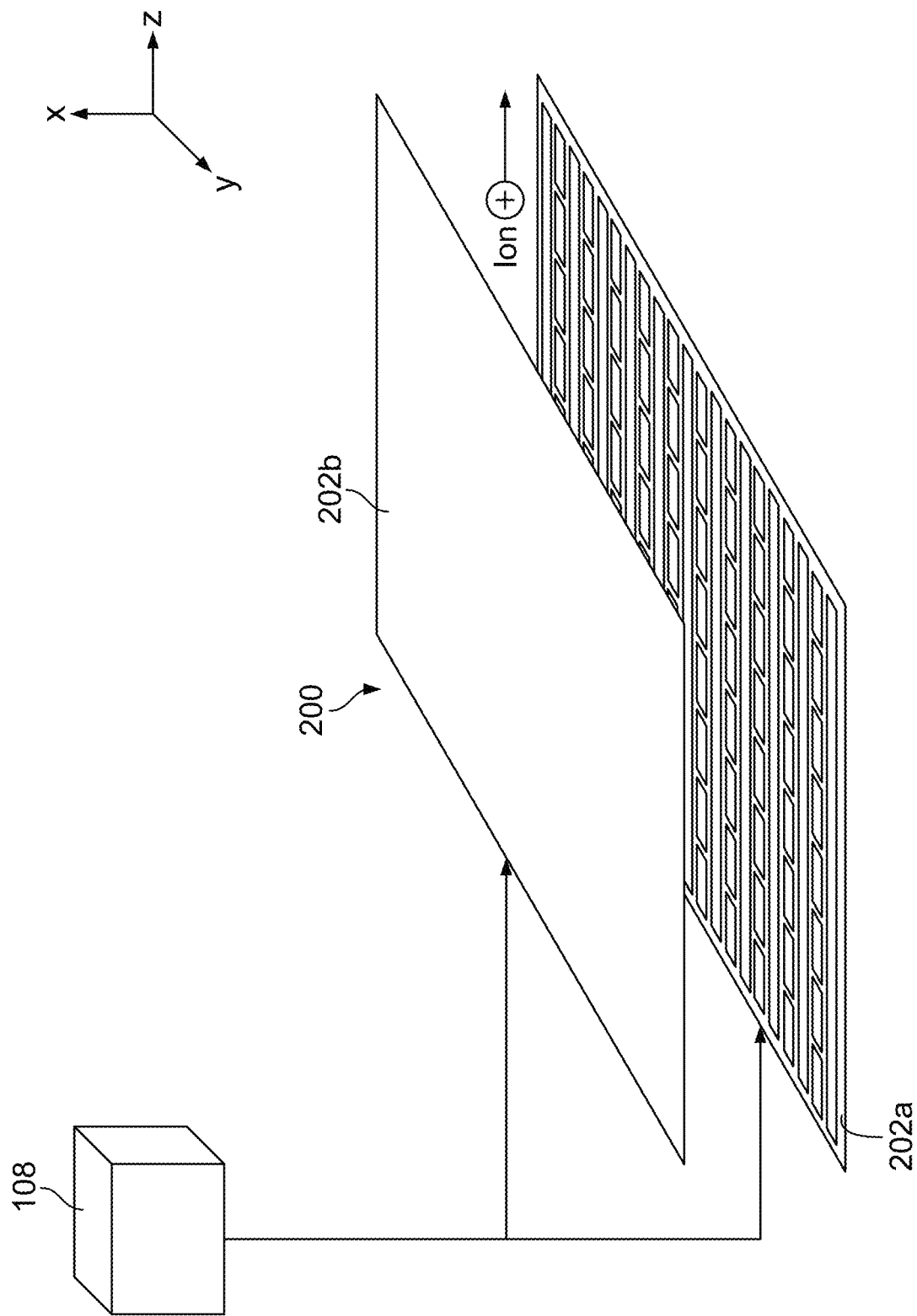
FIG. 4 is a diagrammatic view of a portion of an exemplary two-dimensional (2D) SLIM filter of the present disclosure for use with the mobility filter system of FIG. 1.

FIG. 4 is a diagrammatic view of a portion of the exemplary two-dimensional (2D) SLIM filter 200 of the present disclosure. The 2D SLIM filter 200 can include a first surface 202a and a second surface 202b. The first and second surfaces 202a, 202b can be arranged parallel to one another to define one or more ion channels there between. The first and second surfaces 202a, 202b can include electrodes, e.g., arranged as arrays of electrodes on the surfaces facing the ion channel. The electrodes on the first surface 202a and second surface 202b can be electrically coupled to the controller 108 and receive voltage (or current) signals or waveforms therefrom. In some implementations, the first surface 202a and second surface 202b can include a backplane that includes multiple conductive channels that allow for electrical connection between the controller 108 and the electrodes on the first surface 202a and second surface 202b. In some implementations, the number of conductive channels can be fewer than the number of electrodes. In other words, multiple electrodes can be connected to a single electrical channel. As a result, a given voltage (or current) signal can be transmitted to multiple electrodes simultaneously. Based on the received voltage (or current) signals, the electrodes can generate one or more potentials (e.g., a superposition of various potentials) that can confine, drive and/or separate ions along a propagation axis (e.g., z-axis). That is, the 2D SLIM filter 200 can be similar in construction to the SLIM ion transfer device 104.

Figure 5:
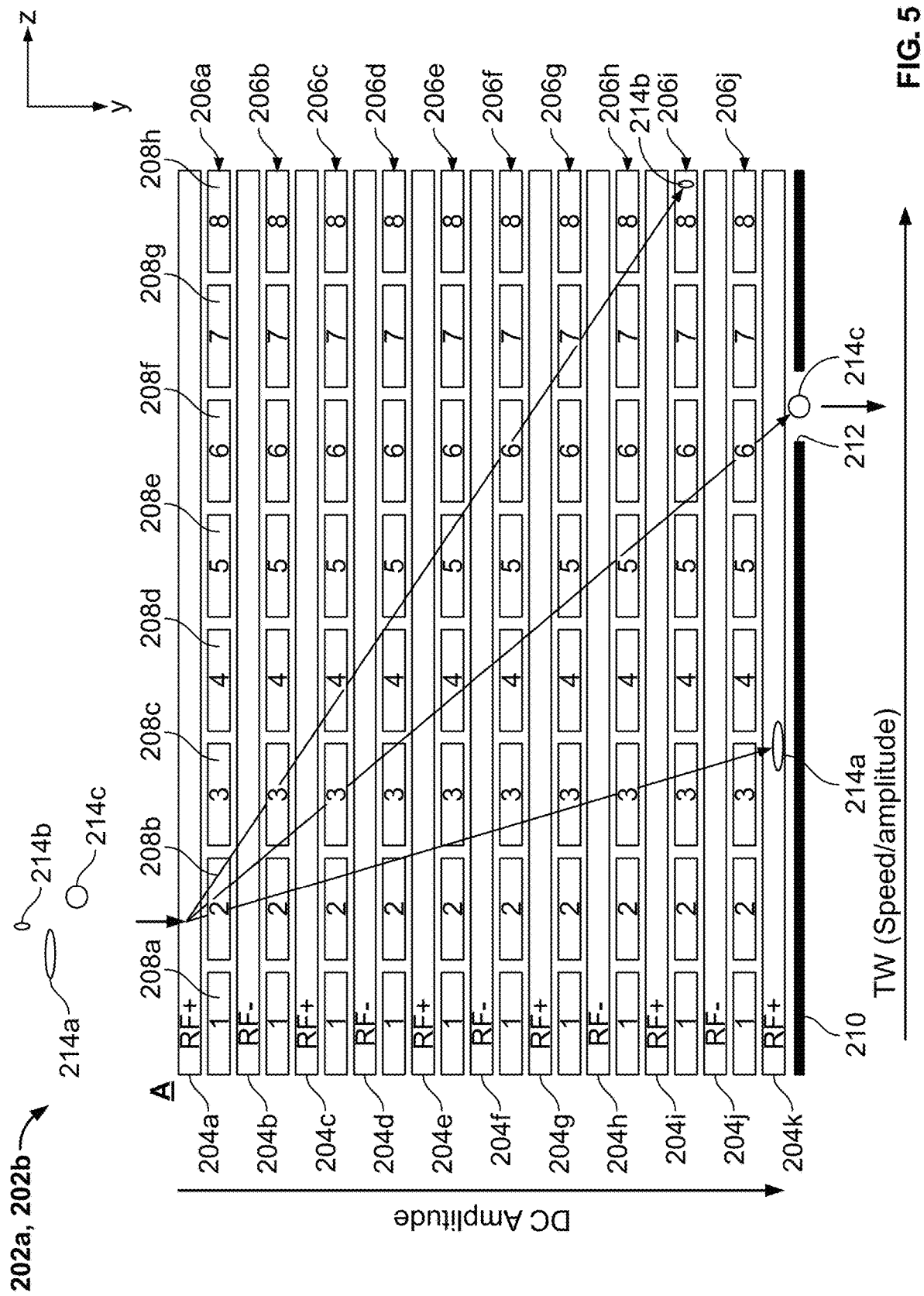
FIG. 5 is a schematic diagram of a first/second surface of the 2D SLIM filter of FIG. 4 illustrating electrode placement.

FIG. 5 is a schematic diagram of the first and second surfaces 202a, 202b of the 2D SLIM filter 200 illustrating an exemplary arrangement of electrodes thereon. The first and second surfaces 202a, 202b can be substantially identical, and thus it should be understood that the description of the first surface 202a applies equally to the second surface 202b, thus the second surface 202b can include electrodes with similar electrode arrangement to the first surface 202a.

The first surface 202a includes a plurality of continuous electrodes 204a-k and a plurality of segmented electrode arrays 206a-j. Each of the plurality of continuous electrodes 204a-k can receive voltage (or current) signals, or can be connected to ground potential, and can generate a pseudo-potential that can prevent or inhibit ions from approaching the first surface 202a. The plurality of continuous electrodes 204*a-k* can be rectangular in shape with the longer edge of the rectangle arranged along the direction of propagation of ions undergoing mobility separation, e.g., along the propagation axis which is shown in FIG. 5 as parallel to the z-axis. The plurality of continuous electrodes 204*a-k* can be separated from each other along a lateral direction, e.g., along the y-axis, which can be perpendicular to the direction of propagation, e.g., the z-axis.

Each of the plurality of segmented electrode arrays 206*a-j* can be placed between two continuous electrodes 204*a-k*, and includes a plurality of individual electrodes 208*a-h*, e.g., eight electrodes, that are arranged along (parallel to) the direction of propagation, e.g., along the z-axis. It should be understood that each segmented electrode array 206*a-j* can include more or less than eight electrodes, but should include at least three electrodes. The plurality of segmented electrode arrays 206*a-j* can receive a second voltage signal and generate a drive potential that can drive ions along the propagation axis, which is discussed in greater detail below.

The plurality of continuous electrodes 204*a-k* and the plurality of segmented electrode arrays 206*a-j* can be arranged in alternating fashion on the first surface 202*a*. In this configuration, each segmented electrode array 206*a-j* is positioned between two continuous electrodes 204*a-k*. Specifically, the electrodes on the first surface 202*a* are arranged as follows: first continuous electrode 204*a*, first segmented electrode array 206*a*, second continuous electrode 204*b*, second segmented electrode array 206*b*, third continuous electrode 204*c*, third segmented electrode array 206*c*, fourth continuous electrode 204*d*, fourth segmented electrode array 206*d*, fifth continuous electrode 204*e*, fifth segmented electrode array 206*e*, sixth continuous electrode 204*f*, sixth segmented electrode array 206*f*, seventh continuous electrode 204*g*, seventh segmented electrode array 206*g*, eighth continuous electrode 204*h*, eighth segmented electrode array 206*h*, ninth continuous electrode 204*i*, ninth segmented electrode array 206*i*, tenth continuous electrode 204*j*, tenth segmented electrode array 206*j*, eleventh continuous electrode 204*k*. The final continuous electrode, e.g., the eleventh continuous electrode 204*k*, can be adjacent a barrier 210 having an orifice 212 therein that functions as an ion outlet. The barrier 210 and orifice 212 function to filter ions.

The segmented electrodes 206*a-j* can be traveling wave (TW) electrodes such that each of the individual electrodes 208*a-h* of each segmented electrode array 206*a-j* receives a voltage signal that is simultaneously applied to all individual electrodes 208*a-h*, but phase shifted between adjacent electrodes 208*a-h* along the z-axis. However, the same individual electrodes, e.g., the first individual electrodes 208*a*, of the segmented electrode arrays 206*a-j* receive the same voltage signal without phase shifting.

The voltage signal applied to the individual electrodes 208*a-h* can be a sinusoidal waveform (e.g., an AC voltage waveform), a rectangular waveform, a DC square waveform, a sawtooth waveform, a biased sinusoidal waveform, a puled current waveform, etc., and the amplitude of the signal provided to the individual electrodes 208*a-h* can be determined based on the voltage waveform applied, e.g., in view of the phase shifting referenced above. For example, if a single wavelength of an AC voltage waveform extends over 8 electrodes (e.g., the individual electrodes 208*a-h*), then amplitudes of the voltage signals applied to the individual electrodes 208*a-h* can be determined by selecting values from the AC waveform for phase shifts corresponding to the total number of electrodes (e.g., 8 electrodes) associated with a single wavelength. For example, the phase shift between adjacent electrodes of the individual electrodes 208*a-h* is 45 degrees (360 degrees of a single wavelength cycle divided by 8). This can be achieved by electrically coupling the individual electrodes 208*a-h* to different traveling wave control circuits, e.g., AC control circuits, DC control circuits, puled current control circuits, etc., that generate voltage signals that are phase shifted with respect to each other. Alternatively, the controller 108 could be a single traveling wave control circuit that can generate voltage signals that can be simultaneously applied to the electrodes 208*a-h*. It should be understood that the voltage or current waveform can take various forms, e.g., square, triangular, rectangular, sawtooth, etc., can be periodic, can be aperiodic, etc. For example, the controller 108 could be a traveling wave control circuit that can include one or more DC control circuits that generate DC voltage signals and AC control circuits that generate sinusoidal signals.

As noted above, the controller 108 can include one or more pulsed voltage or current control circuits that can generate a pulsed voltage (or current) waveform, e.g., square, triangular, rectangular, sawtooth, etc. The pulsed voltage (or current) control circuits can include multiple outputs that are electrically connected to the individual electrodes 208*a-h*. In some implementations, the controller 108 can be a pulsed voltage (or current) control circuit that can simultaneously apply multiple voltage signals (e.g., that constitute the pulsed waveform) to each of the individual electrodes 208*a-h*. The various pulse shapes of the voltage (or current) waveform can be generated by a superposition of DC voltage signals and sinusoidal signals. The controller 108 can determine the phase shift between the voltage signals generated by the various traveling wave control circuits. The shape/periodicity of the traveling potential waveform can be based on the phase shift between the voltage signals applied to adjacent electrodes 208*a-h*. The controller 108 can determine the amplitudes of the DC voltage signals generated by DC control circuits, and can determine the amplitude and/or frequency of the AC signal generated by the traveling wave control circuits.

The frequency of the voltage signals (e.g., AC signal) can determine the speed of the traveling potential waveform. An alternate approach to generating phase shifted AC signals for the voltage (or current) waveform, which generates the traveling potential waveform, is the use of multiphase transformers. This approach can provide control of the phase relationships between multiple voltage output signals based upon the connection scheme of the multiple secondary windings of the transformer. In this way, one or more input drive voltage(s) signal can be used to generate multiple phase dependent outputs with only analog circuitry. A key differentiation between this approach and the digital generation methods described above is the fact that the phase dependence can be dictated by the physical wiring of the transformer and may not be changed without making a physical change to the wiring. The phase relationships between digitally generated waveforms can be dynamically varied without a change in hardware.

As time progresses, the potential waveform (e.g., generated by AC waveform, sinusoidal voltage waveform, pulsed voltage [or current] waveform applied to the electrodes) can travel along the direction of propagation, e.g., along the z-axis. This can result in a change in the amplitude of the voltage applied to the individual electrodes 208*a-h*. For example, the voltage applied to the first individual electrode 208*a* during a first time step is applied to the adjacent individual electrode 208*b* during the next time step. The controller 108 can include one or more traveling wave control circuits that can generate the pulsed voltage/current waveform, AC waveform, etc. In some implementations, the controller can include one or more RF control circuits that can generate an RF voltage waveform, discussed in greater detail below.

The controller 108 can control the speed of the traveling potential waveform by controlling the frequency and/or phase of the AC/RF/pulsed voltage (or current) waveform applied to the individual electrodes 208a-h. As the potential waveform travels, ions 214a-c introduced into the 2D SLIM filter 200 can be pushed along the direction of propagation and separated along the z-axis based on their mobility. Additionally, the 2D SLIM filter 200 can have a gas, e.g., nitrogen, in the ion channel between the first and second surfaces 202a, 202b at a set pressure and temperature, e.g., 1-4 torr. As the ions 214a-c move through the 2D SLIM filter 200 they will be under the influence of the gas, which causes a drag force to be applied thereon. The drag force further influences the motion of the ions 214a-c depending on the size and shape of the ions 214a-c, e.g., larger ions will experience a greater drag force and therefore travel less distance in the same amount of time. Accordingly, higher mobility ions will travel further along the direction of propagation, e.g., the z-axis, than lower mobility ions.

As noted above, the plurality of continuous electrodes 204a-k can be connected to one or more voltage control circuits, e.g., voltage control circuits in the controller 108, and receive RF signals therefrom. The RF voltages applied to the continuous electrodes 204a-k can be phase shifted with respect to adjacent continuous electrodes 204a-k. That is, adjacent continuous electrodes 204a-k can receive the same RF signal, but phase shifted by 180 degrees. Accordingly, in a first state, the first, third, fifth, seventh, ninth, and eleventh continuous electrodes 204a, 204c, 204e, 204g, 204i, 204k can have a positive polarity (indicated as RF+) while the second, fourth, sixth, eighth, and tenth continuous electrodes 204b, 204d, 204f, 204h, 204j can have a negative polarity (indicated as RF−). As time and the signal advances, the polarity of each of the continuous electrodes 204a-k switches. The foregoing functionality retains the ions 214a-c between the first and second surfaces 202a, 202b and prevents the ions 214a-c from contacting the first and second surfaces 202a, 202b.

Additionally, the controller 108 applies a DC gradient along the y-axis of the 2D SLIM filter 200. For example, the controller 108 can apply a DC gradient to the plurality of continuous electrodes 204a-k and the segmented electrode arrays 206a-j to cause a potential difference in each of the RF electrodes, e.g., the plurality of continuous electrodes 204a-k, and in each of the plurality of segmented electrodes 206a-j, thus forming a DC field having an amplitude that decreases along the y-axis, as shown in FIG. 5. For example, a resistor chain can be coupled to the RF signal to form an alternating RF potential with a DC gradient. This results in a DC potential that extends from point A on the first surface 202a to point B in a decreasing "stepped" configuration. This DC field forces the ions 214a-c to move in the direction of the decreasing DC amplitude, e.g., along the y-axis, and towards the barrier 210. As the ions 214a-c move along the y-axis, they will be subject to influences of the gas and the electric fields, which, as noted above, will cause the ions 214a-c to move at different speeds based on their mobility. Thus, the ions 214a-c will move in a diagonal path, as shown in FIG. 5, as opposed to a straight path that is parallel to the z-axis such as in the typical SLIM ion transfer device 104. This allows for ions having a specific ion mobility to be filtered from a feedstock.

In operation, the ions 214a-c can be introduced by the ionization source 102 into the 2D SLIM filter 200 at the first continuous electrode 204a, e.g., at the leading edge, adjacent Point A. The ionization source 102 can provide a homogenous feedstock containing the ions 214a-c, though this is not required. As the ions 214a-c are introduced into the 2D SLIM filter 200, they will be influenced by the traveling wave applied to the individual electrodes 208a-h, the RF waveform applied to the continuous electrodes 204a-k, and the DC gradient. The RF waveform maintains the ions 214a-c between the first and second surfaces 202a, 202b, while the traveling wave and the DC gradient will cause the ions 214a-c to travel along the 2D SLIM filter 200 toward the barrier 210, as discussed in detail above. Specifically, the traveling wave causes the ions 214a-c to move along the z-axis, e.g., the propagation axis, while the DC gradient causes the ions 214a-c to move along the y-axis.

As shown in FIG. 5, each of the ions 214a-c will move in a distinct direction based on their individual mobilities. Accordingly, the orifice 212 can be positioned in the barrier 210 at a position that corresponds to desired ions, e.g., the third ion 214c, having a specific mobility so that those desired ions will pass through the orifice 212 and be filtered from the feedstock, while the undesired ions, e.g., the first and second ions 214a, 214b, are neutralized, e.g., by contacting the barrier 210 or a side wall of the 2D SLIM filter 200. That is, the location of the orifice 212 in the barrier 210 can be based on the traveling wave signal applied to the individual electrodes 208a-h, the DC gradient, the characteristics of the gas between the first and second surfaces 202a, 202b (e.g., the type of gas, the pressure, and the temperature), and the mobility of the desired ion, among other considerations. Accordingly, the orifice 212 can be positioned so that only ions having the desired mobility will fully traverse and exit the 2D SLIM filter 200 through the orifice 212. This allows for ions of a specific mobility to be targeted and filtered from a feedstock and directed to a detector (e.g., one of the first and second detectors 106a, 106b) for detection. Additionally, it should be understood that a typical SLIM ion transfer device 104 can be placed adjacent and coupled to the orifice 212 (see, FIG. 7) so that the ions 214c exiting the 2D SLIM filter 200 through the orifice 212 can be moved for further processing or detection, e.g., the SLIM ion transfer device 104 can direct the ions 214c to a detection device or another mass spectrometry device such as a Quadrupole Time-of-Flight (QTOF) or Triple Quadrupole (QQQ) system.

It is noted that while FIG. 5 shows eleven rows of continuous electrodes 204a-k and ten rows of segmented electrodes 206a-j, more or less rows are contemplated by the present disclosure. For example, the 2D SLIM filter 200 can include six rows of continuous electrodes and five rows of segmented electrodes. Additionally, it is noted that more or less individual electrodes 208a-h can be utilized. For example, two series of eight individual electrodes, e.g., sixteen individual electrodes, can be used. In such a configuration, the traveling wave applied to each of the individual electrodes may still be phase shifted by 45 degrees such that each set of eight individual electrodes accounts for a full cycle of the waveform.

Figure 6:
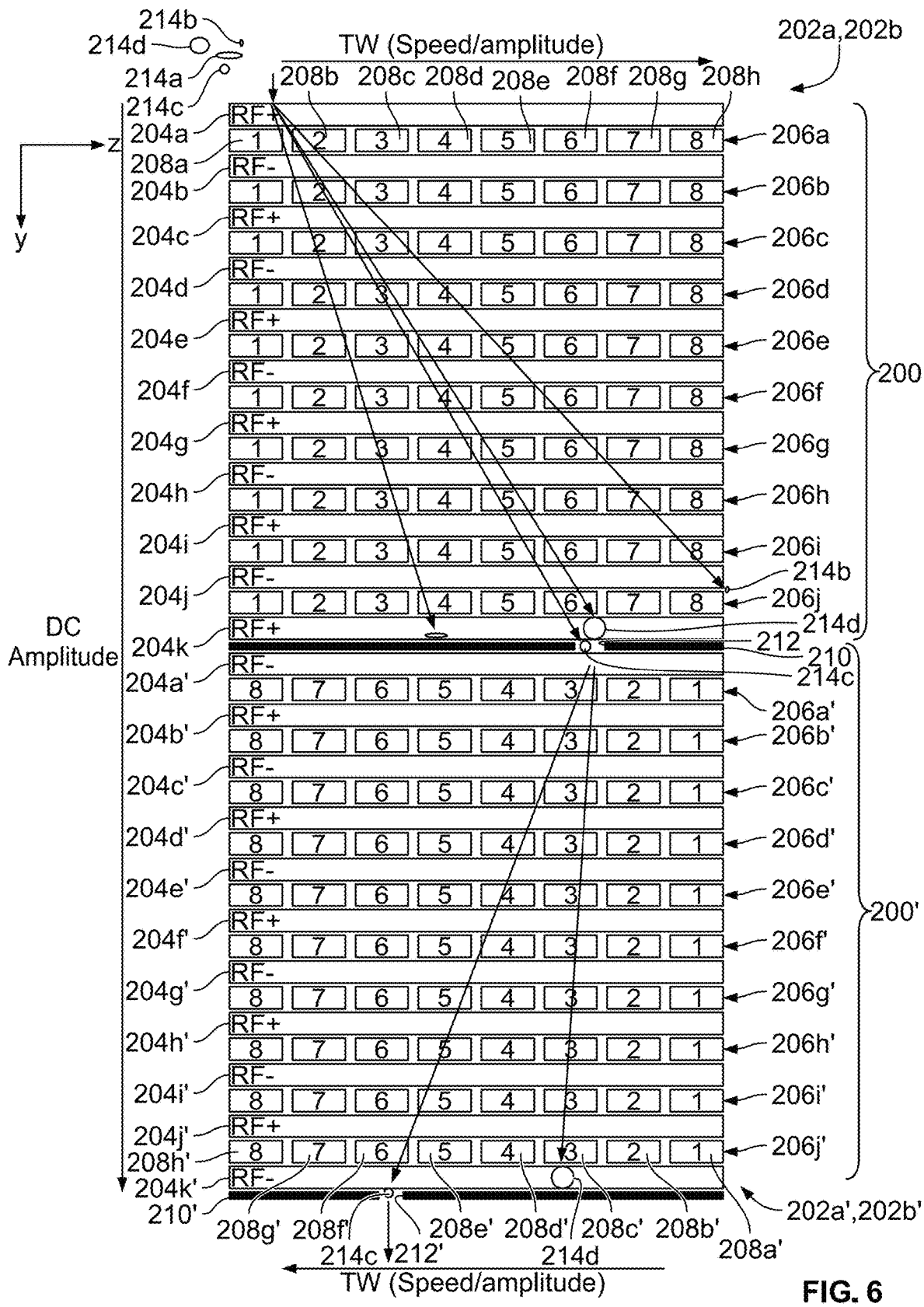
FIG. 6 is a schematic diagram showing the first/second surfaces of multiple 2D SLIM filters arranged in series, and illustrating electrode placement.

FIG. 6 is a schematic diagram showing first and second surfaces 202a, 202a', 202b, 220b' of multiple two-dimensional SLIM filters 200, 200' arranged in series, and illustrating an exemplary arrangement of electrodes thereon. Accordingly, it is contemplated by the present disclosure that multiple 2D SLIM filters 200, 200' can be arranged in series. More specifically, a second 2D SLIM filter 200' can be placed adjacent the barrier 210 of the first 2D SLIM filter 200 so that ions passing through the orifice 212 enter the second 2D SLIM filter 200', and are filtered for a second time thereby.

The second 2D SLIM filter 200' has first and second surfaces 202a', 202b' that are spaced apart and nearly identical to the first and second surfaces 202a, 202b of the first 2D SLIM filter 200 except that they are flipped about the y-axis so that the direction of propagation of the second 2D SLIM filter 200' is opposite to the direction of propagation of the first 2D SLIM filter 202. Additionally, the first and eleventh continuous electrodes 204a', 204k' of the second 2D SLIM filter 200' are of opposite polarity to the first and eleventh continuous electrodes 204a, 204k of the first 2D SLIM filter 200. This configuration allows for ions exiting the first 2D SLIM filter 200 through the orifice to transition into the second 2D SLIM filter 200'. Outside of the foregoing differences, the configuration and functionality of the first and second surfaces 202a', 202b' of the second 2D SLIM filter 200' are the same as the first and second surfaces 202a, 202b of the first 2D SLIM filter 200, and like reference numerals are used for like elements. Accordingly, the first and second surfaces 202a', 202b' of the second 2D SLIM filter 200' include a plurality of continuous electrodes 204a', 204b', 204c', 204d', 204e', 204f', 204g', 204h', 204i', 204j', 204k', e.g., RF electrodes, that correspond to the plurality of continuous electrodes 204a-k of the first and second surfaces 202a, 202b of the first 2D SLIM filter 200.

Additionally, the first and second surfaces 202a', 202b' of the second 2D SLIM filter 200' include a plurality of segmented electrodes 206a', 206b', 206c', 206d', 206e', 206f', 206g', 206h', 206i', 206j' that correspond to the plurality of segmented electrodes 206a-j of the first and second surfaces 202a, 202b of the first 2D SLIM filter 200. Each of the plurality of segmented electrodes 206a'-j' of the second 2D SLIM filter 202' include a plurality of individual electrodes 208a', 208b', 208c', 208d', 208e', 208f', 208g' that correspond to the individual electrodes 208a, 208b, 208c, 208d, 208e, 208f, 208g of the first 2D SLIM filter 200. However, the traveling wave applied to the individual electrodes 208a'-g' of the second 2D SLIM filter 200 is in the opposite direction to the traveling wave applied to the individual electrodes 208a-h of the first 2D SLIM filter 200. The second 2D SLIM filter 202' can be connected with the controller 108 and receive voltage or current waveforms therefrom.

When a plurality of 2D SLIM filters 200, 200' are stacked, e.g., aligned in series, as shown in FIG. 6, the DC gradient applied to the plurality of continuous electrodes decreases along the entire length of the multiple 2D SLIM filters 200, 200' in order to ensure that the ions 214a-d not only travel across the first 2D SLIM filter 200, but also transfer into the second 2D SLIM filter 200' and travel across the second 2D SLIM filter 200' to a second barrier 210' having a second orifice 212' therein. This configuration allows for improved resolution by allowing ions having similar mobilities to be further filtered.

For example, as shown in FIG. 6, two ions, e.g., the third and fourth ions 214c, 214d, may have similar mobilities such that the traveling wave and DC gradient cause both ions 214c, 214d to pass through the orifice 212 in the first barrier 210, while the first and second ions 214a, 214b are neutralized. Once the third and fourth ions 214c, 214d pass through the first barrier 210, they enter the second 2D SLIM filter 200' and are influenced by the traveling wave applied to the individual electrodes 208a'-h' of the second 2D SLIM filter 200', the RF waveform applied to the continuous electrodes 204a'-k' of the second 2D SLIM filter 200', and the DC gradient. In this regard, the DC gradient continues to move the ions 214c, 214d in the same direction along the y-axis and toward a second barrier 210', while the traveling wave applied to the individual electrodes 208a'-h' of the second 2D SLIM filter 200' moves the ions 214c-d in the negative direction along the z-axis, e.g., opposite to the original propagation direction of the first 2D SLIM filter 200. The traveling wave applied to the individual electrodes 208a'-h' of the second 2D SLIM filter 200', e.g., the frequency, amplitude, etc., can be tailored to the specific ions that are anticipated to pass through the orifice 212 in order to further separate them and achieve a second level of filtering.

As shown in FIG. 6, the third and fourth ions 214c, 214d will move in a distinct direction based on their individual mobilities and the waveforms applied thereto, which allows for additional filtering to occur. Accordingly, the second orifice 212' can be positioned in the second barrier 210' at a position that corresponds to the desired ion, e.g., the third ion 214c, having a specific mobility so that those desired ions will pass through the second orifice 212' and be filtered, while the undesired ions, e.g., the fourth ion 214d, is neutralized, e.g., by contacting the barrier 210' or a side wall of the 2D SLIM filter 200'. That is, the location of the orifice second 212' in the second barrier 210' can be based on the traveling wave signal applied to the individual electrodes 208a'-g' of the second 2D SLIM filter 200', the DC gradient, the characteristics of the gas between the first and second surfaces 202a', 202b' (e.g., the type of gas, the pressure, and the temperature), and the mobility of the desired ion, among other considerations. Thus, the second orifice 212' can be positioned so that only ions having the desired mobility will fully traverse and exit the second 2D SLIM filter 200' through the second orifice 212'. It should be understood that an additional 2D SLIM filter can be coupled and positioned adjacent to the second 2D SLIM filter 200' to provide additional filtering if desired.

Additionally, the foregoing serial 2D SLIM filters 200, 200' can be combined with an ion fragmentation device, and fragmented ions can be filtered in order to increase the specificity of detection in a way that is analogous to how a QQQ mass spectrometer operates. More specifically, after an ion, e.g., the third ion 214c, is isolated based on mobility by the first 2D SLIM filter 200, it can enter an ion fragmentation region or device that breaks the ion 214c into fragments, e.g., through electromagnetic irradiation, collision induced dissociation, etc. One or more of the fragments can then be filtered by the second 2D SLIM filter 200' based on mobility and detected using one of the detectors 106a, 106b.

Figure 7:
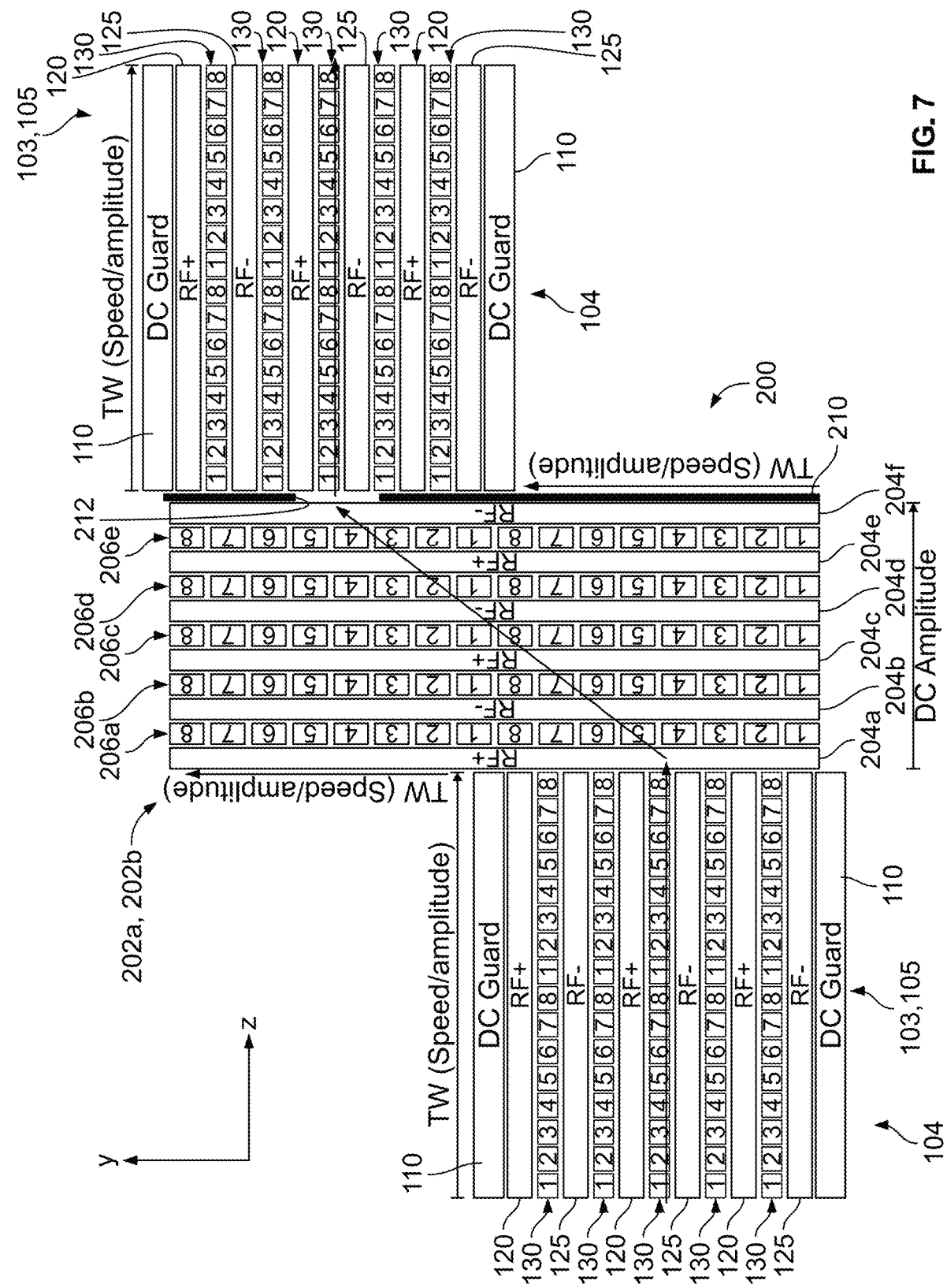
FIG. 7 is a schematic diagram showing an exemplary system having two SLIM ion transfer devices coupled by a 2D SLIM filter.

FIG. 7 is a schematic diagram showing two SLIM ion transfer devices 104 coupled with a 2D SLIM filter 200. As discussed above, the typical SLIM ion transfer device 104 can be coupled with the 2D SLIM filter 200 to provide ions thereto, and/or receive filtered ions therefrom for transport to another apparatus. FIG. 7 shows such a configuration with a first SLIM ion transfer device 104 provided as an inlet to the 2D SLIM filter 200 and a second SLIM ion transfer device 104 provided as an outlet from the 2D SLIM filter 200. In such a configuration, the SLIM ion transfer devices 104 function as described in connection with FIGS. 2 and 3, and the 2D SLIM filter 200 functions as described in connection with FIGS. 4-6. Accordingly, the specific details of the SLIM ion transfer devices 104 and the 2D SLIM filter 200 need not be repeated.

As shown in FIG. 7, the SLIM ion transfer device 104 can be positioned and oriented such that the traveling waves thereof, e.g., that travels along the second plurality of electrodes 130, are perpendicular to the traveling wave of the 2D SLIM filter 200, e.g., that travels along the plurality of segmented electrodes 206a-e. In this configuration, a first one of the SLIM ion transfer devices 104 can be placed adjacent the first continuous electrode 204a of the 2D SLIM filter 200, and a second one of the SLIM ion transfer devices 104 can be placed adjacent the barrier 210 of the 2D SLIM filter 200, and specifically adjacent the orifice 212 thereof.

Accordingly, when such a configuration is implemented, ions generally travel in the path shown in FIG. 7 (e.g., shown as sequential arrows). That is, ions are first introduced into the first SLIM ion transfer device 104 which moves the ions along the z-axis of FIG. 7 using a traveling wave applied to the second plurality of electrodes 130. Once the ions traverse the entire first SLIM ion transfer device 104, they exit the first SLIM ion transfer device 104 and enter the 2D SLIM filter 200 where they are influenced by the traveling wave applied to the segmented electrodes 206a-e of the 2D SLIM filter 200, the RF waveform applied to the continuous electrodes 204a-f of the 2D SLIM filter 200, and the DC gradient of the 2D SLIM filter 200. In this regard, the DC gradient continues to move the ions introduced into the 2D SLIM filter 200 along the z-axis of FIG. 7 and toward the barrier 210, while the traveling wave applied to the segmented electrodes 206a-e of the 2D SLIM filter 200 move the ions along the y-axis of FIG. 7, e.g., perpendicular to the traveling wave direction of the SLIM ion transfer device 104. As described in detail above, the ions will traverse the 2D SLIM filter 200 in a distinct direction based on their individual mobilities. Accordingly, the orifice 212 can be positioned in the barrier 210 at a position that corresponds to desired ions having a specific mobility so that those desired ions will pass through the orifice 212 and be filtered from the feedstock, while the undesired ions are neutralized, e.g., by contacting the barrier 210 or a side wall of the 2D SLIM filter 200. Ions having the specifically targeted mobility will traverse the 2D SLIM filter 200 and exit through the orifice 212 where they will enter a second SLIM ion transfer device 104 that moves the ions along the z-axis of FIG. 7 to another device, e.g., one of the detectors 106a, 106b of FIG. 1. Accordingly, SLIM ion transfer devices 104 can be used for transporting ions to and from a 2D SLIM filter 200, while the 2D SLIM filter 200 can be used to filter ions of a specific mobility.

Figure 8:
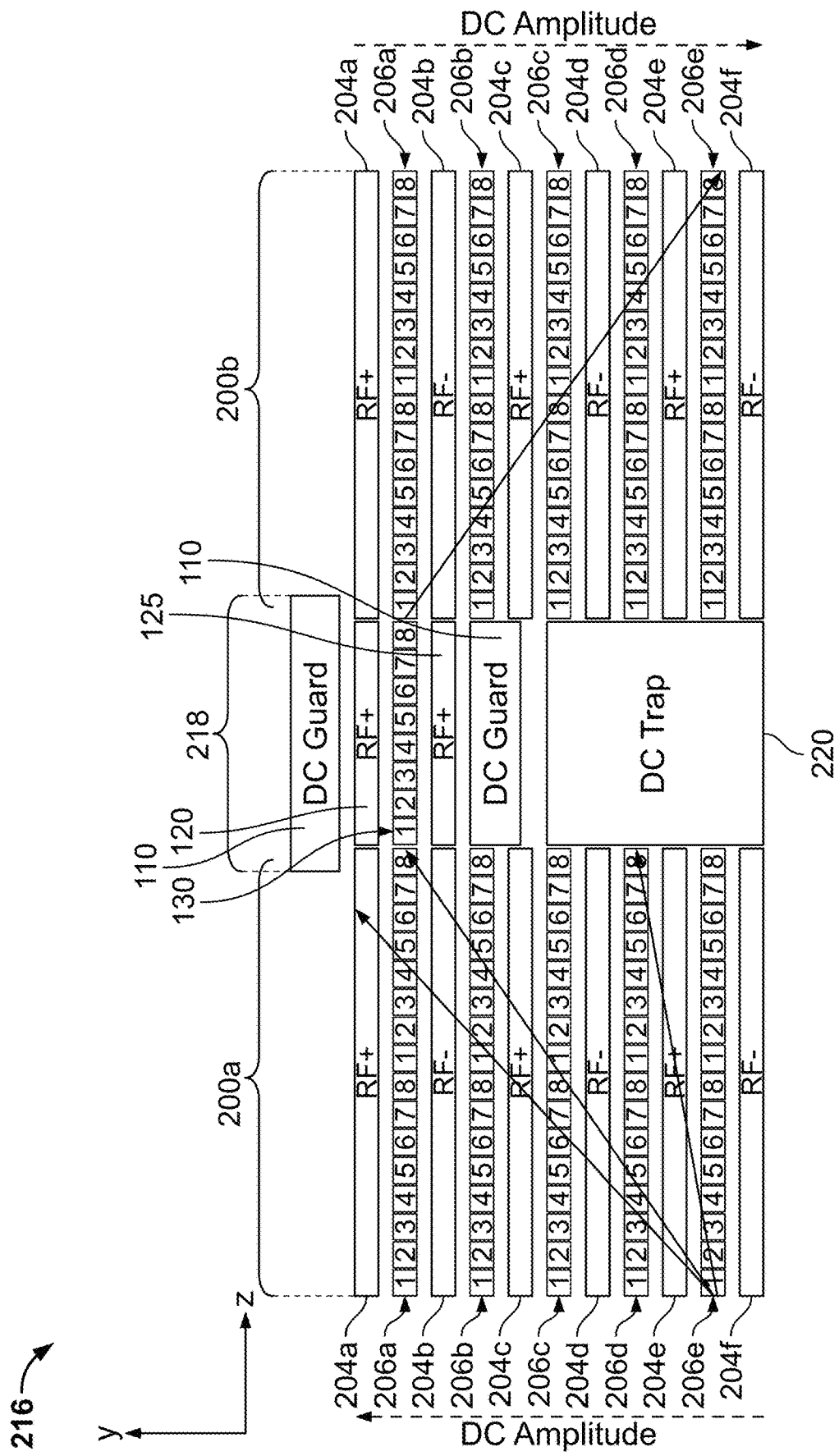
FIG. 8 is a schematic diagram showing an exemplary system having multiple 2D SLIM filters connected by a portion of a SLIM ion transfer device, and including a DC trap.

As discussed above, multiple two-dimensional SLIM filters 200 can be connected serially and can also be connected with one or more typical SLIM ion transfer devices 104 as desired. Accordingly, FIG. 8 is a schematic diagram showing an exemplary system 216 contemplated by the present disclosure having multiple 2D SLIM filters 200a, 200b connected by a SLIM ion transfer device 104, as well as implementation of a DC trap 216 therewith. For example, the system 216 shown in FIG. 8 includes a first 2D SLIM filter 200a, a SLIM ion transfer device portion 218 (e.g., an ion manipulation device), a second 2D SLIM filter 200b, and a DC trap 220. In this configuration, the SLIM ion transfer device portion 218 and the DC trap 220 essentially replace the barrier 210 shown in FIGS. 5-7. That is, the SLIM ion transfer device portion 218 can transport ions that it receives from the first 2D SLIM filter 200a to the second 2D SLIM filter 200b, and the DC trap 220 can attract and eliminate ions that approach it. In this regard, the DC trap 220 can have an attraction voltage applied thereto so that any ions that approach the DC trap 220 fall into it and are prevented from passing through the system 216. Accordingly, the DC trap 220 replaces the physical barrier of the barrier 210, and the SLIM ion transfer device portion 218 replaces the orifice 212. Implementing the DC trap 220 in place of a physical barrier can improve and stabilize pressure and gas flow within the 2D SLIM filters. More specifically, a physical barrier has the potential to affect gas flow within the 2D SLIM filters 200a, 200b, which can be reduced or eliminated by implementing a DC trap 220 in place of a physical barrier.

It should be understood that in this configuration, the SLIM ion transfer device portion 218 functions in accordance with the SLIM ion transfer device 104 described in connection with FIGS. 2 and 3. For example, the SLIM ion transfer device portion 218 can include a first electrode 120 (e.g., receiving an RF voltage), a second electrode 125 (e.g., receiving an RF voltage that is 180° out of phase from the first electrode 120), and a second plurality of electrodes 130 (e.g., traveling wave electrodes) that can be located in the space between the first and second electrodes 120, 125 and which can include multiple electrodes that are segmented or arranged along, e.g., parallel to, a propagation axis (e.g., the z-axis of FIG. 8). The second plurality of electrodes 130 can receive a second voltage signal and generate a drive potential that can drive ions along the propagation axis, e.g., the z-axis of FIG. 8. For example, as described above, the second plurality of electrodes 130 can receive a phase shifted AC or DC traveling wave signal. The SLIM ion transfer device portion 218 can also include guard electrodes 110 that are positioned adjacent to the outer most of the first and second plurality of electrodes 120, 125, 130. The guard electrodes 110 can receive a voltage signal (e.g., DC voltage signal from a DC control circuit) and generate a guard potential that can confine ions in the ion channels between the guard electrodes along the lateral direction and thus prevent the ions from being attracted to and eliminated by the DC trap 220. Accordingly, consistent with the SLIM ion transfer device 104 described in connection with FIGS. 2 and 3, the SLIM ion transfer device portion 218 can receive ions from the first 2D SLIM filter 200a, drive the ions along the second plurality of electrodes 130 and along the propagation axis, e.g., the z-axis of FIG. 8, and discharge the ions to the second 2D SLIM filter 200b. Furthermore, the SLIM ion transfer device portion 218 can include additional RF electrodes and traveling wave electrodes, consistent with the SLIM ion transfer device 104 described in connection with FIGS. 2 and 3.

It should also be understood that the 2D SLIM filters 200a, 200b are constructed and function in accordance with the 2D SLIM filter 200 described in connection with FIGS. 4-6. That is, each of the 2D SLIM filters 200a, 200b can include six continuous electrodes 204a-f (e.g., RF electrodes) and a plurality of segmented electrodes 206a-e (e.g., traveling wave electrodes). Each of the plurality of segmented electrodes 206a-e can be placed between two continuous electrodes 204a-f, and can include a plurality of individual electrodes that can receive a phase shifted AC or DC traveling wave, as described above. Accordingly, the plurality of segmented electrodes 206a-e drive ions along the propagation axis, e.g., the z-axis of FIG. 8. Additionally, each of the 2D SLIM filters 200a, 200b can have a DC gradient applied thereto to cause a potential difference in each of the RF electrodes, e.g., the plurality of continuous electrodes 204a-f, and in each of the plurality of segmented electrodes 206a-e, thus forming a DC field having an amplitude that decreases along the y-axis, as shown in FIG. 8. However, for the configuration shown in FIG. 8, the DC gradients applied to each of the first and second 2D SLIM filters 200a, 200b can be in opposite directions so that ions are urged in a first direction when traveling through the first 2D SLIM filter 200a (e.g., in the positive direction along the y-axis of FIG. 8) and in the opposite direction when traveling through the second 2D SLIM filter 200b (e.g., in the negative direction along the y-axis of FIG. 8).

In operation, ions can be introduced into the first 2D SLIM filter 200a, e.g., by the ionization source 102, where they will be influenced by the traveling wave applied to the segmented electrodes 206a-h, the RF waveform applied to the continuous electrodes 204a-f, and the DC gradient. The RF waveform maintains the ions between first and second surfaces of the first 2D SLIM filter 200a while the traveling wave and the DC gradient will cause the ions to travel along the first 2D SLIM filter 200 toward the SLIM ion transfer device portion 218 and the DC trap 220. Specifically, the traveling wave causes the ions to move along the z-axis, e.g., the propagation axis, while the DC gradient causes the ions to move along the y-axis.

As described in detail above, the ions will traverse the first 2D SLIM filter 200a in a distinct direction based on their individual mobilities as shown by the plurality of arrows in FIG. 8, which each correspond to an ion having a particular mobility. Accordingly, as shown in FIG. 8, the SLIM ion transfer device portion 218 can be arranged in series with the first 2D SLIM filter 200a at a position that corresponds to ions having a desired mobility so that those desired ions will pass into the SLIM ion transfer device portion 218, and be filtered from the feedstock, while the undesired ions are trapped by the DC trap 220. Ions having the specifically targeted mobility will traverse the first 2D SLIM filter 200a and enter the SLIM ion transfer device portion 218, which moves the ions along the z-axis of FIG. 8 to the second 2D SLIM filter 200b. The ions that enter the second 2D SLIM filter 200b are influenced by the traveling wave applied to the segmented electrodes 206a-h, the RF waveform applied to the continuous electrodes 204a-f, and the DC gradient, so that they travel along the arrow shown in FIG. 8, e.g., along the propagation axis (z-axis) and along the y-axis in the negative direction. Accordingly, multiple 2D SLIM filters can be connected by a SLIM ion transfer device portion 218 and a DC trap 220, such that the SLIM ion transfer device portion 218 and DC trap 220 function to filter ions by permitting ions of only a specific mobility to pass through.

Additionally, it is noted that the SLIM ion transfer device portion 218 can be used to cause ions to travel against a DC gradient such that the first 2D SLIM filter 200a and the second 2D SLIM filter 200b need not have different DC gradients, but instead the same electrical output can be used to generate the DC gradient for both the first 2D SLIM filter 200a and the second 2D SLIM filter 200b, e.g., similar to the embodiment illustrated in FIG. 6. This can be implemented, for example, by replacing the barrier 210 of FIG. 6 with the SLIM ion transfer device portion 218 and DC trap 220 of FIG. 8, such that the SLIM ion transfer device portion 218 and DC trap 220 are positioned between the 2D SLIM filters 200, 200'. In such a configuration, the DC trap 220 would replace the barrier 210, while the ion transfer device portion 218 would replace the orifice 212 and would be arranged such that the traveling wave of the SLIM ion transfer device portion 218 travels perpendicular (e.g., along the y-axis of FIG. 6) to the traveling waves of the 2D SLIM filters 200, 200'. Thus, the DC trap 220 would eliminate any undesired ions, while the SLIM ion transfer device portion 218 would receive the desired ions and transfer them from the first 2D slim filter 200 to the second 2D slim filter 200'.

Moreover, the second 2D SLIM filter 200a can be connected in series with another SLIM ion transfer device portion 218 and a second DC trap 220 to further filter the ions and increase the filtering resolution, e.g., similar to the configuration of FIG. 6 where two barriers 210, 210' were used in series to filter an ion stream. Additionally and/or alternatively, the second 2D SLIM filter 200a can be connected with another component such as a detection device, e.g., the detection devices 106a, 106b shown in FIG. 1. Accordingly, it should be understood that several 2D SLIM filters can be chained together sequentially with one or more SLIM ion transfer devices, SLIM ion transfer device portions, DC traps, barriers, etc.

Figure 9:
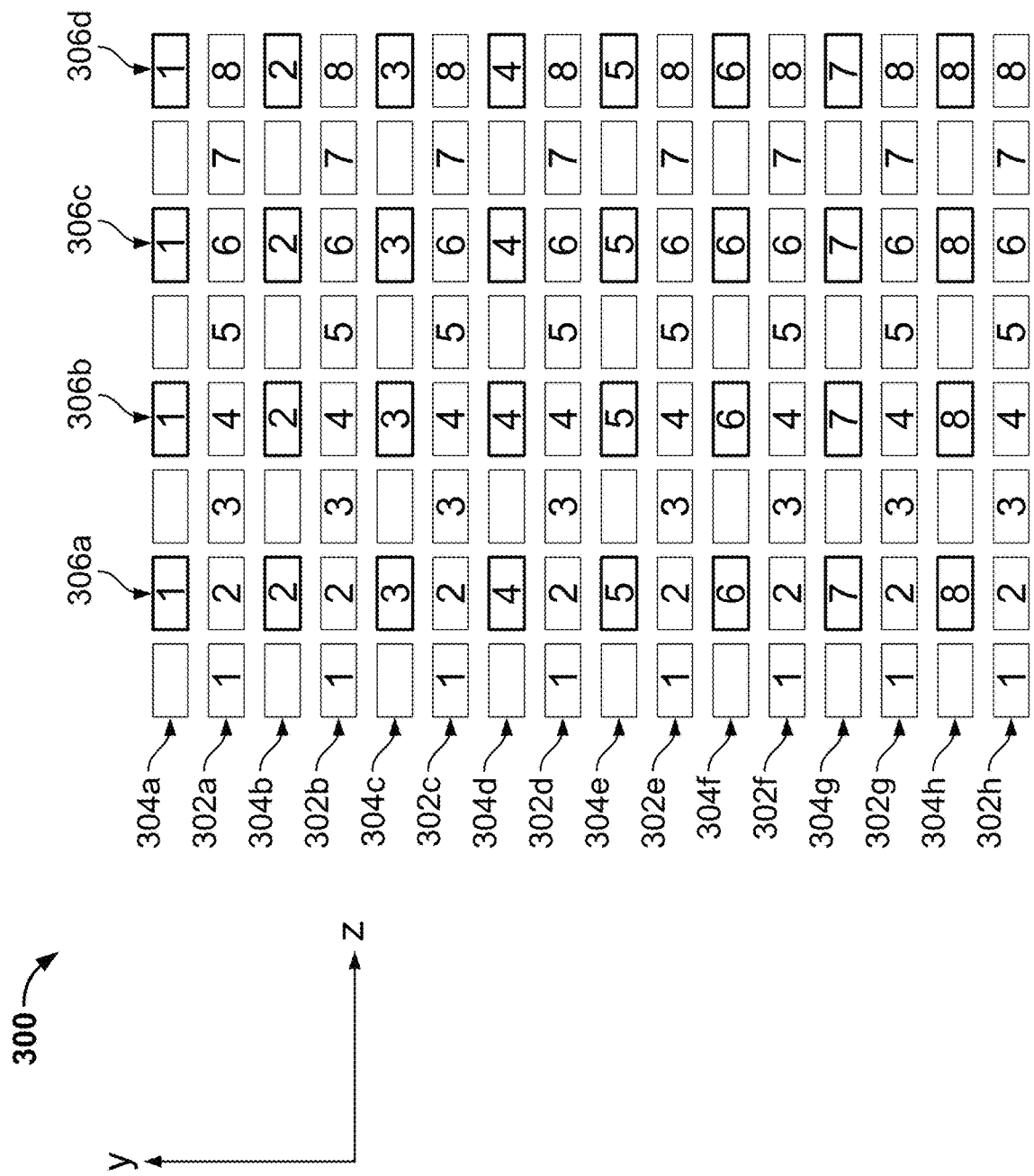
FIG. 9 is a schematic diagram illustrating an exemplary arrangement of electrodes of an electrode array for implementation with the 2D SLIM filter of the present disclosure.
Figure 10:
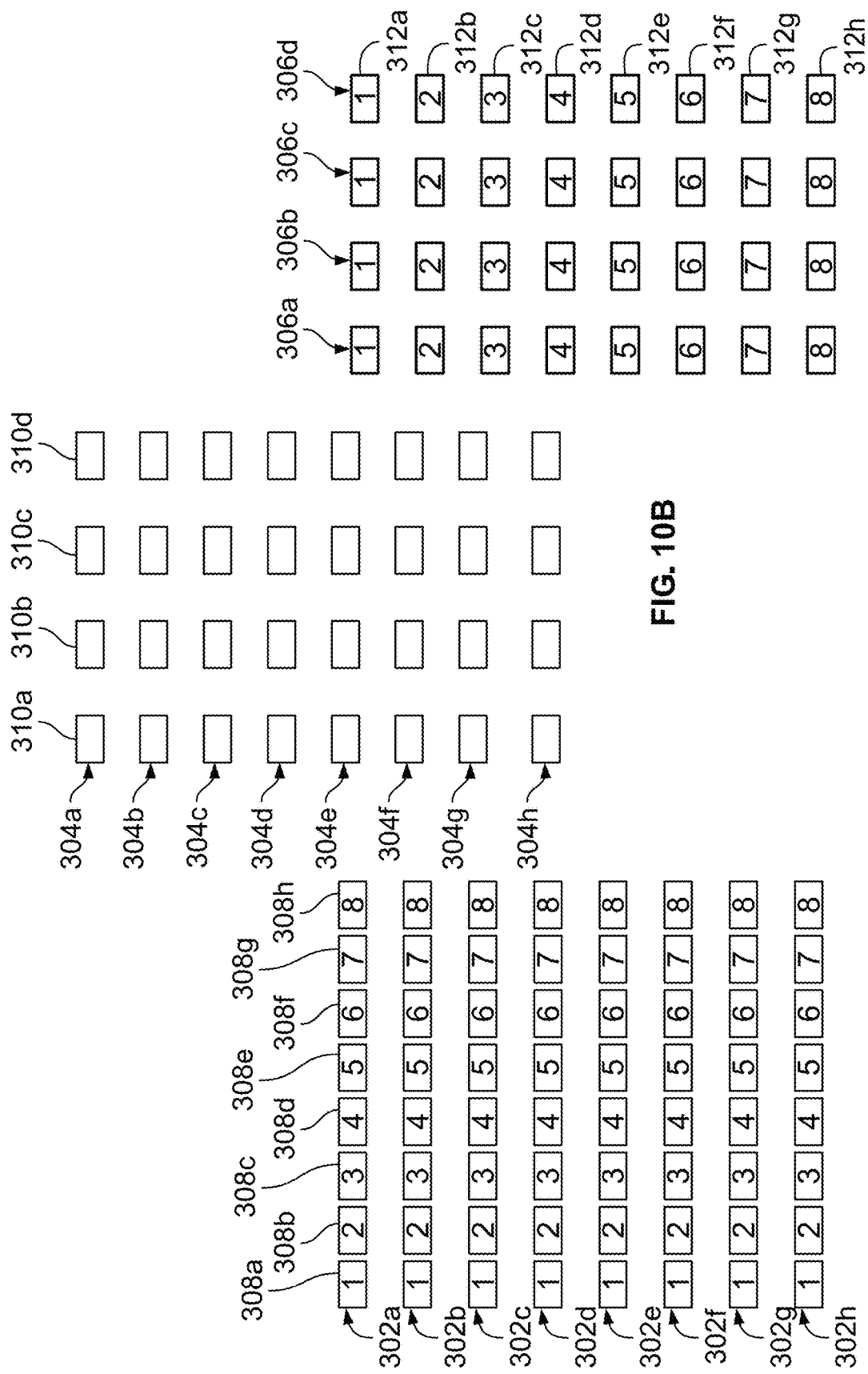
FIG. 10A is a schematic diagram illustrating a plurality of segmented traveling wave (TW) electrode rows of the electrode array of FIG. 9.
FIG. 10B is a schematic diagram illustrating a plurality of segmented radio frequency (RF) electrode rows of the electrode array of FIG. 9.
FIG. 10C is a schematic diagram illustrating a plurality of TW electrode columns of the electrode array of FIG. 9.

FIG. 9 is schematic diagram illustrating an exemplary arrangement of electrodes for implementation with the 2D SLIM filter of the present disclosure. That is, FIG. 9 illustrates an exemplary electrode array 300 that can be implemented on the first and second surfaces 202a, 202b of the 2D SLIM filter 200. The electrode array 300 can include a plurality of segmented TW electrode rows 302a-h (e.g., eight rows), a plurality of segmented RF electrode rows 304a-h (e.g., eight rows), and a plurality of TW electrode columns 306a-d (e.g., four columns). However, it should be understood that the electrode array 300 can include more or less than the number of segmented TW electrode rows, segmented RF electrode rows, or TW electrode columns illustrated in FIG. 9. FIG. 10A illustrates the plurality of segmented TW electrode rows 302a-h separated from the remainder of the electrode array 300 of FIG. 9. FIG. 10B illustrates the plurality of segmented RF electrode rows 304a-h separated from the remainder of the electrode array 300 of FIG. 9. FIG. 10C illustrates the plurality of TW electrode columns 306a-d separated from the remainder of the electrode array 300 of FIG. 9.

Each of the plurality of segmented TW electrode rows 302a-h includes a plurality of individual TW electrodes 308a-h (e.g., eight electrodes), and can function substantially in accordance with the plurality of segmented electrodes 206a-j described in connection with FIG. 5. That is, the segmented TW electrode rows 302a-h can be traveling wave (TW) electrodes such that each of the individual TW electrodes 308a-h of each segmented TW electrode row 302a-h receives a voltage signal that is simultaneously applied to all individual TW electrodes 308a-h, but phase shifted between adjacent TW electrodes 308a-h along the z-axis. However, the same individual electrodes, e.g., the first individual TW electrode 308a, of the segmented TW electrode rows 302a-h receive the same voltage signal without phase shifting. Accordingly, the segmented TW electrode rows 302a-h function to drive ions along a first propagation axis, e.g., along the z-axis of FIG. 9. Each of the plurality of segmented TW electrode rows 302a-h can be spaced apart from an adjacent row and configured to receive a row of electrodes there between, e.g., one of the segmented RF electrode rows 304a-h.

Each of the plurality of segmented RF electrode rows 304a-h includes a plurality of individual RF electrodes 310a-d (e.g., four), and can function substantially in accordance with the continuous electrodes 204a-k shown and described in connection with FIGS. 4-6. That is, each of the plurality of individual RF electrodes 310a-d of each segmented RF electrode row 304a-h can receive RF voltage (or current) signals, or can be connected to ground potential, and can generate a pseudopotential that can prevent or inhibit ions from approaching the surface on which they are mounted. The RF voltage applied to adjacent segmented RF electrode rows 304a-h can be 180° out of phase, respectively. That is, for example, each of the individual RF electrodes 310a-d of the first segmented RF electrode row 304a can receive an RF voltage waveform, and each of the individual RF electrodes 310a-d of the second segmented RF electrode row 304b can receive the same RF waveform but phase shifted by 180°. Accordingly, the individual RF electrodes 310a-d of the first segmented RF electrode row 304a can have a positive RF signal, while the individual RF electrodes 310a-d of the second segmented RF electrode row 304b can have a negative RF signal. Each of the plurality of segmented RF electrode rows 304a-h can be spaced apart from an adjacent row and configured to receive a row of electrodes there between, e.g., one of the segmented TW electrode rows 302a-h. Additionally, each of the individual RF electrodes 310a-d of each RF electrode row 304a-h can be spaced apart from an adjacent RF electrode 310a-d and configured to receive an electrode there between, e.g., one of the electrodes of the TW electrode columns 306a-d.

Each of the plurality of segmented TW electrode columns 306a-d includes a plurality of individual TW electrodes 312a-h (e.g., eight electrodes), and can function substantially in accordance with the plurality of segmented electrodes 206a-j shown and described in connection with FIGS. 4-6. That is, the segmented TW electrode columns 306a-d can be traveling wave (TW) electrodes such that each of the individual TW electrodes 312a-h of each segmented TW electrode column 306a-d receives a voltage signal that is simultaneously applied to all individual TW electrodes 310a-h, but phase shifted between adjacent TW electrodes 310a-h along the y-axis. However, the same individual electrodes, e.g., the first individual TW electrode 310a, of the segmented TW electrode columns 306a-d receive the same voltage signal without phase shifting. Accordingly, the segmented TW electrode columns 306a-d function to drive ions along a second propagation axis, e.g., along the y-axis of FIG. 9, that is perpendicular to the first propagation axis. Each of the plurality of segmented TW electrode columns 306a-d can be spaced apart from an adjacent column and configured to be placed between the individual RF electrodes 310a-d of each segmented RF electrode row 304a-h, as shown in FIG. 9. Additionally, each of the individual TW electrodes 312a-h of each segmented TW electrode column 306a-d can be spaced apart from an adjacent TW electrode 312a-h and configured to receive one of the segmented TW electrode rows 302a-h there between, as shown in FIG. 9.

Accordingly, the electrode array 300 of FIG. 9 is arranged with a first row having alternating RF electrodes and TW electrodes, a second row having TW electrodes, a third row having alternating RF electrodes and TW electrodes, a fourth row having TW electrodes, etc. In this configuration, the plurality of segmented TW electrode rows 302a-h function to drive ions along the first propagation axis, e.g., the z-axis of FIG. 9, the plurality of segmented TW electrode columns 306a-d function to drive ions along the second propagation axis, e.g., the y-axis of FIG. 9, and the plurality of segmented RF electrode rows 304a-h function to prevent or inhibit ions from approaching the surface on which the electrode array 300 is mounted. Accordingly, specific waveforms, e.g., having a specific periodicity and/or amplitude, can be applied to the RF electrode rows 304a-h and the RF electrode columns 304a-d to cause ions of different mobilities to move along different paths, as described in greater detail above. In doing so, the electrode array 300 can be combined with a barrier having an orifice therein, or a SLIM filter and DC trap, so that it can be implemented as a 2D SLIM filter for filtering ions of a certain mobility.

Figure 11:
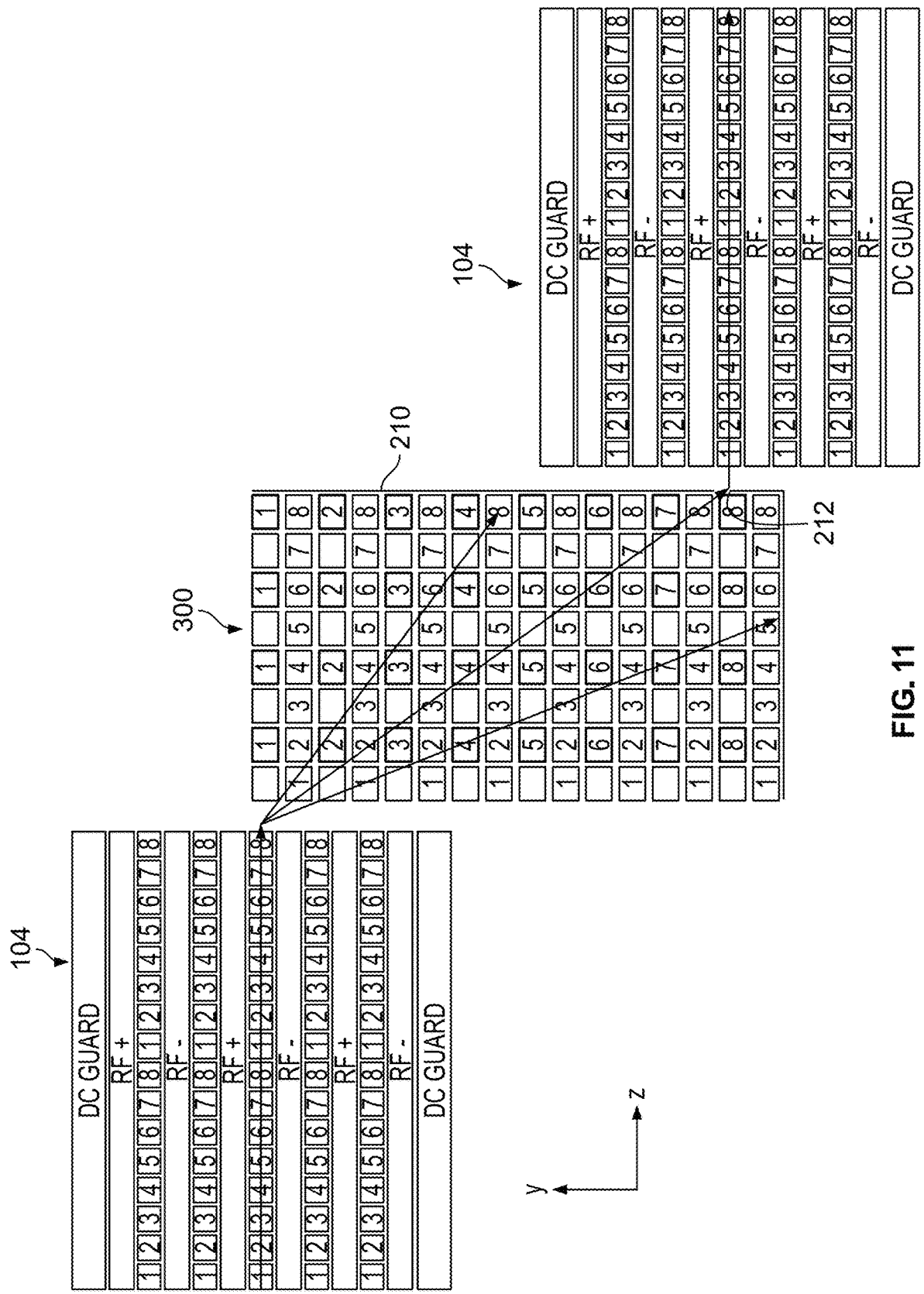
FIG. 11 is a schematic diagram showing the electrode array of FIG. 9 in combination with multiple SLIM ion transfer devices.

For example, the electrode array 300 can be implemented in a 2D SLIM filter and combined with one or more SLIM ion transfer devices 104, as shown in FIG. 11, which is a schematic diagram showing the electrode array 300 in combination with two SLIM ion transfer devices 104 and a barrier 210 having an orifice 212. It should be understood that the electrode array 300 can be expanded as necessary.

FIG. 12A is a schematic diagram illustrating another exemplary arrangement of electrodes of an electrode array 316 for implementation with the 2D SLIM filter 200 of the present disclosure. For example, the electrode array 316 has an alternative geometry and configuration than the electrode array 300 shown in FIG. 9, and can be used in place thereof. The electrode array 316 can include a plurality of segmented TW electrode rows 318a-c (three rows are shown, however, this can be increased to any desired number of rows, e.g., eight rows, sixteen rows, etc.), a plurality of segmented RF electrode rows 320a-g (seven rows are shown, however, this can be increased to any desired number of rows, e.g., nine rows, seventeen rows, etc.), and a plurality of TW electrode columns 322a-b (two columns are shown, however, this can be increased to any desired number of columns, e.g., five columns, ten columns, etc.). However, it should be understood that the electrode array 316 can include more or less than the number of segmented TW electrode rows, segmented RF electrode rows, or TW electrode columns illustrated in FIG. 12A. The electrode array 316 of FIG. 12A can be similar to the electrode array 300 shown in FIG. 9, but with additional segmented RF electrode rows 320a-g that are positioned between individual traveling wave electrodes of the traveling wave electrode rows 318a-c. FIG. 12B illustrates the plurality of segmented TW electrode rows 318a-c separated from the remainder of the electrode array 316 of FIG. 12A. FIG. 12C illustrates the plurality of segmented RF electrode rows 330a-g separated from the remainder of the electrode array 316 of FIG. 12A. FIG. 12D illustrates the plurality of TW electrode columns 322a-b separated from the remainder of the electrode array 316 of FIG. 12A.

Each of the plurality of segmented TW electrode rows 318a-c includes a plurality of individual TW electrodes 324a-c (three electrodes are illustrated, however, more individual electrodes can be utilized, e.g., eight), and can function substantially in accordance with the individual TW electrodes 308a-h described in connection with FIGS. 9 and 10A, and need not be described in further detail. Each of the plurality of segmented TW electrode rows 318a-c can be spaced apart from an adjacent row and configured to receive a row of electrodes there between, e.g., one of the segmented RF electrode rows 320a-g.

Each of the plurality of segmented RF electrode rows 320a-g includes a plurality of individual RF electrodes 326a-e. For example, the first, third, fifth, and seventh segmented RF electrode rows 320, 320c, 320f, 320g can include three individual RF electrodes 326a, 326c, 326e, and the second, fourth, and sixth RF electrode rows 320b, 320d, 320f can include two individual RF electrodes 326b, 326d. The segmented RF electrode rows 320a-g can function substantially in accordance with the segmented electrode rows 304a-h of FIGS. 9 and 10B, and need not be described in further detail. Similarly, the individual RF electrodes 326a-e can function substantially in accordance with the individual RF electrodes 310a-d shown and described in connection with FIGS. 9 and 10B, and need not be described in further detail. Each of the individual electrodes 326a-e of the segmented RF electrode rows 320a-g can be arranged in alternating fashion with a space between subsequent RF electrodes 326a-e. That is, each of the individual RF electrodes 326a-e of each RF electrode row 320a-g can be spaced apart from the adjacent RF electrode 326a-e and configured to receive an electrode there between, e.g., one of the individual electrodes of the TW electrode rows 318a-c or one of the individual electrodes of the TW electrode columns 322a-b, and each of the RF electrode rows 320a-g can be shifted one space relative to the subsequent RF electrode row 320a-g to create an alternating electrode pattern in each column with the spaces configured to receive an electrode, e.g., one of the individual electrodes of the TW electrode rows 318a-c or one of the individual electrodes of the TW electrode columns 322a-b.

Each of the plurality of segmented TW electrode columns 322a-b includes a plurality of individual TW electrodes 328a-d (four electrodes are illustrated, however, more individual electrodes can be utilized, e.g., eight), and can function substantially in accordance with the individual TW electrodes 312a-h shown and described in connection with FIGS. 9 and 10C, and need not be described in further detail. Each of the individual TW electrodes 328a-d of each segmented TW electrode column 322a-b can be spaced apart from an adjacent TW electrode 328a-d and be configured to receive one of the segmented RF electrode rows 320a-g there between, as shown in FIG. 12A.

Accordingly, the electrode array 316 of FIG. 12A is arranged with a first row having alternating RF electrodes and TW electrodes, a second row having alternating TW electrodes and RF electrodes, a third row having alternating RF electrodes and TW electrodes, a fourth row having alternating TW electrodes and RF electrodes, etc. In this configuration, the plurality of segmented TW electrode rows 318a-c function to drive ions along the first propagation axis, e.g., the z-axis of FIG. 12A, the plurality of segmented TW electrode columns 322a-b function to drive ions along the second propagation axis, e.g., the y-axis of FIG. 12A, and the plurality of segmented RF electrode rows 320a-g function to prevent or inhibit ions from approaching the surface on which the electrode array 316 is mounted. Accordingly, specific waveforms, e.g., having a specific periodicity and/or amplitude, can be applied to the RF electrode rows 320a-g and the RF electrode columns 322a-b to cause ions of different mobilities to move along different paths, as described in greater detail above. In doing so, the electrode array 316 can be combined with a barrier having an orifice therein, or a SLIM ion transfer device and DC trap, so that it can be implemented as a 2D SLIM filter for filtering ions of a certain mobility. For example, the electrode array 316 can be implemented in a 2D SLIM filter and combined with one or more SLIM ion transfer devices 104. The electrode geometry and configuration of the electrode array 316 of FIG. 12A provides greater symmetry which can improve trapping performance.

Accordingly, it should be understood that the arrangement of electrodes of the electrode arrays 300, 316 illustrated in FIGS. 9, 10A-10C, and 12A-D can be implemented and used with a wide variety of ion mobility devices including, but not limited to, the SLIM ion transfer device 104 and 2D SLIM filters 200, 400, 500 of the present disclosure. For example, the electrode arrays 300, 316 can be implemented with ion mobility devices, e.g., SLIM devices, that are configured to transfer ions, separate ions based on mobility, filter ions, compress ions, etc., or any combination of the foregoing. Moreover, the segmented RF electrode rows 304a-h, 320a-g shown in FIGS. 10B and 12C can be implemented in isolation in the foregoing SLIM devices. That is, the segmented RF electrode rows 304a-h, 320a-g can be used in place of the first plurality of RF electrodes 120, 125 of the SLIM ion transfer device 104 (e.g., FIG. 3), the plurality of continuous electrodes 204a-k of the 2D SLIM filter 200 (e.g., FIGS. 2 and 3), and the plurality of continuous electrodes 408a-k of the 2D SLIM filters 400, 500 (e.g., FIGS. 13-17). Furthermore, the segmented RF electrode rows 304a-h, 320a-g can be used in place of the first plurality of RF electrodes 120, 125 of the SLIM ion transfer device 104 (e.g., FIG. 3) when the SLIM ion transfer device 104 is used in any mode of operation, e.g., as an ion transfer device, as an ion separation device, etc. Accordingly, the arrangement of electrodes of the electrode arrays 300, 316 illustrated in FIGS. 9, 10A-10C, and 12A-D, and the segmented RF electrode rows 304a-h, 320a-g thereof, have a broad range of applicability that includes at least all of the SLIM devices and filters of the present disclosure.

Figure 13:
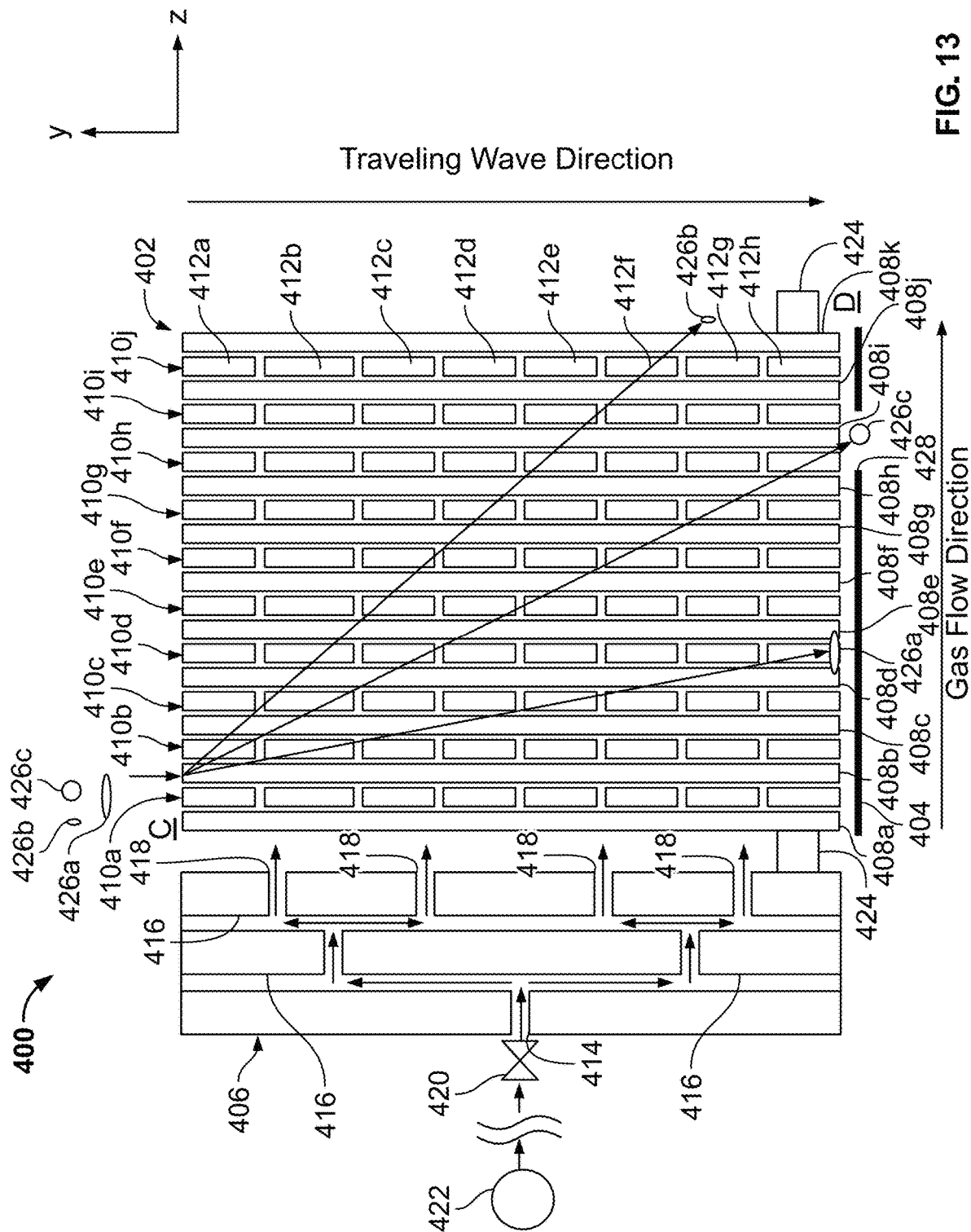
FIG. 13 is a schematic diagram illustrating another embodiment of a 2D SLIM filter of the present disclosure.

FIG. 13 is a schematic diagram illustrating another embodiment of a 2D SLIM filter 400. The 2D SLIM filter 400 illustrated in FIG. 13 includes an electrode array 402, a barrier 404, and a gas diffuser 406. The electrode array 402 is generally disposed on first and second surfaces that are positioned parallel to each other, e.g., such as the first and second surfaces 202a, 202b of the 2D SLIM filter 200 shown and discussed in connection with FIGS. 4-6. The electrode array 402 include a plurality of continuous electrodes 408a-k, e.g., RF electrodes, and a plurality of segmented electrode arrays 410a-j arranged in generally alternating columns. The plurality of continuous electrodes 408a-k can be formed and function substantially in accordance with the plurality of continuous electrodes 204a-k shown and described in connection with FIGS. 4-6. Accordingly, the plurality of continuous electrodes 408a-k can receive RF voltage (or current) signals, or can be connected to ground potential, and can generate a pseudopotential that can prevent or inhibit ions from approaching the surface on which they are mounted. The RF voltage applied to adjacent continuous electrodes 408a-k can be 180° out of phase, respectively. Similarly, the plurality of segmented electrode arrays 410a-j can be formed and function substantially in accordance with the plurality of segmented electrode arrays 206a-j. Accordingly, the plurality of segmented electrode arrays 410a-j can include a plurality of individual electrodes 412a-h. The plurality of segmented electrode arrays 410a-j can be traveling wave (TW) electrodes such that each of the individual electrodes 412a-h thereof receives a voltage signal that is simultaneously applied to all individual electrodes 412a-h, but phase shifted between adjacent electrodes 412a-h along the y-axis of FIG. 13. However, the same individual electrodes, e.g., the first individual electrode 412a, of the segmented electrode arrays 410a-j receive the same voltage signal without phase shifting. Accordingly, the segmented electrode arrays 410a-j function to drive ions 426a-c along a propagation axis, e.g., along the y-axis of FIG. 13, toward the barrier 404.

The gas diffuser 406 is generally positioned adjacent the electrode array 402 and configured to discharge gas to flow in a direction perpendicular to the propagation axis, e.g., to flow along the z-axis of FIG. 13. The gas diffuser 406 generally includes an inlet 414, a plurality of internal channels 416, a plurality of outlets 418, and a valve 420. Gas, e.g., nitrogen, is provided by a gas source 422 to the valve 420, which controls the flow of gas to the inlet 414 of the gas diffuser 406. The valve 420 can be automatically controlled, e.g., by the controller 108 of FIG. 1. The inlet 414 is in fluidic communication with the internal channels 416 and the plurality of outlets 418, such that gas flows into the inlet 414, through the internal channels 416, and out of the plurality of outlets 418 into the 2D SLIM filter 400, e.g., within an ion channel between the first and second surfaces. This configuration generally normalizes the flow through the diffuser 406, and thus provides a laminar flow across the electrode array 402. The 2D SLIM filter 400 can also include a plurality of pressure sensors 424 that can be connected to the controller 108 of FIG. 1. The pressure sensors 424 can measure a pressure/vacuum level in the ion channel between the first and second surfaces and transmit that measurement to the controller 108. The controller 108 can analyze the pressure/vacuum measurement and adjust the valve 420 accordingly. Alternatively, the controller 108 can adjust the speed of an associated pump based on the pressure-vacuum measurement in order to adjust the flow rate at which the pump removes the gas. The gas flow across the electrode array 402 causes the ions 426a-c to move in the direction of gas flow, e.g., along the z-axis. As the ions 426a-c move along the z-axis they will be subject to the influences of the gas and the electric fields, which, as noted above, will cause the ions 426a-c to move at different speeds based on their mobility. Thus, the ions 426a-c will move diagonally, as shown in FIG. 13, as opposed to in straight paths parallel to the y-axis like in the typical SLIM ion transfer device 104. This allows for ions having a specific ion mobility to be filtered from a feedstock.

In operation, the ions 426a-c can be introduced by the ionization source 102 into the 2D SLIM filter 400 at the leading edge thereof, e.g., adjacent Point C of FIG. 13. The ionization source 102 can provide a homogenous feedstock containing the ions 426a-c, though this is not required. As the ions 426a-c are introduced into the 2D SLIM filter 400, they will be influenced by the traveling wave applied to the individual electrodes 412a-h, the RF waveform applied to the continuous electrodes 408a-k, and the gas flow within the ion channel. The RF waveform maintains the ions 426a-c between the first and second surfaces, while the traveling wave and the gas flow will cause the ions 426a-c to travel along the 2D SLIM filter 400 toward the barrier 404, as discussed in detail above. Specifically, the traveling wave causes the ions 426a-c to move along the y-axis, e.g., the propagation axis, while the gas flow causes the ions 426a-c to move along the z-axis.

As shown in FIG. 13, each of the ions 426a-c will move in a distinct direction based on their individual mobilities. Accordingly, an orifice 428 can be positioned in the barrier 404 at a position that corresponds to desired ions, e.g., the third ion 426c, having a specific mobility so that those desired ions will pass through the orifice 428 and be filtered from the feedstock, while the undesired ions, e.g., the first and second ions 426a, 426b, are neutralized, e.g., by contacting the barrier 404 or a side wall of the 2D SLIM filter 400. That is, the location of the orifice 428 in the barrier 404 can be based on the traveling wave signal applied to the individual electrodes 412a-h, the gas flow between the first and second surfaces, and the mobility of the desired ion, among other considerations. Thus, the orifice 428 can be positioned so that only ions having the desired mobility will fully traverse and exit the 2D SLIM filter 400 through the orifice 428. This allows for ions of a specific mobility to be targeted and filtered from a feedstock and directed to a detector (e.g., one of the first and second detectors 106a, 106b) for detection. Additionally, it should be understood that a typical SLIM ion transfer device 104 can be placed adjacent and coupled to the orifice 428 (see, e.g., FIG. 7) so that the ions 426c exiting the 2D SLIM filter 400 through the orifice 428 can be moved for further processing or detection, e.g., the SLIM ion transfer device 104 can direct the ions 426c to a detection device or another mass spectrometry device such as a QTOF or QQQ system. It should also be understood that instead of the barrier 404, a DC trap and SLIM filter or SLIM filter portion can be implemented.

Figure 14:
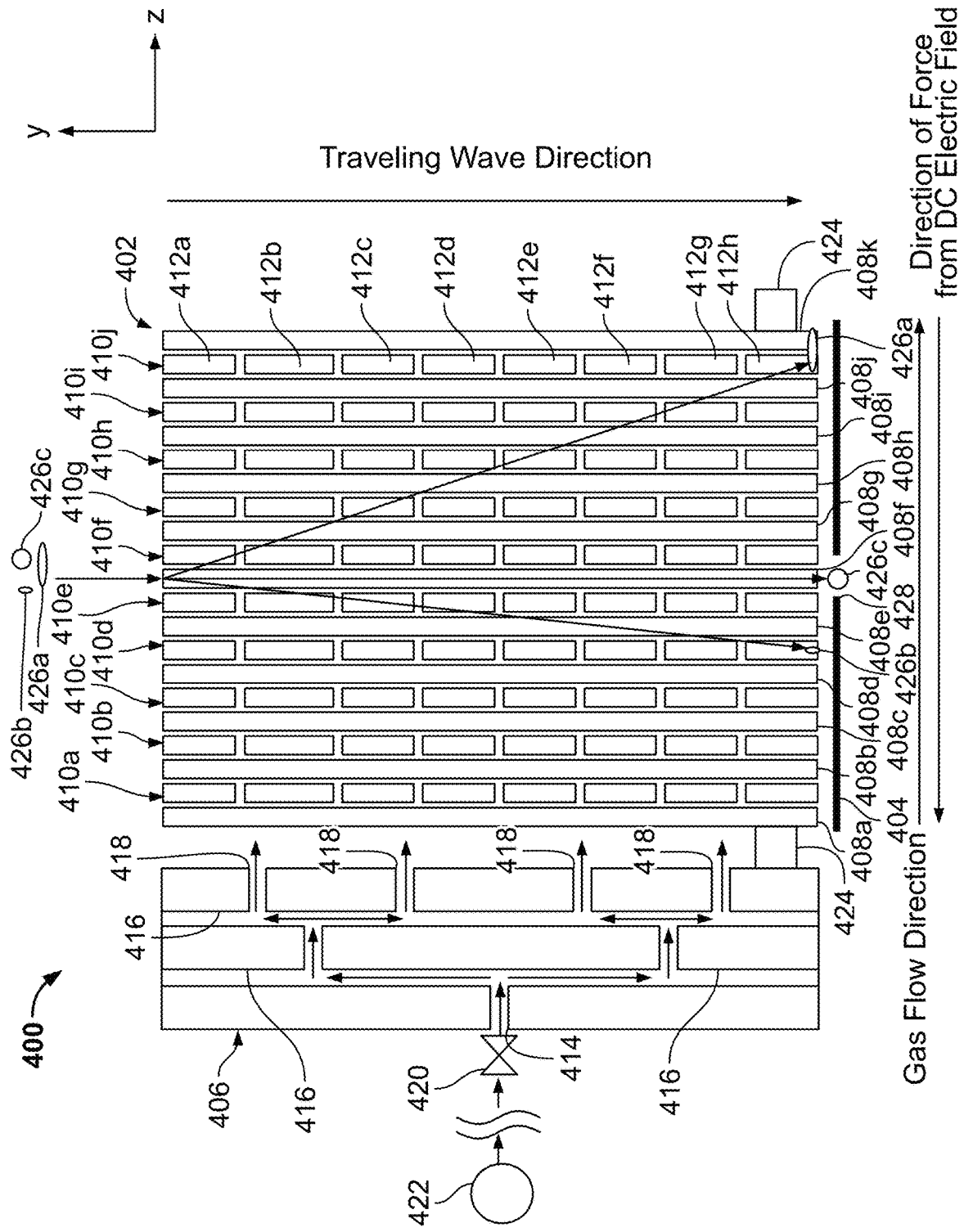
FIG. 14 is a schematic diagram illustrating the 2D SLIM filter of FIG. 13 with a DC gradient applied thereto.

FIG. 14 is a schematic diagram illustrating the 2D SLIM filter 400 of FIG. 13 with a DC gradient applied thereto to filter ions of interest. That is, FIG. 14 illustrates a 2D SLIM filter embodiment in which ions can be filtered based on their interaction with both a DC gradient and a gas flow.

As shown in FIG. 14, the 2D SLIM filter 400 can also have a DC gradient applied along the z-axis. For example, the controller 108 can apply a DC gradient to the plurality of continuous electrodes 408a-k and the plurality of segmented electrode arrays 410a-j to cause a potential difference in each of the RF electrodes, e.g., the plurality of continuous electrodes 408a-k, and in each of the plurality of segmented electrode arrays 410a-j, thus forming a DC field having a potential energy with respect to the ions 426a-c that decreases along the z-axis, as shown in FIG. 14. This can be done in similar fashion to the embodiments shown in, and discussed in connection with, FIGS. 4-11, for example. More specifically, where the ions 426a-c are positively charged the DC amplitude would be configured to decrease along the z-axis, whereas for negatively charged ions 426a-c the DC amplitude would be configured to increase along the z-axis.

As the ions 426a-c move along the y-axis, they will be subject to influences of the gas and the electric fields (e.g., the DC gradient, the RF waveform, the traveling wave, etc.), which, as noted above, will cause the ions 426a-c to move at different speeds based on their mobility. Specifically, the DC field influences and urges the ions 426a-c to move in the direction of decreasing potential energy with respect to the ions 426a-c, e.g., along the z-axis in the negative direction, while the gas flow causes the ions 426a-c to move along the z-axis in the positive direction. For example, where the ions 426a-c are positively charged the DC amplitude would be configured to decrease along the z-axis, whereas for negatively charged ions 426a-c the DC amplitude would be configured to increase along the z-axis. In this arrangement, the applied DC amplitude would have a decreasing potential energy for the respective ions 426a-c and would thus cause the ions to move in the direction of the decreasing potential energy. That is, the influence of the gas flow and the influence of the DC field oppose each other. Thus, the ions 214a-c will move in the specific paths shown in FIG. 14. This allows for ions having a specific ion mobility to be filtered from a feedstock. For example, the magnitude of the gas flow and the DC field can be specifically selected so that ions having the desired mobility, e.g., the third ion 426c, flow in a straight trajectory along the y-axis toward the orifice 428 in the barrier 404, while undesired ions, e.g., the first and second ions 426a, 426b, flow toward the barrier 404, which they ultimately contact. Thus, ions having the targeted mobility are filtered from the feedstock as they pass through the orifice 428, after which point they can be directed to a detector (e.g., one of the first and second detectors 106a, 106b) for detection.

Figure 15:
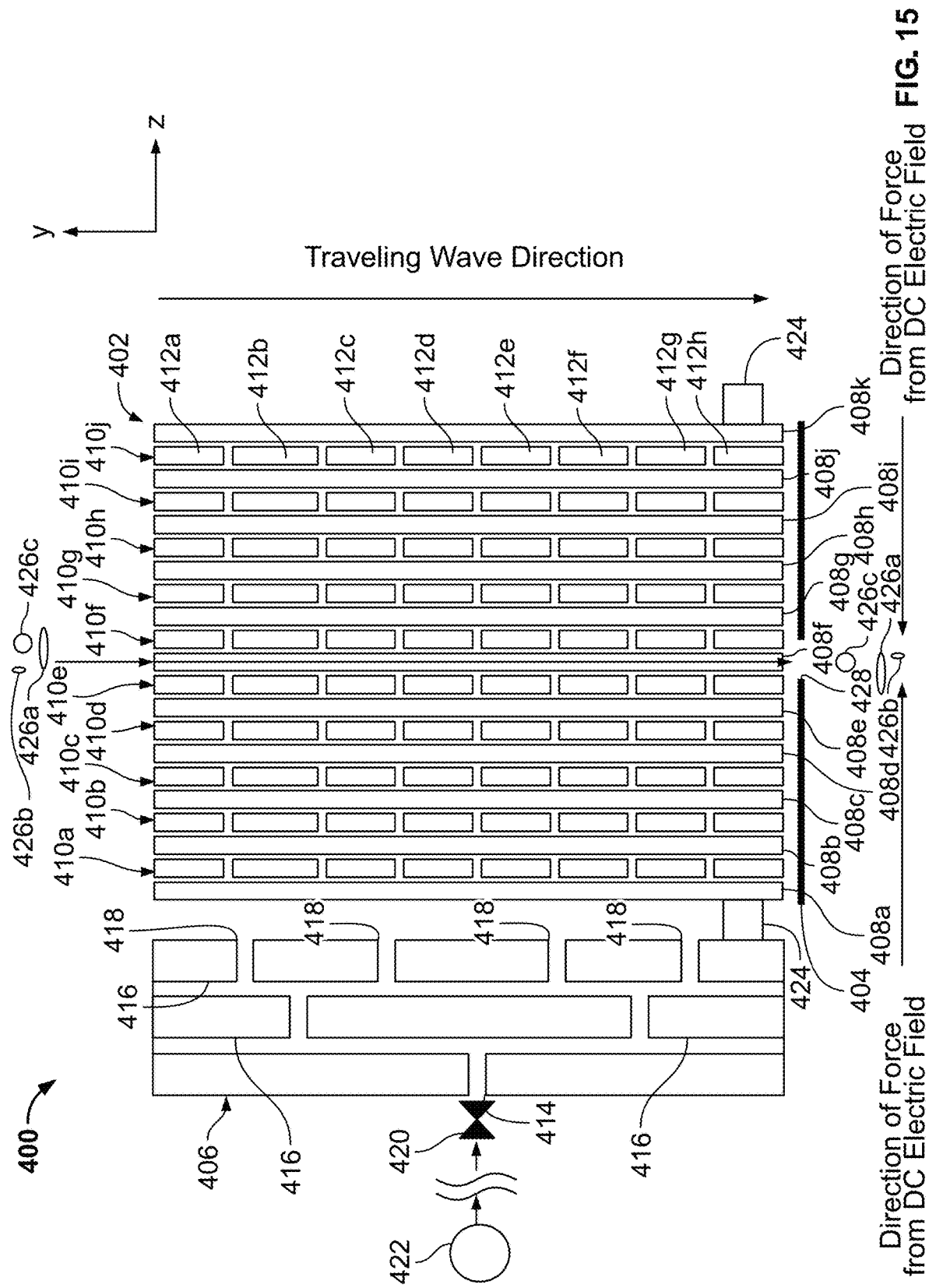
FIG. 15 is a schematic diagram illustrating the 2D SLIM filter of FIG. 14 in an ion transmission mode of operation.

FIG. 15 is a schematic diagram illustrating the 2D SLIM filter 400 of FIG. 14 in an ion transmission mode of operation. In particular, FIG. 15 illustrates the 2D SLIM filter 400 of FIG. 14 with no gas flow and with a split DC gradient applied thereto to transmit all ions, as opposed to filtering ions. To operate the 2D SLIM filter 400 in the ion transmission mode, the controller 108 turns off the gas flow through the gas manifold 406 and applies a split DC gradient along the z-axis of the 2D SLIM filter 400. For example, the controller 108 can apply a DC gradient to the plurality of continuous electrodes 408a-k and the plurality of segmented electrode arrays 410a-j to cause a potential difference in each of the RF electrodes, e.g., the plurality of continuous electrodes 408a-k, and in each of the plurality of segmented electrode arrays 410a-j, thus forming a DC field. However, the DC gradient can be split between the plurality of continuous electrodes 408a-k and the plurality of segmented electrode arrays 410a-j so that the DC field has a low point in the center of the 2D SLIM filter 400 aligned with the orifice 428, e.g., the DC field can have an amplitude that decreases to a low point in the center of the 2D slim filter 400, as shown in FIG. 15.

To achieve the split DC gradient, the controller 108 can provide a first DC gradient to the first, second, third, fourth, and fifth segmented electrode arrays 410a-e and the first, second, third, fourth, and fifth continuous electrodes 408a-e, and a second DC gradient to the sixth, seventh, eighth, ninth, and tenth segmented electrode arrays 410f-j and the seventh, eighth, ninth, tenth, and eleventh continuous electrodes 408g-k. The first DC gradient can form a DC field having an amplitude that decreases along the positive z-axis to a low point adjacent the center of the 2D SLIM filter 400, e.g., the DC field decreases in amplitude from the first continuous electrode 408a to the fifth continuous electrode 408e. The second DC gradient can form a DC field having an amplitude that decreases along the negative z-axis to a low point adjacent the center of the 2D SLIM filter 400, e.g., the DC field decreases in amplitude from the eleventh continuous electrode 408k to the seventh continuous electrode 408g.

The split DC field causes the ions 426a-c to move in the direction of the lowest DC amplitude or stay in the location of the lowest DC amplitude, e.g., at the center of the 2D SLIM filter 400. As the ions 426a-c move along the y-axis, e.g., due to the travelling wave applied to the segmented electrode arrays 410a-j, they will be subject to influences of the split DC field, which, as noted above, will cause the ions 426a-c to stay in the center of the 2D SLIM filter. Thus, the ions 426a-c will move in a straight path, as shown in FIG. 15, as they are transmitted across the 2D SLIM filter 400.

It is noted that while the foregoing transmission mode of operation is discussed in connection with a 2D SLIM filter 400 that includes a gas manifold and turning off the flow of gas, such can be implemented with a 2D SLIM filter that does not introduce a flow of gas to influence the flow of ions, e.g., the 2D SLIM filter 200 shown and described in connection with FIGS. 4-6.

Figure 16:
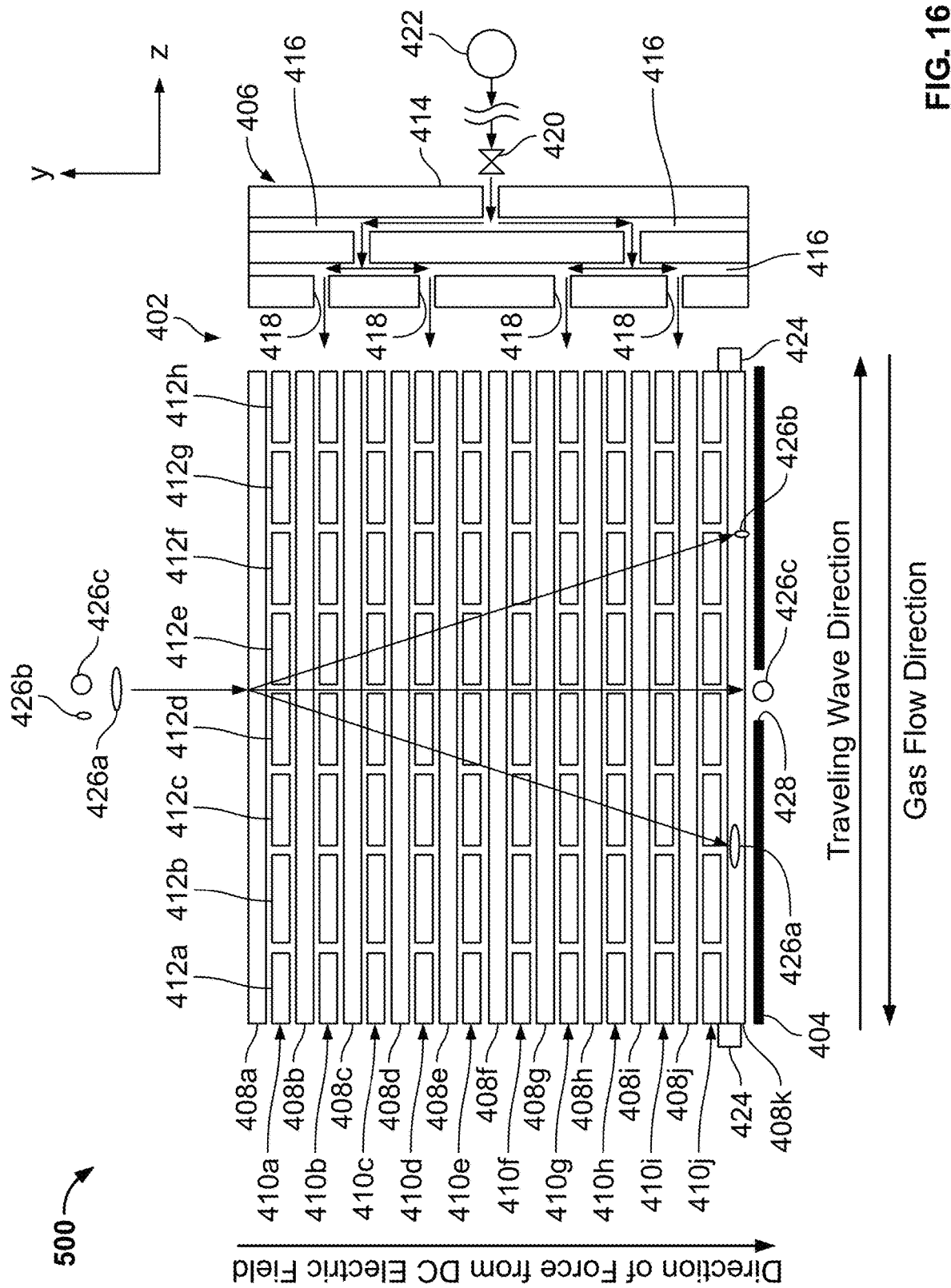
FIG. 16 is a schematic diagram illustrating another embodiment of a 2D SLIM filter of the present disclosure configured to filter ions based on an interaction of gas flow and a traveling wave.

FIG. 16 is a schematic diagram illustrating another embodiment of a 2D SLIM filter 500 configured to filter ions 426a-c based on an interaction of gas flow and a traveling wave. The 2D SLIM filter 500 of FIG. 16 includes the electrode array 402, the barrier 404, and the gas manifold 406 of FIG. 13, but with the electrode array 402 rotated 90 degrees such that the gas manifold 406 is positioned adjacent the alternating rows of continuous electrodes 408a-k and segmented electrode arrays 410a-j. Accordingly, the gas introduced into the 2D SLIM filter 500 by the gas manifold 406 flows along the same axis as the traveling wave, though in the opposite direction.

As shown in FIG. 16, the 2D SLIM filter 500 has a gas flow applied along the z-axis in the negative direction, a traveling wave applied along the z-axis in the positive direction, and a DC gradient applied along the y-axis with the amplitude decreasing in the negative direction of the y-axis. For example, the controller 108 can apply a traveling wave to the plurality of segmented electrode arrays 410a-j, apply a DC gradient to the plurality of continuous electrodes 408a-k and the plurality of segmented electrode arrays 410a-j to form a DC field having an amplitude that decreases along the z-axis, and control the gas valve 420 to adjust the flow of gas entering the 2D SLIM filter 500 from the gas manifold 406.

Accordingly, as the ions 426a-c are introduced into the 2D SLIM filter 500, they are subject to influences of the gas and the electric fields (e.g., the DC gradient, the RF waveform, the traveling wave, etc.), which, as noted above, will cause the ions 426a-c to move at different speeds based on their mobility. Specifically, the DC field causes the ions 426a-c to move in the direction of the decreasing DC amplitude, e.g., along the y-axis in the negative direction, while the traveling wave causes the ions 426a-c to move along the z-axis in the positive direction and the gas flow causes the ions 426a-c to move along the z-axis in the negative direction. That is, the influence of the traveling wave and the influence of the gas flow oppose each other. Thus, the ions 214a-c will move in the respective paths shown in FIG. 16. This allows for ions having a specific ion mobility to be filtered from a feedstock. For example, the magnitude of the gas flow and the characteristics of the traveling wave can be specifically selected so that ions having the desired mobility, e.g., the third ion 426c, flow in a straight trajectory along the y-axis toward the orifice 428 in the barrier 404, while undesired ions, e.g., the first and second ions 426a, 426b, flow toward the barrier 404, which they ultimately contact. Thus, ions having the targeted mobility are filtered from the feedstock as they pass through the orifice 428, after which point they can be directed to a detector (e.g., one of the first and second detectors 106a, 106b) for detection.

Figure 17:
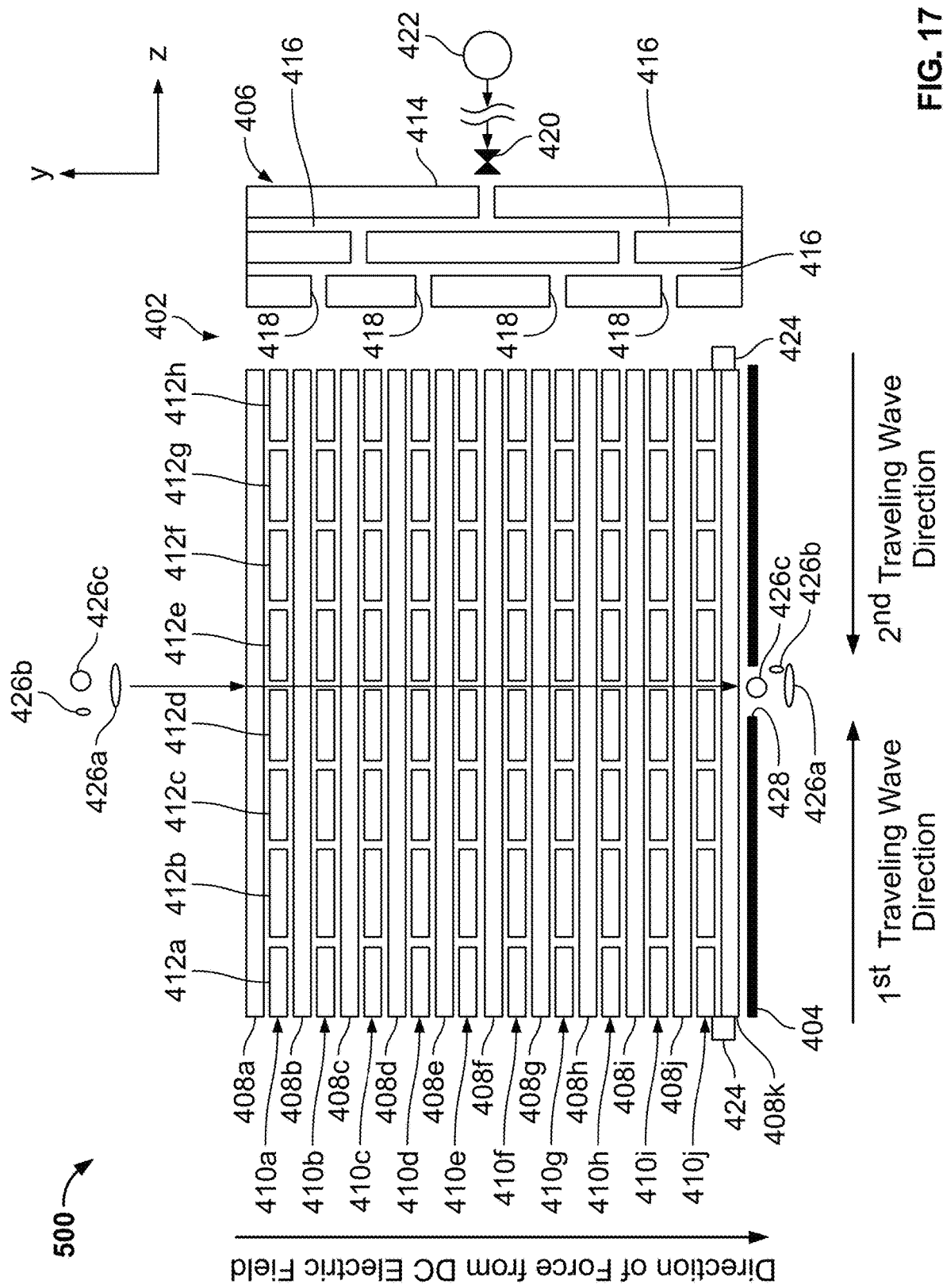
FIG. 17 is a schematic diagram illustrating the 2D SLIM filter of FIG. 16 in an ion transmission mode of operation.

FIG. 17 is a schematic diagram illustrating the 2D SLIM filter 500 of FIG. 16 in an ion transmission mode of operation. In particular, FIG. 17 illustrates the 2D SLIM filter 500 of FIG. 16 with no gas flow and with two opposite direction traveling waves applied thereto to transmit all ions 426a-c, as opposed to filtering ions. To operate the 2D SLIM filter 500 in the ion transmission mode, the controller 108 turns off the gas flow through the gas manifold 406 and applies a first traveling wave voltage signal to a first half of the individual electrodes 412a-h for each of the plurality of segmented electrode arrays 410a-j, and applies a second traveling wave voltage signal to a second half of the individual electrodes 412a-h for each of the plurality of segmented electrode arrays 410a-j. The first traveling wave voltage signal can travel along the z-axis in the positive direction while the second traveling wave voltage signal can travel along the z-axis in the negative direction.

For example, the controller 108 can apply the first traveling wave voltage signal to the first, second, third, and fourth individual electrodes 412a-d for each of the segmented electrode arrays 410a-j, and apply the second traveling wave voltage signal to the fifth, sixth, seventh, and eighth individual electrodes 412e-h for each of the segmented electrode arrays 410a-j. The first traveling wave voltage signal is applied so that the first waveform travels from the first individual electrode 412a of each segmented electrode array 410a-j to the fourth individual electrode 412d of each segmented electrode array 410a-j, and the second traveling wave voltage signal is applied so that the second waveform travels from the eight individual electrode 412h of each segmented electrode array 410a-j to the fifth individual electrode 412e of each segmented electrode array 410a-j. Accordingly, the first and second traveling waves will influence the ions 426a-c toward the center of the 2D SLIM filter 500, which can be aligned with the orifice 428, as shown in FIG. 17.

When in the ion transmission mode, the DC field influences and urges the ions 426a-c to move along the y-axis in the negative direction, while the first and second traveling waves influence and urge the ions 426a-c to the center of the 2D SLIM filter 500. Thus, the ions 426a-c will move in a straight path, as shown in FIG. 17, as they are transmitted across the 2D SLIM filter 500.

It is noted that while the foregoing transmission mode of operation is discussed in connection with a 2D SLIM filter 500 that includes a gas manifold and turning off the flow of gas, such can be implemented with a 2D SLIM filter that does not introduce a flow of gas to influence the flow of ions, e.g., the 2D SLIM filter 200 shown and described in connection with FIGS. 4-6. Additionally, while the 2D SLIM filter 500 is shown with a plurality of segmented electrode arrays 410a-j having eight individual electrodes 412a-412h each, it should be understood that more or less individual electrodes 412a-412h could be utilized. For example, each of the segmented electrode arrays 410a-j could have sixteen individual electrodes. In such a configuration, the first traveling wave can be applied to the first eight electrodes, while the second traveling wave can be applied to the second eight electrodes.

Figure 18:
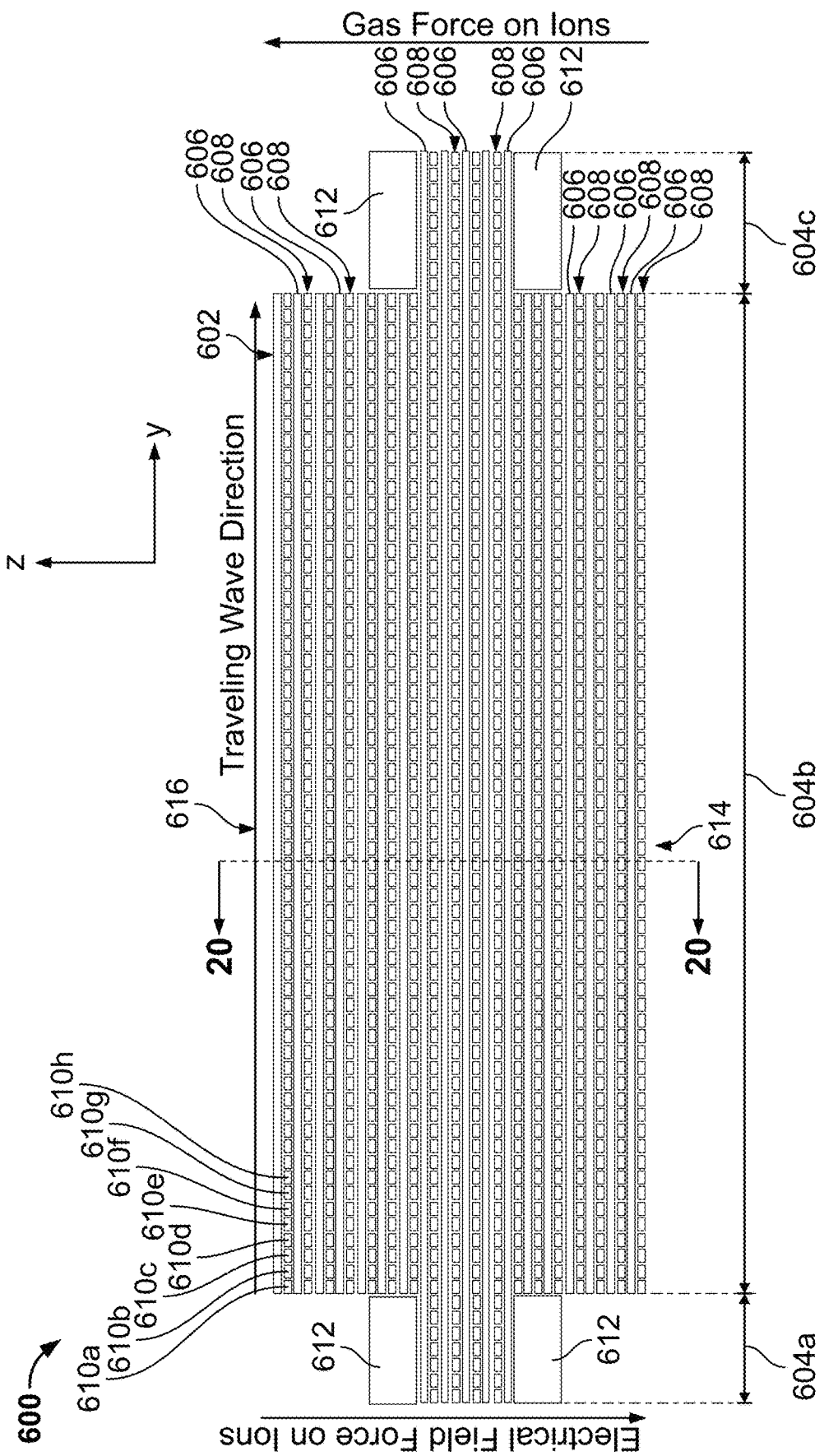
FIG. 18 is a schematic diagram illustrating another exemplary 2D SLIM filter of the present disclosure.

FIG. 18 is a schematic diagram illustrating another exemplary 2D SLIM filter 600 of the present disclosure. The 2D SLIM filter 600 can be substantially similar to the 2D SLIM filter 400 shown and described in connection with FIG. 14. In particular, the 2D SLIM filter 600 includes an electrode array 602 that is generally disposed on first and second surfaces that are positioned parallel to each other, e.g., such as the first and second surfaces 202a, 202b of the 2D SLIM filter 200 shown and discussed in connection with FIGS. 4-6. The electrode array 602 includes an inlet section 604a, an ion separation section 604b, and an outlet section 604c. The electrode array 602 includes a plurality of continuous electrodes 606, e.g., RF electrodes, and a plurality of segmented electrode arrays 608 arranged in generally alternating columns. It is noted that only a portion of the continuous electrodes 606 and the segmented electrode arrays 608 are labelled in FIG. 18 for the sake of clarity. Some of the continuous electrodes 606 and some of the plurality of segmented electrode arrays 608 can extend through more than one of the sections 604a-c of the electrode array 602. For example, as shown in FIG. 18, five continuous electrodes 606 and four of the segmented electrode arrays 608 extend through the inlet section 604a, the ion separation section 604b, and the outlet section 604c. Accordingly, the ion separation section 604b can include more continuous electrodes 606 and segmented electrode arrays 608 than the inlet section 604a and the outlet section 604c, which provides additional space for ion separation to occur.

The plurality of continuous electrodes 606 can be formed and function substantially in accordance with the plurality of continuous electrodes 204a-k shown and described in connection with FIGS. 4-6 and the plurality of continuous electrodes 408a-k shown and described in connection with FIG. 14. Thus, the plurality of continuous electrodes 606 can receive RF voltage signals, or can be connected to ground potential, and can generate a pseudopotential that can prevent or inhibit ions from approaching the surface on which they are mounted. The RF voltage applied to adjacent continuous electrodes 606 can be 180° out of phase, respectively.

Similarly, the plurality of segmented electrode arrays 608 can be formed and function substantially in accordance with the plurality of segmented electrode arrays 206a-j and 410a-j. Accordingly, the plurality of segmented electrode arrays 608 can include a plurality of individual electrodes 610a-h (only a portion of which are labelled in FIG. 18 for the sake of clarity). The plurality of segmented electrode arrays 608 can be TW electrodes such that each of the individual electrodes 610a-h thereof receives a voltage signal that is simultaneously applied to all individual electrodes 610a-h, but phase shifted between adjacent electrodes 610a-h along the y-axis of FIG. 18. However, the same individual electrodes, e.g., the first individual electrode 610a, of the segmented electrode arrays 608 receive the same voltage signal without phase shifting. Accordingly, the segmented electrode arrays 608 function to drive ions in a longitudinal direction along a propagation axis, e.g., along the y-axis of FIG. 18, toward the outlet section 604c.

Additionally, as shown in FIG. 18, the electrode array 602 can include multiple series of individual electrodes 610a-h arranged sequentially. For example, a series of individual electrodes 610a-h can include eight electrodes and the ion separation section 604b can include eight series of individual electrodes 610a-h or sixty-four (64) electrodes. It should be understood that the number of series of individual electrodes 610a-h can be increased or decreased depending on various design considerations and needs. For example, additional series of individual electrodes 610a-h can be provided where additional distance along the y-axis of FIG. 18 is required for ion separation.

The electrode array 602 can also include guard electrodes 612 positioned on lateral sides of the inlet section 604a and the outlet section 604c. The guard electrodes 612 can be substantially similar to the guard electrodes 110 shown and described in connection with FIG. 3. Accordingly, the guard electrodes 612 can receive a voltage signal (e.g., DC voltage signal from a DC control circuit) and generate a guard potential that can confine ions within the inlet section 604a and the outlet section 604c between the guard electrodes 612 along the lateral direction.

Additionally, while not shown in FIG. 18, the 2D SLIM filter 600 should be understood to include a gas diffuser or other apparatus that is positioned adjacent and provides gas to a first side 614 of the 2D SLIM filter 600. Accordingly, the gas will flow in a lateral direction across the electrode array 602, e.g., along the z-axis of FIG. 18, from the first side 614 to an opposing second side 616.

Like the 2D SLIM filter 400 of FIG. 14, the 2D SLIM filter 600 of FIG. 18 has a DC gradient applied along the z-axis. In particular, the controller 108 can apply a DC gradient to the plurality of continuous electrodes 606 and the plurality of segmented electrode arrays 608 to cause a potential difference in each of the RF electrodes, e.g., the plurality of continuous electrodes 606, and in each of the plurality of segmented electrode arrays 608, thus forming a DC field having a potential energy field strength that decreases along the z-axis, e.g., from the second side 616 to the first side 614, as shown in FIG. 18. This can be done in similar fashion to the embodiments shown in, and discussed in connection with, FIGS. 4-11 and 14, for example. Additionally, the DC amplitude can be configured to decrease or increase along the z-axis depending on whether the ions are positively or negatively charged.

As the ions move along the y-axis, they will be subject to influences of the gas and the electric fields (e.g., the DC gradient, the RF waveform, the traveling wave, etc.), which, as noted above, will cause the ions to move at different speeds based on their mobility. Specifically, the DC field influences and urges the ions to move in the direction of decreasing field strength, e.g., along the z-axis in the negative direction, while the gas flow causes the ions to move along the z-axis in the positive direction. For example, where the ions are positively charged the DC amplitude would be configured to increase along the z-axis, whereas for negatively charged ions the DC amplitude would be configured to decrease along the z-axis. In this arrangement, ions will drift in the direction of the decreasing potential energy. As such, the influence of the gas flow and the influence of the DC field oppose each other. However, gas collisions will be more frequent for ions having a larger CCS than ions having a smaller CCS. Thus, the gas flow will force the larger CCS ions further along the z-direction, e.g., toward the second side 616, than ions of lesser CCS. If a nonlinear voltage gradient is applied, then ions will drift in the positive or negative z-direction until the force on the ions due to gas collisions effectively matches the force due to the electric field strength. This allows for ions having a specific ion mobility to be filtered from a feedstock. For example, the magnitude of the gas flow and the DC field can be specifically selected so that ions having the desired mobility or CCS flow along the y-axis in a path, direction, or trajectory toward the outlet section 604c, while undesired ions are knocked off course and do not flow into the outlet section 604c. In this regard, the electrode array 602 can include a barrier 404 that is configured to neutralize the undesired ions. Alternatively, the electrode array 602 can include multiple outlet sections 604c that are each configured to receive ions having a different mobility or CCS. Thus, ions having the targeted mobility are filtered from the feedstock as they pass through the outlet section 604c, after which point they can be directed to a detector (e.g., one of the first and second detectors 106a, 106b) for detection. The outlet section 604c can receive the desired ions and extract the ions or transfer the ions to another device, such as another 2D SLIM filter, a SLIM device, a quadrupole mass analyzer, an orbitrap mass spectrometer, a time of flight mass spectrometer, or other detector 106a, 106b, etc.

Figure 19:
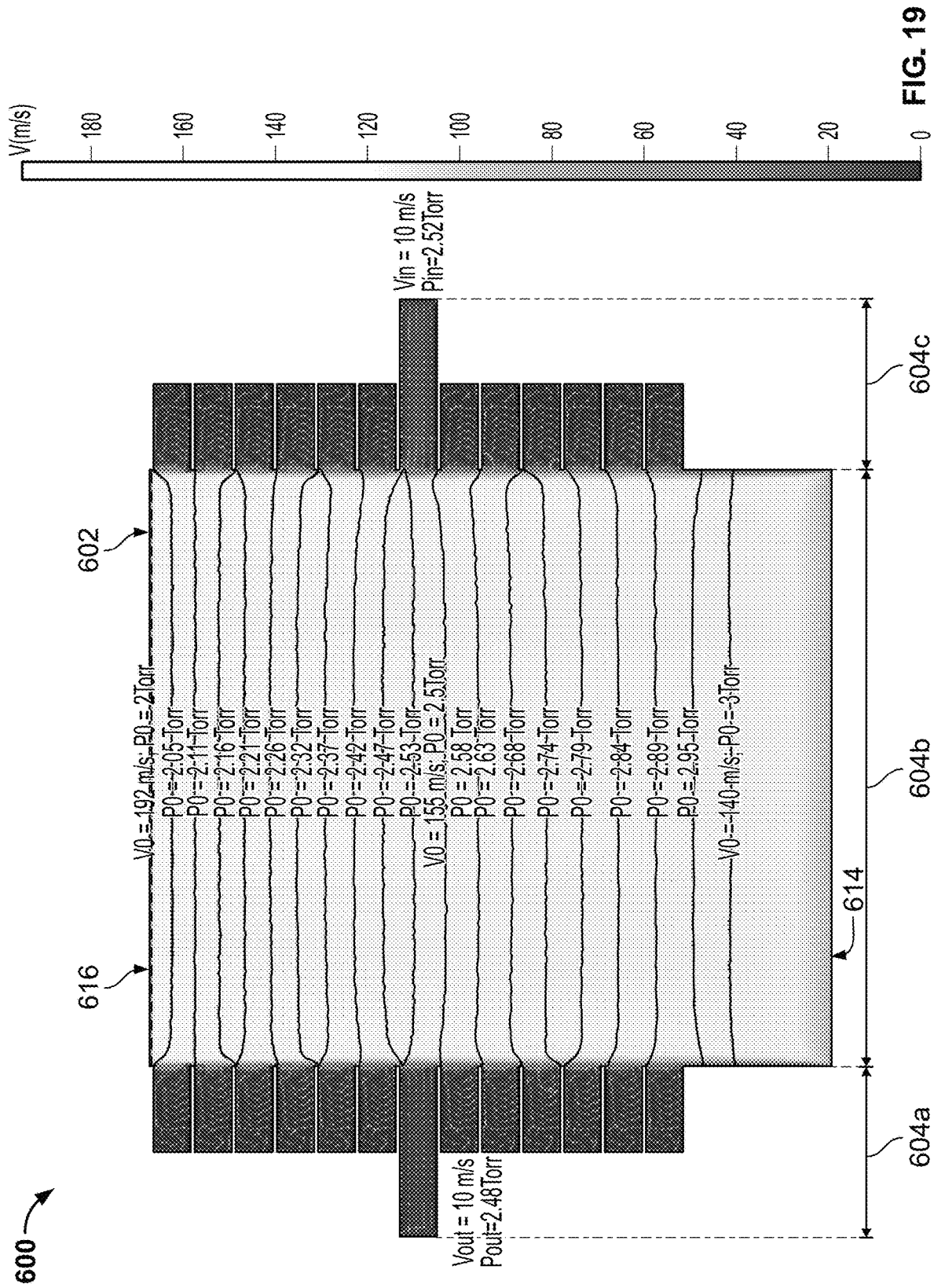
FIG. 19 is a schematic diagram of the 2D SLIM filter of FIG. 18 illustrating velocity and pressure gradients therein.

FIG. 19 is a schematic diagram of the 2D SLIM filter 600 of FIG. 18 illustrating velocity and pressure gradients of the gas therein. As previously noted, pressurized gas can be discharged between the parallel surfaces of the 2D SLIM filter 600 and into the ion separation section 604b, e.g., at the first side 614, in order to influence the travel path of ions. However, it is not practical to create a "wall" of gas that travels across the 2D SLIM filter 600 from the first side 614 to the second side 616 with a uniform pressure and velocity. Instead, as can be seen in FIG. 19, when gas is discharged into the ion separation section 604b of the 2D SLIM filter 600 at the first side 614, e.g., through a gas manifold such as the gas manifold 406 shown and described in connection with FIG. 14, the pressure within the ion separation section 604b reduces almost linearly from the first side 614 to the second 616. However, as the pressure reduces the velocity of the gas increases in order to maintain constant the sum of the pressure, potential energy, and kinetic energy, which is evidenced by Bernoulli's equation. As such, while the pressure reduces and the velocity increases the force on the ions, e.g., the product of the pressure and the velocity of the gas, remains generally the same throughout the ion separation section 604b.

Figure 20A:
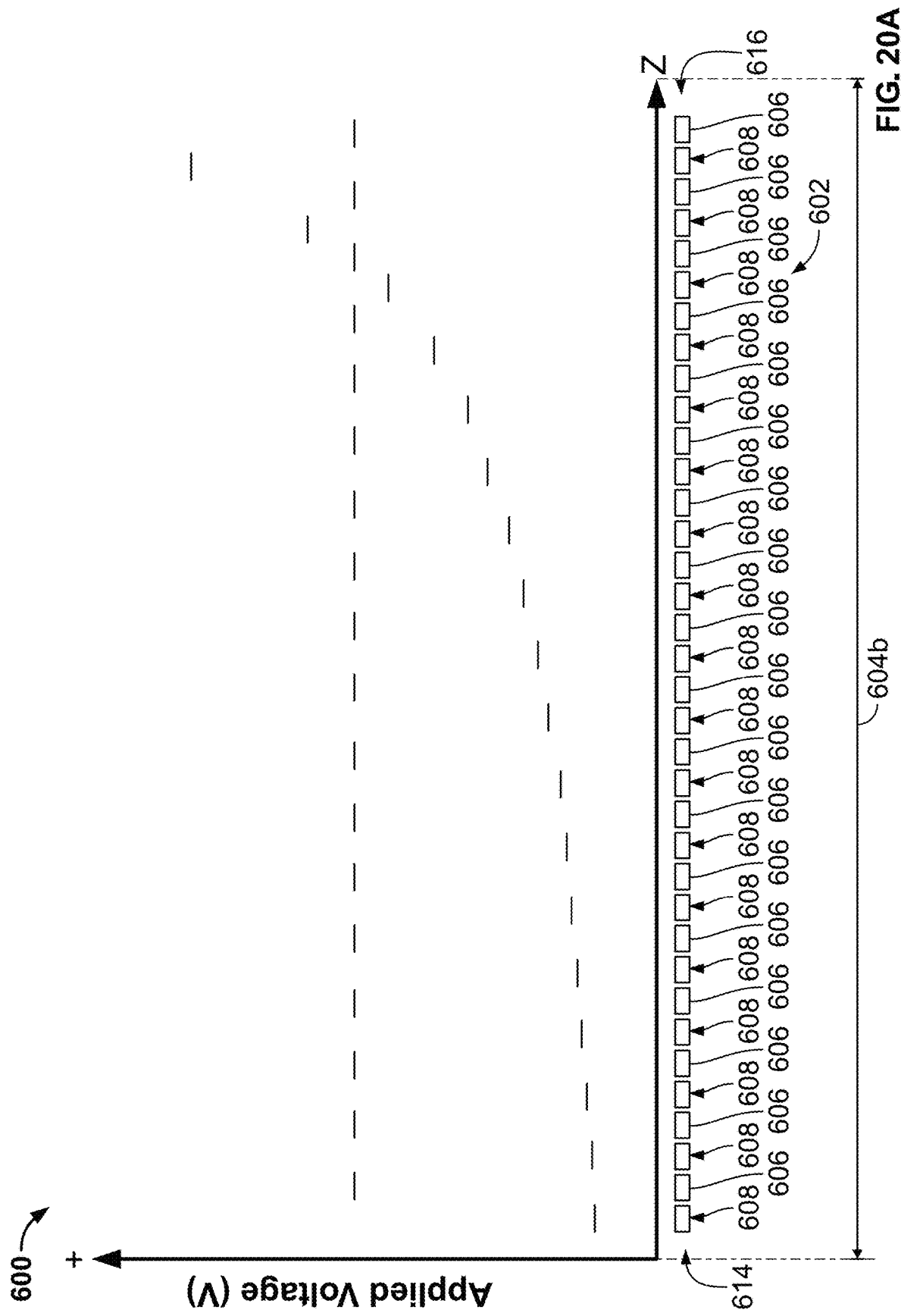
FIG. 20A is a partial sectional view taken along line 20-20 of FIG. 18 and showing a first exemplary configuration of a voltage gradient applied to the electrodes of the 2D SLIM filter.

FIG. 20A is a partial sectional view taken along line 20-20 of FIG. 18 and showing a first exemplary configuration of a voltage gradient applied to the electrodes 606, 608 of the 2D SLIM filter 600. As shown in FIG. 20A, each of the segmented electrode arrays 608 can receive its own DC voltage signal, which is applied to all individual electrodes 610a-h of that segmented electrode array 608 and superimposed on the TW voltage signal applied thereto. Thus, the applied DC voltage signal can be electrode specific. The DC voltage signal applied to the segmented electrode arrays 608 increases non-linearly between subsequent segmented electrode arrays 608 from the segmented electrode array 608 closest to the first side 614 to the segmented electrode array 608 closest to the second side 616. Simultaneously, all of the continuous electrodes 606 can receive the same DC voltage signal superimposed on the RF voltage signal applied thereto. Alternatively, each of the continuous (RF) electrodes 606 can receive its own DC voltage signal that is superimposed on the RF voltage signal applied thereto, and which increases non-linearly between subsequent continuous electrodes 606 from the continuous electrode 606 closest to the first side 614 to the continuous electrode 606 closest to the second side 616. Simultaneously, all of the segmented electrode arrays 608 can receive the same DC voltage signal superimposed on the TW voltage signal applied thereto. Thus, alternating electrodes can receive a non-linear voltage gradient that changes between each electrode as a function of distance along the z-axis, while the opposite alternating electrodes can receive a flat or unchanging voltage signal (e.g., each of these electrodes receives the same voltage signal).

The foregoing configuration of applied voltage signals results in a generally increasing electric field strength within the ion separation section 604b that increases from the first end 614 to the second end 616 of the electrode array 602. This is shown in FIG. 20B, which shows the resulting effective strength of the electric field (V/m) generated by the first exemplary configuration of voltage signals applied to the electrodes of the 2D SLIM filter 600 as shown in FIG. 20A. In particular, the strength of the electric field (V/m) can be determined by taking the first derivate of the voltage profile formed by the first exemplary configuration of voltage signals applied to the electrodes of the 2D SLIM filter 600. The resulting electric field impacts movement of the ions along the z-axis and their ultimate position.

It should also be understood that the present disclosure contemplates an embodiment in which the flat or unchanging voltage signal is not applied, and instead only the non-linear voltage gradient is applied to the electrodes, e.g., alternating electrodes such as only the continuous electrodes 606 or all of the electrodes as shown in FIG. 21 and described in connection therewith. Additionally, the present disclosure contemplates an embodiment where each of the continuous (RF) electrodes 606 receive its own DC voltage signal that is superimposed on the RF voltage signal applied thereto, as previously described, and each individual electrode 610a-h of the segmented electrode arrays 608 receive a low frequency potential instead of the DC voltage signal previously described.

FIG. 21 is a partial sectional view taken along line 20-20 of FIG. 18 and showing a second exemplary configuration of a voltage gradient applied to the electrodes 606, 608 of the 2D SLIM filter 600. As shown in FIG. 21, in the second exemplary configuration, each of the continuous electrodes 606 and the segmented electrode arrays 608 can receive its own DC voltage signal, which, for the segmented electrode arrays 608, is applied to all individual electrodes 610a-h of that respective segmented electrode array 608. Additionally, the DC voltage signal is superimposed on the underlying RF voltage signal (for the continuous electrodes 606) or TW voltage signal (for the segmented electrode arrays 608). Thus, the applied DC voltage signal can be electrode specific. The DC voltage signal applied to the electrodes 606, 608 increases non-linearly between subsequent and adjacent electrodes 606, 608 along the z-axis, e.g., from the first side 614 to the second side 616 of the electrode array 602.

Implementation and application of DC voltage signals that increase non-linearly, e.g., the first and second exemplary configurations of voltage signals shown and described in connection with FIGS. 20A and 21, creates an increasing field strength against the ions within the 2D SLIM filter 600 as they are pushed along the z-axis by the gas flow. This allows the ions to reach a pseudo-equilibrium point along the z-axis where they are no longer on their original path, but have reached a new position where the electric field force thereon is equal and counter to the gas force imparted thereon. That is, the ions are "pushed" off of their original path and can be stabilized in a new path. In particular, when a non-linearly (e.g., quadratic or exponential) increasing or decreasing DC voltage signal is applied, which results in a generally linear increase or decrease in field strength, the ions will initially separate along the z-axis and then travel in the same "direction" along the y-axis in substantially parallel paths, but separated by a distance based off of their initial separation along the z-axis. That is, at least a portion of the paths are substantially parallel. It should be understood that slight variations and movement of the ions within the respective paths should be expected, but nonetheless still fall within the terminology of "substantially parallel," as shown in FIGS. 24 and 26-28, for example. Alternatively, if a different voltage signal/potential distribution is implemented, e.g., that results in a different generated field strength, then ions with different mobilities can have different trajectories through the entirety of the ion separation section 604b. On the other hand, if the applied DC voltage signals increase linearly, then the electric field and force on the ions would be constant, which would cause the ions to continue on the same trajectory as the difference from the gas force will remain constant.

Figure 22:
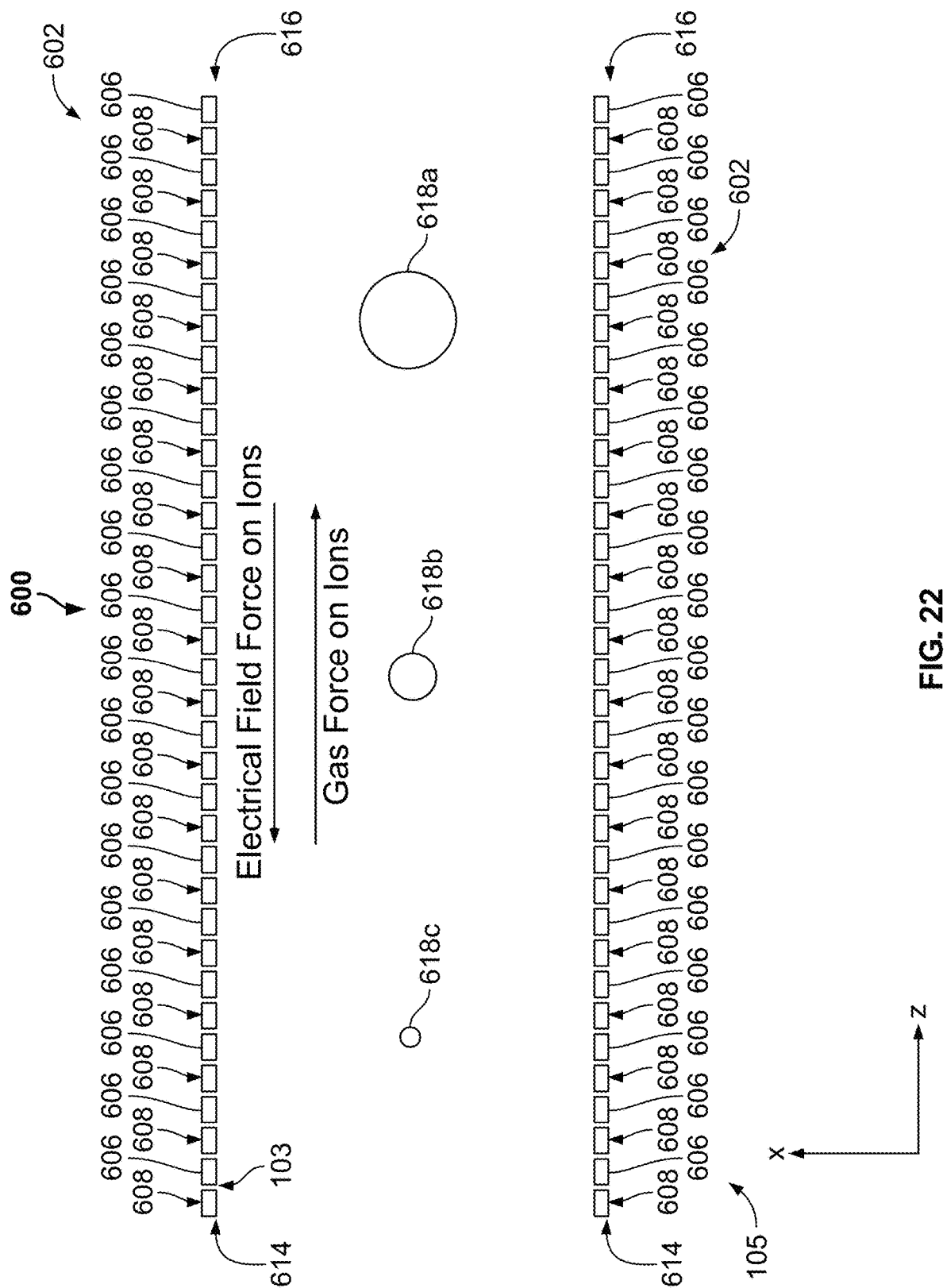
FIG. 22 is a schematic diagram showing ion positioning within the 2D SLIM filter due to the influence of the electrical field force and the gas force.

FIG. 22 is schematic diagram showing the positioning of three ions 618a, 618b, 618c within the 2D SLIM filter 600 due to the influence of the electric field force (V/m) and the gas force. As can be seen in FIG. 22, the ions 618a-c are pushed to the center position between the first and second surfaces 103, 105 due to the RF voltage potential and are separated laterally along the z-axis between the first and second sides 614, 616. This separation is a result of the varying influence that the gas force and electric field force has on the different ions 618a-c, e.g., due to the differences in CCS and mobility of the ions 618a-c. In particular, the gas flow will have a greater impact on ions having a larger CCS than ions having a smaller CCS. Thus, the gas flow will force the larger CCS ions, such as the first ion 618a, further along the z-direction, e.g., toward the second side 616, than ions of lesser CCS, such as the third ion 618c. Additionally, the effective electric field experienced by the ions 618a-c within the 2D SLIM filter 600 is the sum effect of all nearby electrodes averaged out at the mid-point between the first and second surfaces 103, 105, e.g., where the ions 618a-c are positioned due to the influence of the RF voltage potential, compared to a position closer to the electrodes 606, 608.

FIG. 23A is a partial sectional view taken along line 20-20 of FIG. 18 and showing a third exemplary configuration of voltages applied to the electrodes 606, 608 of the 2D SLIM filter 606 including a high amplitude blocking voltage. In particular, the second exemplary configuration of applied voltages shown in FIG. 21 can be altered during operation such that the DC voltage signal applied to a first group of electrodes 620 generally adjacent the first side 614 of the electrode array 602 is switched to the same DC voltage signal, and the DC voltage signal applied to one or more intermediate blocking electrodes 622 is switched to a high amplitude blocking DC voltage signal. The voltage signal applied to a second group of electrodes 624 remains unchanged. The resulting effective potential of the electrical field (V/m) generated by the third exemplary configuration of voltages is shown in FIG. 23B. As can be seen, the effective potential generated by the first group of electrodes 620 is consistent and unchanging, which provides minimal force opposing the gas force, while the effective potential generated by the intermediate blocking electrodes 622 forms a potential wall 626. Accordingly, as ions 628a, 628b, 628c enter the ion separation section 604b the gas force pushes the ions 628a-c along the z-axis toward the second side 616 of the electrode array 602 until the ions 628a-c reach the potential wall 626 where they are prevented from being pushed any further along the z-axis by the gas force causing them to group together. In this regard, the voltage signal applied to the intermediate blocking electrodes 622 must be of sufficient magnitude so as to generate a potential wall 626 that completely counteracts the gas force imparted on the ions 628a-c.

The third exemplary configuration allows for the 2D SLIM filter 600 to be switched between a separation mode of operation where the ions are separated along the z-axis and a transmission mode of operation where the ions are transmitted from the inlet section 604a to the outlet section 604c without being separated along the z-axis. In this way the full range of ion mobilities can be transmitted through the device without separation. This is of particular utility because the DC voltage signals applied to the electrodes, and the resulting electrical potential generated thereby, can be switched much faster than the gas can be turned off or adjusted, which is a slower process and can result in the loss of ions or operational duty cycle.

FIG. 24 is a plot of computer simulation results showing the path of travel through the 2D SLIM filter 600 of FIG. 18 for 322 m/z ions 630, 622 m/z ions 632, and 922 m/z ions 634. As can be seen in FIG. 24, the electrical field force, e.g., generated by the electrodes 606, 608 due to the DC voltage signal applied thereto, and the gas force causes the 322 m/z ions 630 to be pushed along the z-axis in the negative direction as they are transferred along the y-axis toward the exit section 604c, the 922 m/z ions 634 to be pushed along the z-axis in the positive direction as they are transferred along the y-axis toward the exit section 604c, and the 622 m/z ions 632 to be maintained in alignment with the exit section 604c as they are transferred along the y-axis toward the exit section 604c. Accordingly, the 622 m/z ions 632 are separated from the group of ions that were provided to the 2D SLIM filter 600, and extracted therefrom through the exit section 604c where they can be transferred to a detector for detection, such as a mass spectrometer. It should be understood that the DC voltage signals applied to the electrodes 606, 608 and the pressure of the gas provided the 2D SLIM filter 600 can be adjusted to differently alter the paths of the ions 630, 632, 634, e.g., to extract the 322 m/z ions 630 or the 922 m/z ions 634. Moreover, additional exit sections can be provided to extract more than one type of ion.

Figure 25:
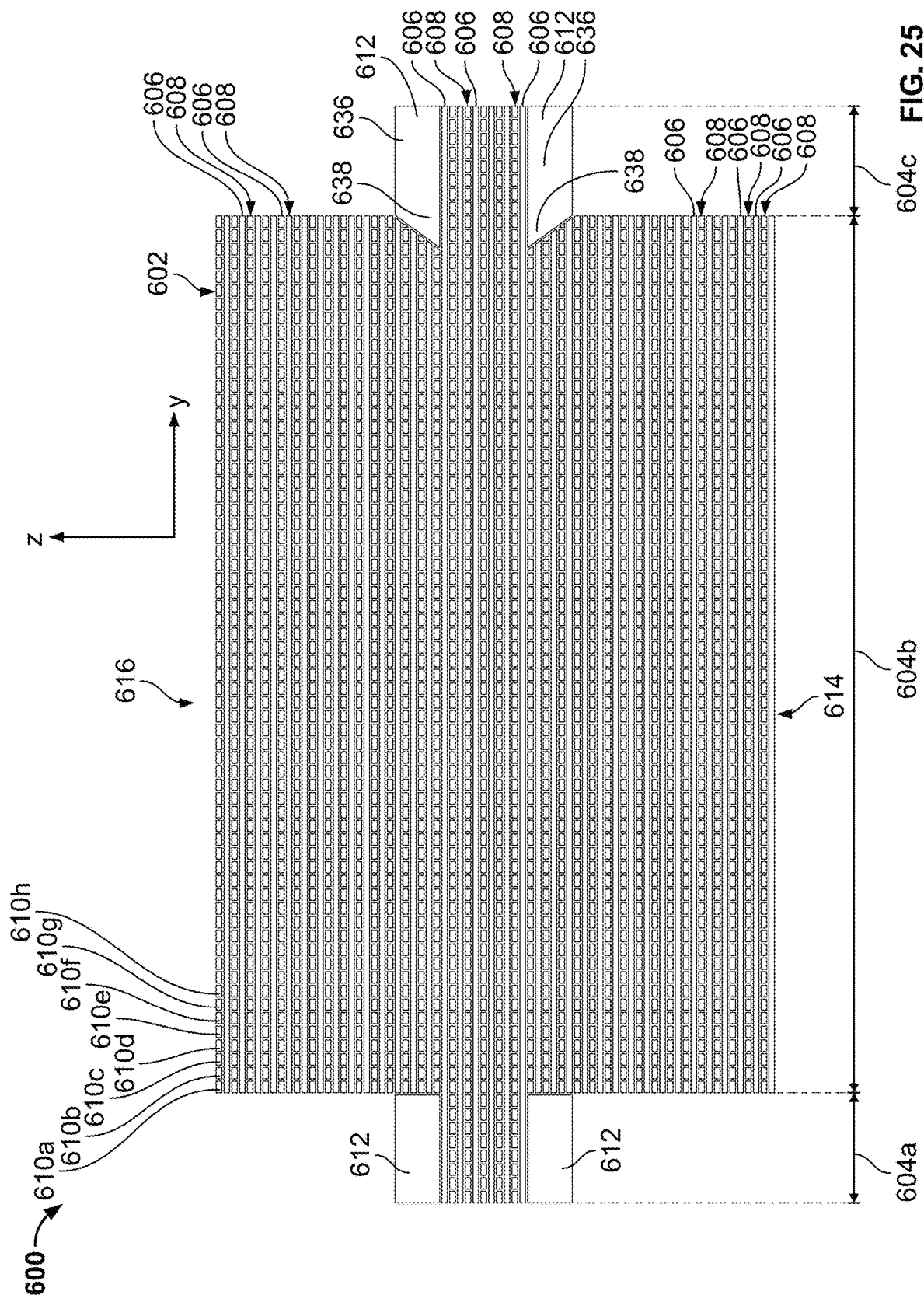
FIG. 25 is a schematic diagram illustrating the exemplary 2D SLIM filter of FIG. 18 with shaped exit guard electrodes.

FIG. 25 is a schematic diagram illustrating the 2D SLIM filter 600 of FIG. 18 with shaped exit guard electrodes 636 positioned at the exit section 604c. Specifically, the shaped exit guard electrodes 636 are shaped with an angled front end 638 that extends into the ion separation region 604b. The shaped exit guard electrodes 636 are configured to prevent undesired ions from inadvertently entering the exit section 604c and thus improve resolution of the mobility separation process.

Figure 26:
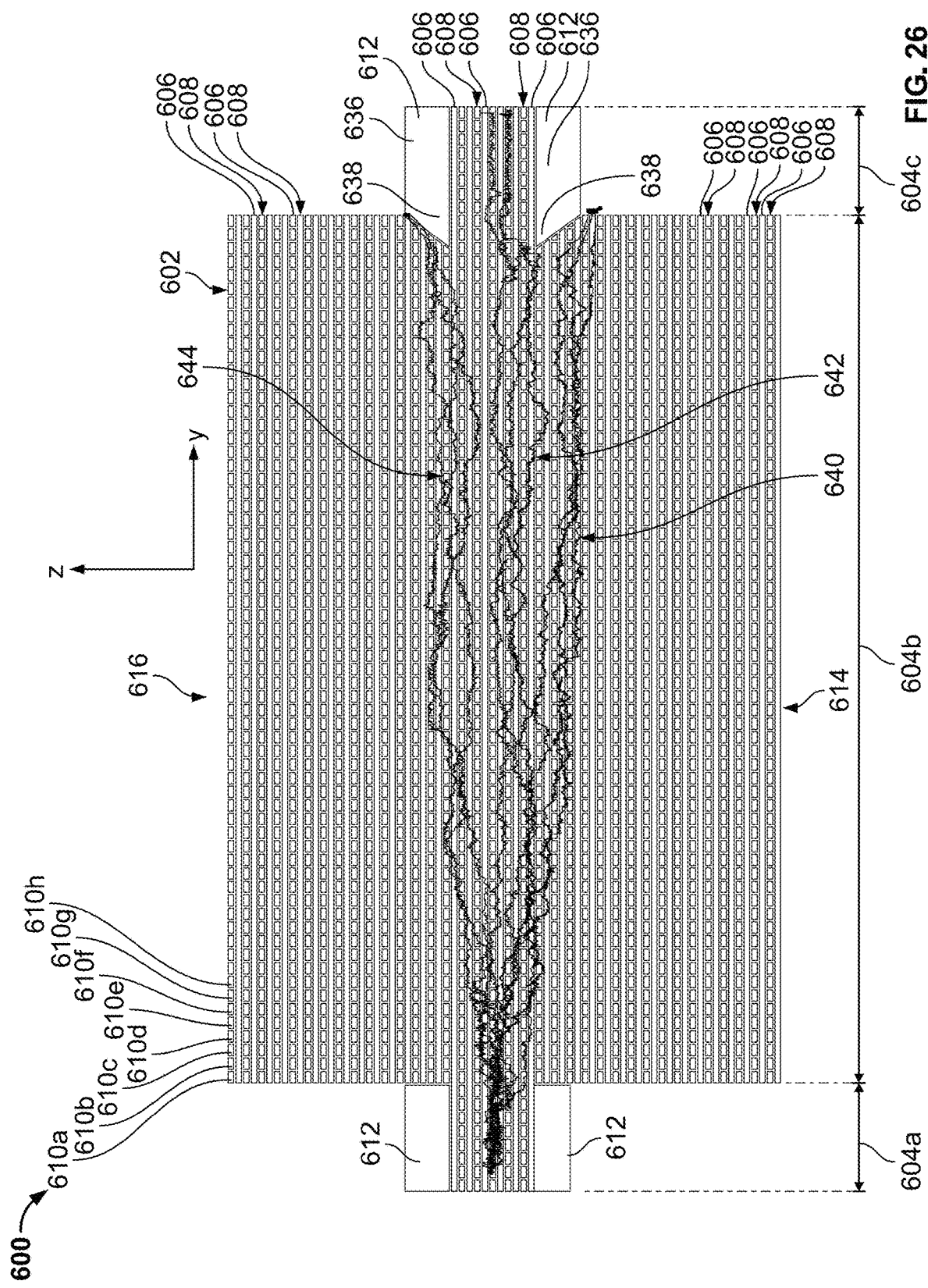
FIG. 26 is a plot of computer simulation results showing the path of travel through the 2D SLIM filter of FIG. 25 for first 622 m/z ions having a 192.8 Å$^2$ CCS, second 622 m/z ions having a 203.0 Å$^2$ CCS, and third 622 m/z ions having a 223.3 Å$^2$ CCS.

FIG. 26 is a plot of computer simulation results showing the path of travel through the 2D SLIM filter 600 of FIG. 25 for first 622 m/z ions 640 having a 192.8 Å² CCS, second 622 m/z ions 642 having a 203.0 Å² CCS, and third 622 m/z ions 644 having a 223.3 Å² CCS. The computer simulation of FIG. 26 was run under the following conditions:

pressure within the 2D SLIM filter 600=2.5 torr;
temperature within the 2D SLIM filter 600=320 K;
separation field voltage=60 V;
gas flow velocity along the z-axis=48 m/s; and
exit bias=−2 V.

As can be seen in FIG. 26, the foregoing simulation resulted in the extraction of the second 622 m/z ions 642 having a 203.0 Å² CCS from the 2D SLIM filter 600 and the neutralization of the first 622 ions 40 having a 192.8 Å² CCS and the third 622 m/z ions 644 having a 223.3 Å² CCS.

Figure 27:
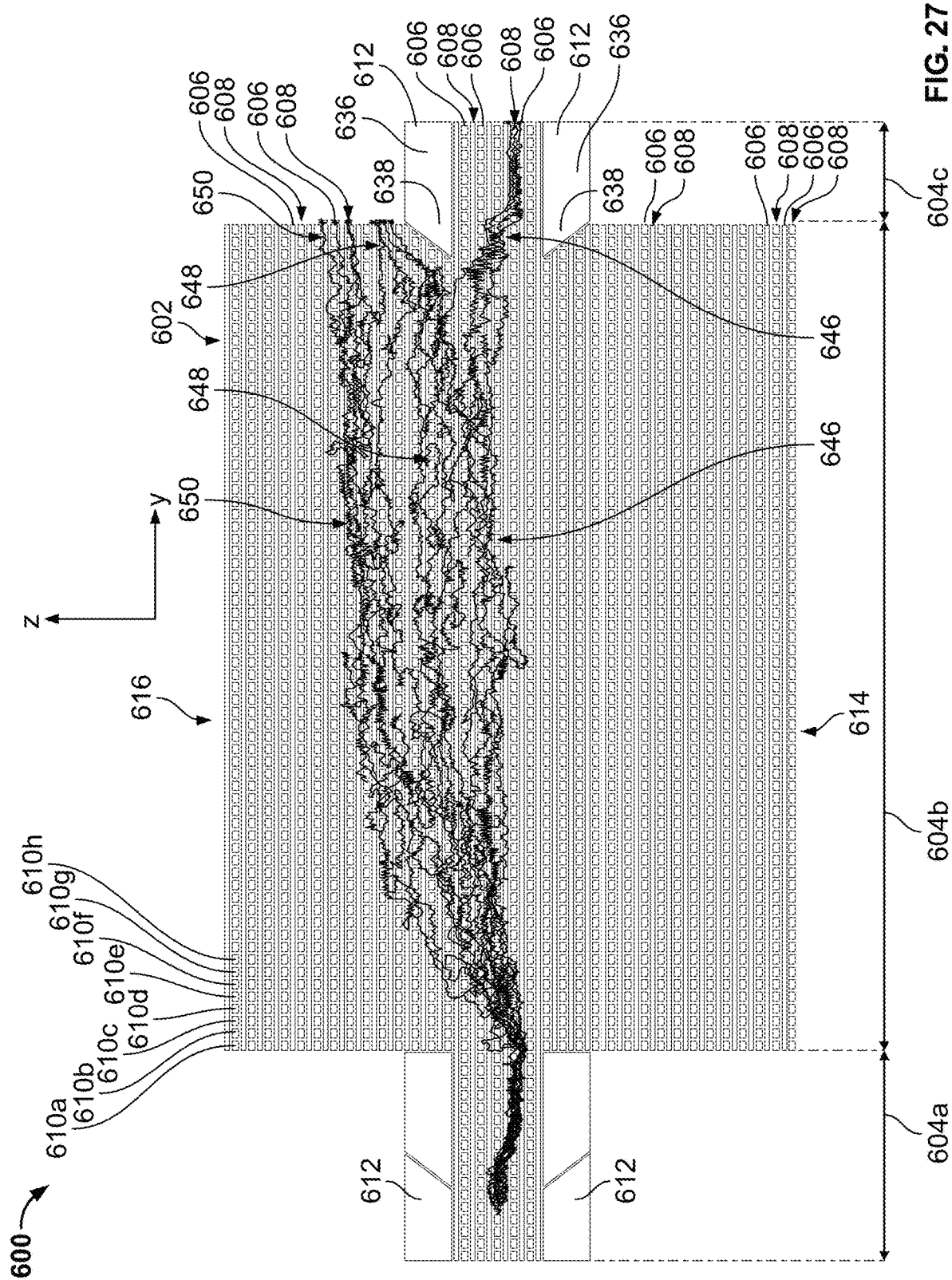
FIG. 27 is a plot of computer simulation results showing the path of travel through the 2D SLIM filter of FIG. 25 for first 622 m/z ions having a 192.81 ÅR CCS, second 622 m/z ions having a 202.96 Å$^2$ CCS, and third 622 m/z ions having a 223.26 Å$^2$ CCS.

FIG. 27 is a plot of computer simulation results showing the path of travel through the 2D SLIM filter 600 of FIG. 25 for first 622 m/z ions 646 having a 192.81 Å² CCS, second 622 m/z ions 648 having a 202.96 Å² CCS, and third 622 m/z ions 650 having a 223.26 Å² CCS. The computer simulation of FIG. 27 was run under the following conditions:

pressure within the 2D SLIM filter 600=2.5 torr;
temperature within the 2D SLIM filter 600=320 K;
separation field voltage=40 V;
gas flow velocity along the z-axis=36.5 m/s; and
exit DC bias=0 V.

As can be seen in FIG. 27, the foregoing simulation resulted in the extraction of the first 622 m/z ions 646 having a 192.81 Å² CCS from the 2D SLIM filter 600 and the neutralization of the second 622 m/z ions 648 having a 202.96 Å² CCS and the third 622 m/z ions 650 having a 223.26 Å² CCS.

Figure 28:
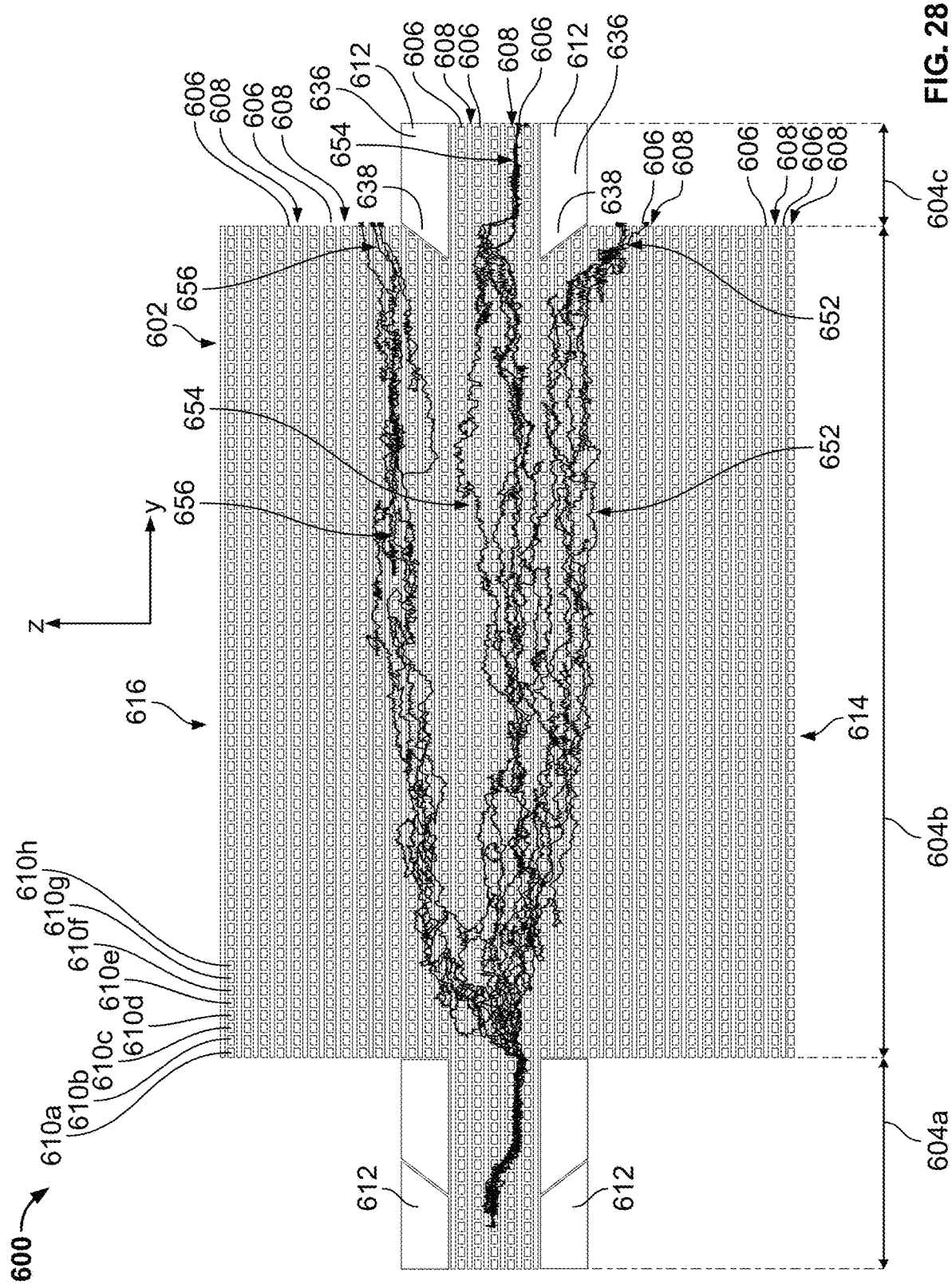
FIG. 28 is another plot of computer simulation results showing the path of travel through the 2D SLIM filter of FIG. 25 for first 622 m/z ions having a 192.81 Å$^2$ CCS, second 622 m/z ions having a 202.96 Å$^2$ CCS, and third 622 m/z ions having a 223.26 Å$^2$ CCS.

FIG. 28 is plot of computer simulation results showing the path of travel through the 2D SLIM filter 600 of FIG. 25 for first 622 m/z ions 652 having a 192.81 Å² CCS, second 622 m/z ions 654 having a 202.96 Å² CCS, and third 622 m/z ions 656 having a 223.26 Å² CCS. The computer simulation of FIG. 28 was run under the following conditions:

pressure within the 2D SLIM filter 600=2.5 torr;
temperature within the 2D SLIM filter 600=320 K;
separation field voltage=81 V;
gas flow velocity along the z-axis=70 m/s; and
exit DC bias=−2 V.

As can be seen in FIG. 28, the foregoing simulation resulted in the extraction of the first 622 m/z ions 654 having a 192.81 Å² CCS from the 2D SLIM filter 600 and the neutralization of the second 622 m/z ions 652 having a 202.96 Å² CCS and the third 622 m/z ions 656 having a 223.26 Å² CCS.

2D SLIM Filter with Phase Shifted Traveling Wave Electrodes

Figure 29:
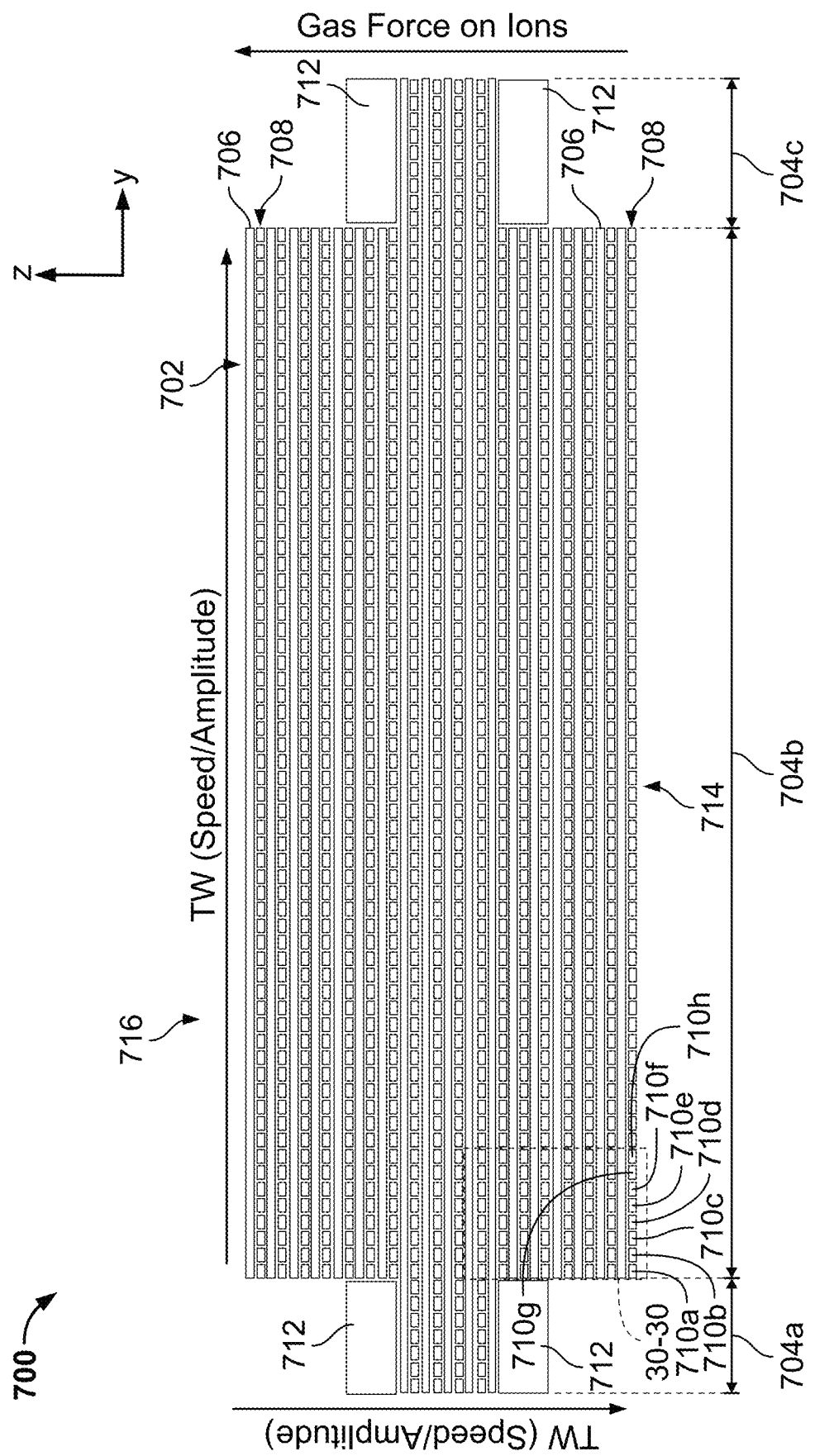
FIG. 29 is a schematic diagram illustrating another exemplary 2D SLIM filter of the present disclosure.
Figure 30:
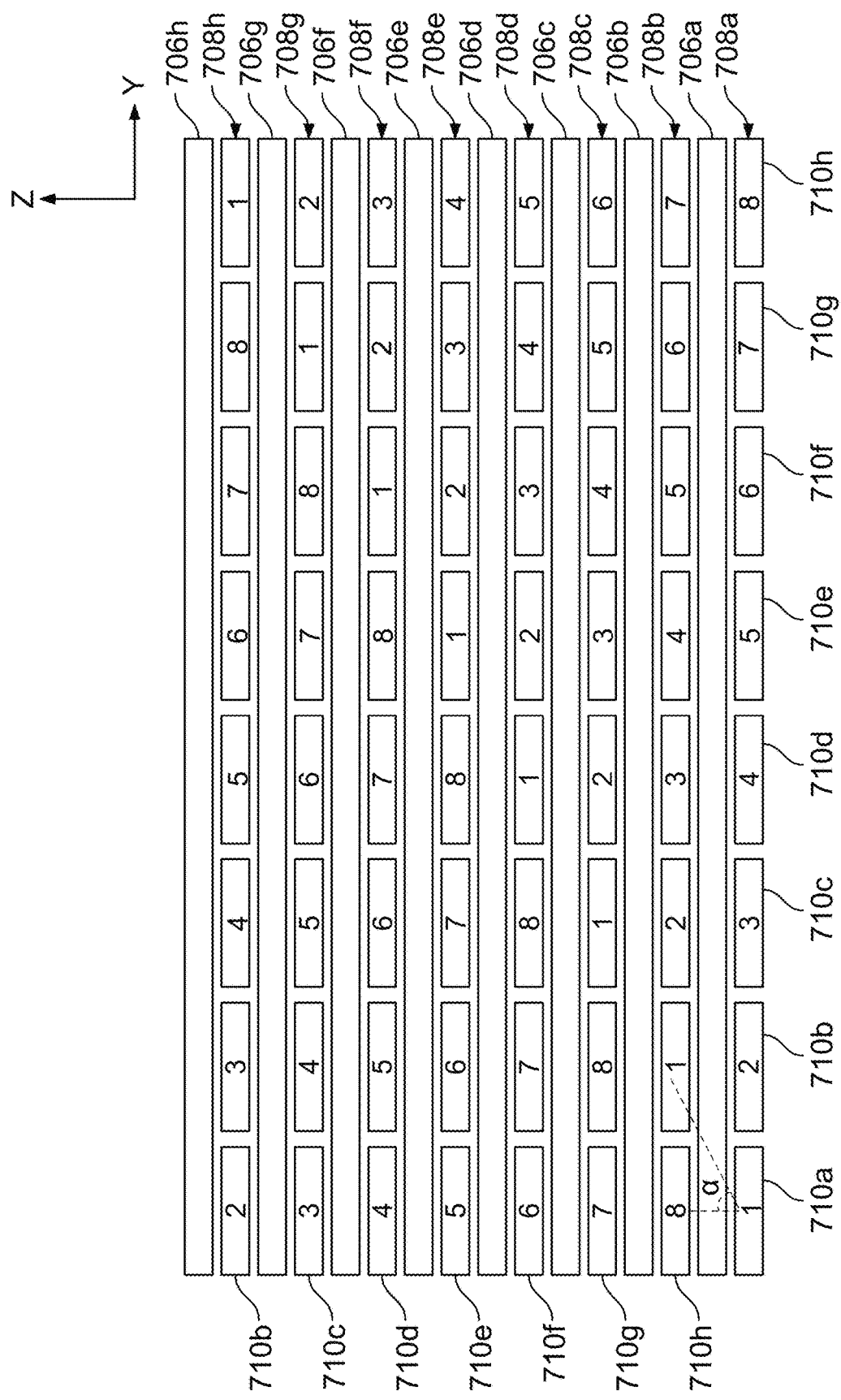
FIG. 30 is a detailed view of Section 30-30 of FIG. 29 showing a block of electrodes of the 2D SLIM filter of FIG. 29.

FIG. 29 is a schematic diagram illustrating another exemplary 2D SLIM filter 700 of the present disclosure, and FIG. 30 is a detailed view of Section 30-30 of FIG. 29 showing a block of electrodes of the 2D SLIM filter 700. It is noted that the term "2D SLIM filter" as used herein should be understood to also encompass devices that function to separate ions, e.g., based on mobility, and therefore should be understood to include devices or systems for separating ions.

The 2D SLIM filter 700 can be substantially similar to the 2D SLIM filter 600 shown and described in connection with FIG. 18. In particular, the 2D SLIM filter 700 includes an electrode array 702 that is generally disposed on first and second surfaces that are positioned parallel to each other, e.g., such as the first and second surfaces 202a, 202b of the 2D SLIM filter 200 shown and discussed in connection with FIGS. 4-6. The electrode array 702 includes an inlet section 704a, an ion separation section 704b, and an outlet section 704c. The electrode array 702 includes a plurality of continuous electrodes 706, e.g., RF electrodes, and a plurality of segmented electrode arrays 708 arranged in generally alternating columns. It is noted that only a portion of the continuous electrodes 706 and the segmented electrode arrays 708 are labelled in FIG. 29 for the sake of clarity. Some of the continuous electrodes 706 and some of the plurality of segmented electrode arrays 708 can extend through more than one of the sections 704a-c of the electrode array 702. For example, as shown in FIG. 29, five continuous electrodes 706 and four of the segmented electrode arrays 708 extend through the inlet section 704a, the ion separation section 704b, and the outlet section 704c. Accordingly, the ion separation section 704b can include more continuous electrodes 706 and segmented electrode arrays 708 than the inlet section 704a and the outlet section 704c, which provides additional space for ion separation to occur.

The plurality of continuous electrodes 706 can be formed and function substantially in accordance with the plurality of continuous electrodes 204a-k shown and described in connection with FIGS. 4-6 and the plurality of continuous electrodes 408a-k shown and described in connection with FIG. 14. Thus, the plurality of continuous electrodes 706 can receive RF voltage signals, or can be connected to ground potential, and can generate a pseudopotential that can prevent or inhibit ions from approaching the surface on which they are mounted. The RF voltage applied to adjacent continuous electrodes 706 can be 180° out of phase, respectively.

Similarly, the plurality of segmented electrode arrays 708 can be formed and function substantially in accordance with the plurality of segmented electrode arrays 206a-j and 410a-j. Accordingly, the plurality of segmented electrode arrays 708 can include a plurality of individual electrodes 710a-h (only a portion of which are labelled in FIG. 29 for the sake of clarity). The plurality of segmented electrode arrays 708 can include TW electrodes such that each of the individual electrodes 710a-h thereof receives a voltage signal that is simultaneously applied to all individual electrodes 710a-h, but phase shifted between adjacent electrodes 710a-h along the y-axis of FIG. 29. The phase shift between adjacent electrodes 710a-h along the y-axis of FIG. 29 is a first phase shift.

The voltage signals applied to the 2D SLIM filter 700 of FIG. 29 are configured such that the traveling wave crests, e.g., the 90° positions of a traveling sine wave, in any given row of segmented electrode arrays 708 lags or precedes the crest of the traveling wave in the adjacent row of segmented electrode arrays 708. This can be accomplished by shifting the position of the traveling wave electrodes 710a-h of each segmented electrode array 708. For example, each segmented electrode array 708 can be offset with respect to the above (and/or below) adjacent segmented electrode array 708 by a predetermined amount. That is, each segmented electrode array 708 can be shifted along the y-axis to provide a second phase shift that is between adjacent segmented electrode arrays in the z-axis, which is shown in greater detail in FIG. 30. In one embodiment, the second phase shift can be 45°; however, it is contemplated by the present disclosure that other phase shifts can be implemented, e.g., 22.5°, 60°, 67.5°, 80°, etc. It is additionally noted that this second phase shift can be achieved by adjusting the phase of the voltage signal applied to the traveling wave electrodes 710a-h or by shifting the physical location of the traveling wave electrodes 710a-h.

Accordingly, the segmented electrode arrays 708 function to drive ions in a longitudinal direction along a first propagation axis, e.g., along the y-axis of FIG. 29, and in a lateral direction along a second propagation axis, e.g., along the z-axis of FIG. 29 due to the second phase shift. As a result, the ions will be driven toward the outlet section 704c. Moreover, this functionality can be implemented in conjunction with an applied DC gradient or gas flow across the 2D SLIM filter 700 to separate and/or filter ions, as discussed in greater detail below.

The foregoing configuration is shown in greater detail in FIG. 30, which is a detailed view of Section 30-30 of FIG. 29 showing a block of electrodes of the 2D SLIM filter 700 in greater detail. As can be seen in FIG. 30, the block of electrodes includes a plurality of continuous electrodes 706a-h and a plurality of segmented electrode arrays 708a-h with each of the segmented electrode arrays 708a-h including a plurality of individual electrodes 710a-h (e.g., electrodes 1-8). The individual electrodes 710a-h can be TW electrodes that each receives a voltage signal that is simultaneously applied to all individual electrodes 710a-h, but phase shifted between adjacent electrodes 710a-h along the y-axis of FIG. 30, as previously described. For example, the phase shift between individual electrode 710b and 710a of the segmented electrode arrays 708a may be 45 degrees. In this example, the first individual electrodes 710a (electrodes 1) would receive the 0° phase of the traveling wave voltage signal, the second individual electrodes 710b (electrodes 2) would receive the 45° phase of the traveling wave voltage signal, the third individual electrodes 710c (electrodes 3) would receive the 90° phase of the traveling wave voltage signal, the fourth individual electrodes 710d (electrodes 4) would receive the 135° phase of the traveling wave voltage signal, the fifth individual electrodes 710e (electrodes 5) would receive the 180° phase of the traveling wave voltage signal, the sixth individual electrodes 710f (electrodes 6) would receive the 225° phase of the traveling wave voltage signal, the seventh individual electrodes 710g (electrodes 7) would receive the 270° phase of the traveling wave voltage signal, the eighth individual electrodes 710h (electrodes 8) would receive the 315° phase of the traveling wave voltage signal.

Furthermore, as previously described, each of the segmented electrode arrays 708a-h may be shifted along the y-axis with respect to the adjacent segmented electrode array 708a-h above (and/or below), e.g., a second phase shift. For example, the phase shift between individual electrodes 710a-h of immediately adjacent rows (e.g., segmented electrode arrays 708a-h) can be 45°. That is, adjacent rows of segmented electrode arrays 708a-h are offset by an angle of 45° such that the individual electrodes 710a-h that receive the same phase of the traveling wave voltage signal are offset by an angle of 45°, which is shown as angle α in FIG. 30. In this example, a first individual electrode 710a of the first segmented electrode array 708a receives the 0° phase of the traveling wave voltage signal and is adjacent to an eighth individual electrode 710h of the second segmented electrode array 708b, which receives the 315° phase of the traveling wave voltage signal. The eighth individual electrode 710h of the second segmented electrode array 708b (which receives the 315° phase of the traveling wave voltage signal) is adjacent a seventh individual electrode 710g of the third segmented electrode array 708c, which receives the 270° phase of the traveling wave voltage signal. The seventh individual electrode 710g of the third segmented electrode array 708c (which receives the 270° phase of the traveling wave voltage signal) is adjacent a sixth individual electrode 710f of the fourth segmented electrode array 708d, which receives the 225° phase of the traveling wave voltage signal. The sixth individual electrode 710f of the fourth segmented electrode array 708d (which receives the 225° phase of the traveling wave voltage signal) is adjacent a fifth individual electrode 710e of the fifth segmented electrode array 708e, which receives the 180° phase of the traveling wave voltage signal. The fifth individual electrode 710e of the segmented electrode array 708e (which receives the 180° phase of the traveling wave voltage signal) is adjacent a fourth individual electrode 710d of the sixth segmented electrode array 708f, which receives the 135° phase of the traveling wave voltage signal. The fourth individual electrode 710d of the sixth segmented electrode array 708f (which receives the 135° phase of the traveling wave voltage signal) is adjacent a third individual electrode 710c of the segmented electrode array 708g, which receives the 90° phase of the traveling wave voltage signal. The third individual electrode 710c of the seventh segmented electrode array 708g (which receives the 90° phase of the traveling wave voltage signal) is adjacent a second individual electrode 710b of the eighth segmented electrode array 708h, which receives the 45° phase of the traveling wave voltage signal.

Additionally, as shown in FIG. 29, the electrode array 702 can include multiple series of individual electrodes 710a-h arranged sequentially. For example, a series of individual electrodes 710a-h can include eight electrodes and the ion separation section 704b can include eight series of individual electrodes 710a-h or sixty-four (64) electrodes. It should be understood that the number of series of individual electrodes 710a-h can be increased or decreased depending on various design considerations and needs. For example, additional series of individual electrodes 710a-h can be provided where additional distance along the y-axis of FIG. 29 is required for ion separation.

The electrode array 702 can also include guard electrodes 712 positioned on lateral sides of the inlet section 704a and the outlet section 704c. The guard electrodes 712 can be substantially similar to the guard electrodes 110 shown and described in connection with FIG. 3. Accordingly, the guard electrodes 712 can receive a voltage signal (e.g., DC voltage signal from a DC control circuit) and generate a guard potential that can confine ions within the inlet section 704a and the outlet section 704c between the guard electrodes 612 along the lateral direction.

Additionally, the 2D SLIM filter 700 can include a gas diffuser, gas inlet, gas discharge device, gas discharge nozzle, gas manifold, or other apparatus that receives gas from a gas source, and is positioned adjacent and provides gas to a first side 714 of the 2D SLIM filter 700, e.g., in similar fashion to the 2D SLIM filter 400 shown and described in connection with FIGS. 13-15. That is, the gas diffuser discharges gas into the channel between the SLIM boards. Accordingly, the gas will flow in a lateral direction across the electrode array 702, e.g., along the z-axis of FIG. 29, from the first side 714 to an opposing second side 716.

As the ions move along the y-axis, they will be subject to influences of the gas and the electric fields (e.g., the RF waveform, the traveling wave, etc.), which, as noted above, will cause the ions to move at different speeds based on their mobility. Specifically, the z-direction component of the electric field generated by the traveling wave will influence and urge the ions to move in the direction of decreasing field strength, e.g., along the z-axis in the negative direction, while the gas flow causes the ions to move along the z-axis in the positive direction. In this arrangement, ions will drift in the direction of the decreasing potential energy. As such, the influence of the gas flow and the influence of the z-direction component of the electric field due to the traveling wave oppose each other. However, gas collisions will be more frequent for ions having a larger CCS than ions having a smaller CCS. Thus, the gas flow will force the larger CCS ions further along the z-direction, e.g., toward the second side 716, than ions of lesser CCS. Accordingly, ions will drift in the positive or negative z-direction until the force on the ions due to gas collisions effectively matches the force due to the electric field strength. This allows for ions having a specific ion mobility to be filtered from a feedstock. For example, the magnitude of the gas flow and the z direction component of the electric field due to the traveling wave can be specifically selected so that ions having the desired mobility or CCS flow along the y-axis in a path, direction, or trajectory toward the outlet section 704c, while undesired ions are knocked off course and do not flow into the outlet section 704c. In this regard, the electrode array 702 can include a barrier that is configured to neutralize the undesired ions. Alternatively, the electrode array 702 can include multiple outlet sections 704c that are each configured to receive ions having a different mobility or CCS. Thus, ions having the targeted mobility are filtered from the feedstock as they pass through the outlet section 704c, after which point they can be directed to a detector (e.g., one of the first and second detectors 106a, 106b) for detection. The outlet section 704c can receive the desired ions and extract the ions or transfer the ions to another device, such as another 2D SLIM filter, a SLIM device, a quadrupole mass analyzer, an orbitrap mass spectrometer, a time of flight mass spectrometer, collision cell, or other detector 106a, 106b, etc.

It should be understood that the electrode array 702 can include more or less than the number of segmented TW electrode array rows, RF electrode rows, or TW electrode columns as illustrated in FIG. 29. Additionally, the outlet section 704c may include a plurality of outlets to collect and detect ions of different mass-to-charge ratios, respectively.

2D SLIM Filter with Phase Shifted Offset Traveling Wave Electrodes

Figure 31:
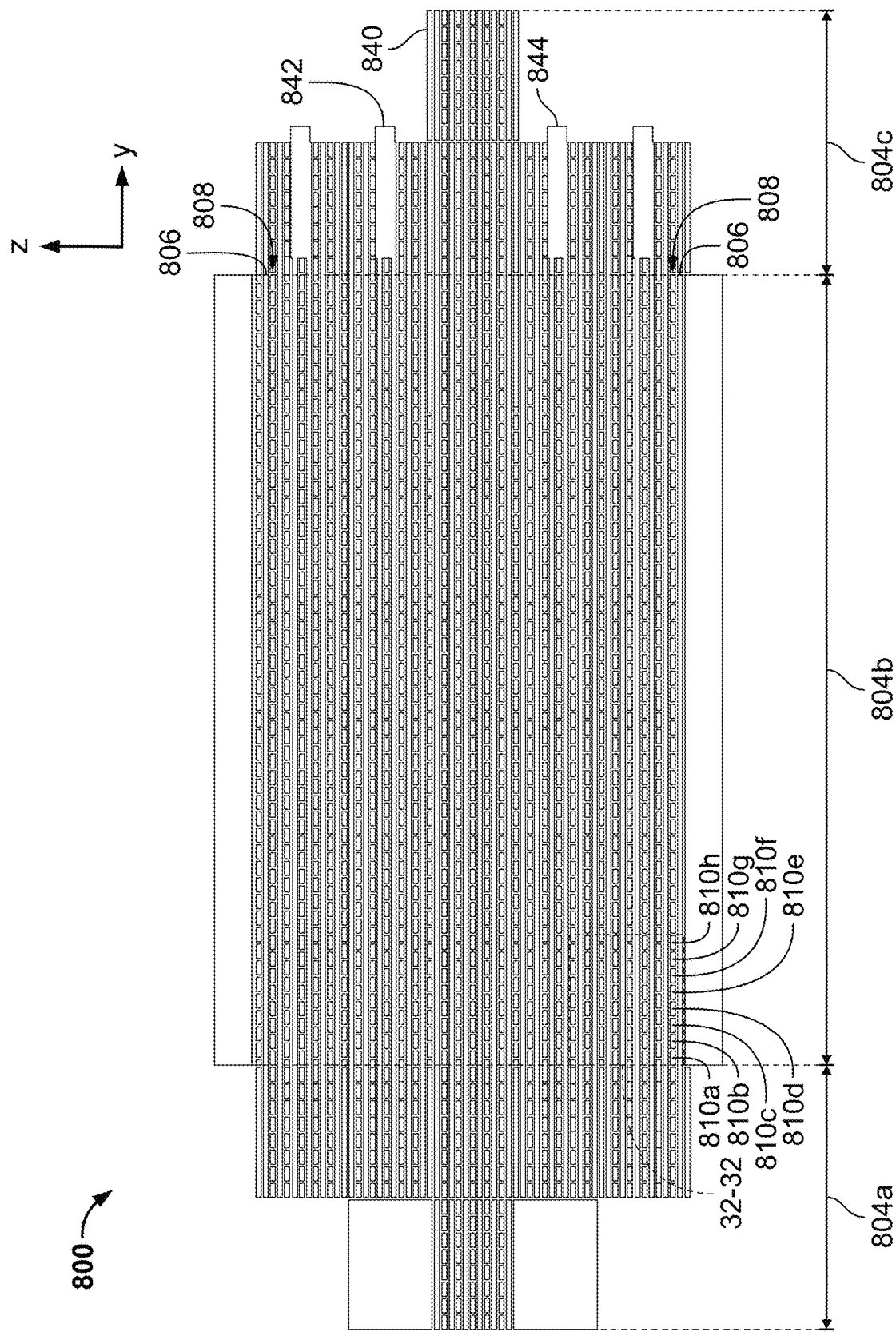
FIG. 31 is a schematic diagram illustrating another exemplary 2D SLIM filter of the present disclosure.
Figure 32:
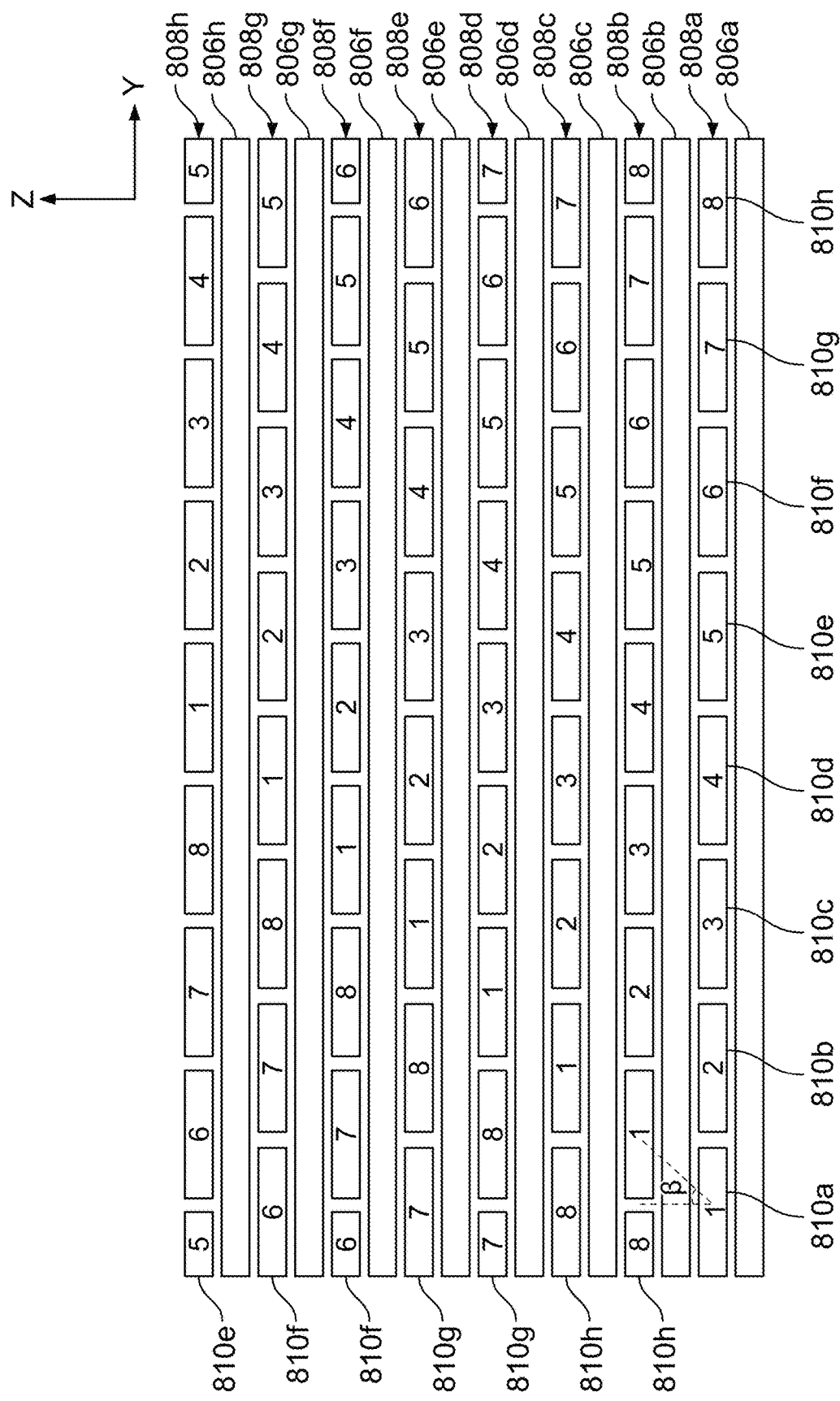
FIG. 32 is a detailed view of Section 32-32 of FIG. 31 showing a block of electrodes of the 2D SLIM filter of FIG. 31.

It is also contemplated by the present disclosure that the second phase shift can be other than 45 degrees, e.g., 22.5 degrees, as shown in FIGS. 31 and 32. In particular, FIG. 31 is a schematic diagram illustrating another exemplary 2D SLIM filter 800 of the present disclosure, and FIG. 32 is a detailed view of Section 32-32 of FIG. 31 showing a block of electrodes of the 2D SLIM filter 800. The 2D SLIM filter 800 can be substantially similar to the 2D SLIM filter 700 shown and described in connection with FIG. 29; however, with a second phase shift of 22.5°. In this configuration, e.g., with a second phase shift of 22.5°, each segmented electrode array 808 can be offset with respect to the above (and/or below) adjacent segmented electrode array 808 by 22.5°.

In particular, as can be seen in FIG. 32, Section 32-32 includes a plurality of continuous electrodes 806a-h and a plurality of segmented electrode arrays 808a-h. Each of the segmented electrode arrays 808a-h can include a plurality of individual electrodes 810a-h. Similarly to the 2D SLIM filter 700 shown and described in connection with FIGS. 30 and 31, in the 2D SLIM filter 800 shown in FIG. 32, each of the segmented electrode arrays 808a-h can be TW electrodes such that each of the individual electrodes 810a-h (electrodes 1-8) thereof receives a voltage signal that is simultaneously applied to all individual electrodes 810a-h, but phase shifted between adjacent electrodes 810a-h along the y-axis of FIG. 32. However, in this example, each of the segmented electrode arrays 808a-h is arranged in a staggered manner with the immediately adjacent segmented electrode arrays 808a-h. That is, adjacent rows of segmented electrode arrays 808a-h are offset such that the individual electrodes 810a-h that receive the same phase of the traveling wave voltage signal are offset by an angle of 22.5°, which is shown as angle β in FIG. 32.

Accordingly, in this example:

(1) the first individual electrodes 810a (electrodes labelled "1") of each of the segmented electrode arrays 808a-h receive the 0° phase of the traveling wave voltage signal and are at an angle of 22.5° (angle β) with respect to the adjacent first individual electrode 810a of the segmented electrode array 808a-h immediately there below;

(2) the second individual electrodes 810b (electrodes labelled "2") of each of the segmented electrode arrays 808a-h receive the 45° phase of the traveling wave voltage signal and are at an angle of 22.5° (angle β) with respect to the second individual electrode 810b of the segmented electrode array 808a-h immediately there below;

(3) the third individual electrodes 810b (electrodes labelled "3") of each of the segmented electrode arrays 808a-h receive the 90° phase of the traveling wave voltage signal and are at an angle of 22.5° (angle β) with respect to the adjacent third individual electrode 810c of the segmented electrode array 808a-h immediately there below;

(4) the fourth individual electrodes 810d (electrodes labelled "4") of each of the segmented electrode arrays 808a-h receive the 135° phase of the traveling wave voltage signal and are at an angle of 22.5° (angle β) with respect to the fourth individual electrode 810d of the segmented electrode array 808a-h immediately there below;

(5) the fifth individual electrodes 810e (electrodes labelled "5") of each of the segmented electrode arrays 808a-h receive the 180° phase of the traveling wave voltage signal and are at an angle of 22.5° (angle β) with respect to the adjacent fifth individual electrode 810e of the segmented electrode array 808a-h immediately there below;

(6) the sixth individual electrodes 810f (electrodes labelled "6") of each of the segmented electrode arrays 808a-h receive the 225° phase of the traveling wave voltage signal and are at an angle of 22.5° (angle β) with respect to the sixth individual electrode 810f of the segmented electrode array 808a-h immediately there below;

(7) the seventh individual electrodes 810g (electrodes labelled "7") of each of the segmented electrode arrays 808a-h receive the 270° phase of the traveling wave voltage signal and are at an angle of 22.5° (angle β) with respect to the adjacent seventh individual electrode 810g of the segmented electrode array 808a-h immediately there below; and (8) the eighth individual electrodes 810h (electrodes labelled "8") of each of the segmented electrode arrays 808a-h receive the 315° phase of the traveling wave voltage signal and are at an angle of 22.5° (angle β) with respect to the eighth individual electrode 810h of the segmented electrode array 808a-h immediately there below.

The first phase shift and the second phase shift are not limited to the above precise values and can be tailored to obtain the best ion separation results.

2D SLIM Filter with Variable Phase Shifted Traveling Wave Electrodes

It is also contemplated by the present disclosure that the phase shift between rows of segmented electrode arrays 708, 808 can vary row-to-row. That is, the phase shift between adjacent rows need not be uniform, but instead can be variable. For example, in one aspect, the second phase shift can vary linearly between rows, e.g., the phase shift between rows 1 and 2 can be 60° and the phase shift can increase by 1° for each subsequent row, as shown and described in connection with FIGS. 33-36. In other aspects, the phase shift can increase exponentially or otherwise nonlinearly from row-to-row.

Figure 33:
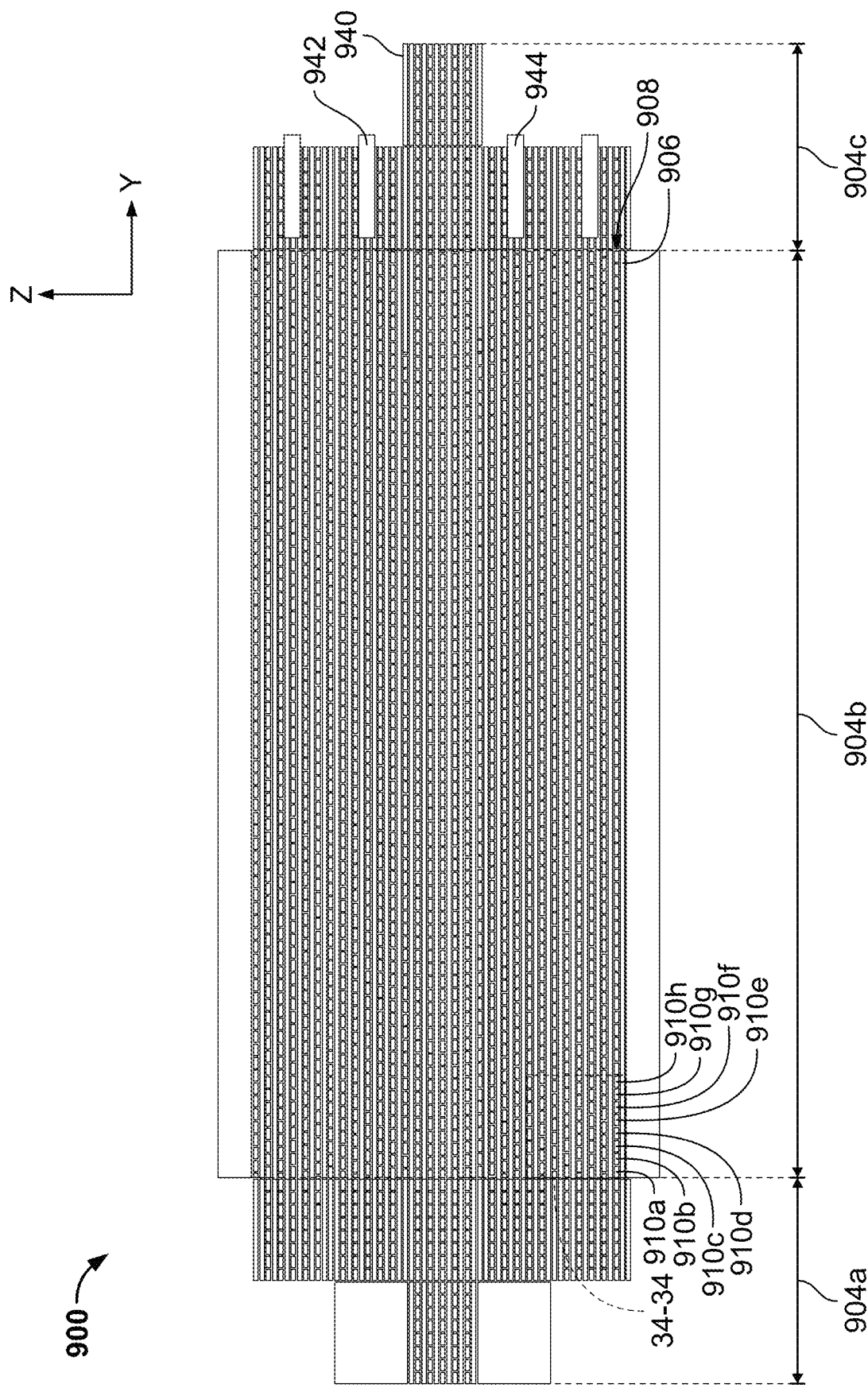
FIG. 33 is a schematic diagram illustrating another exemplary 2D SLIM filter of the present disclosure.

FIG. 33 is a schematic diagram illustrating another exemplary 2D SLIM filter 900 of the present disclosure in which the second phase shift varies from 20° to 70° linearly from row-to-row in the z-axis direction. For example, the phase shift can start at 20° and progress linearly to 70° across thirty segmented electrode array rows 908 as shown in FIG. 33, which will provide a gradient in the electric field in the negative z-axis direction to oppose the gas flow. For example, the second segmented electrode array row is phase shifted 20° with respect to the first segmented electrode array row and the third segmented electrode array row 908 is phase shifted 21.786° with respect to the second segmented electrode array row 908. The n+1th segmented electrode array row is phase shifted from the nth segmented electrode array row by 20+ (n−1)*1.786°. It should be understood that this is merely exemplary and the phase shift can be increased by any desired amount and can be tailored to the number of segmented electrode array rows.

Figure 34:
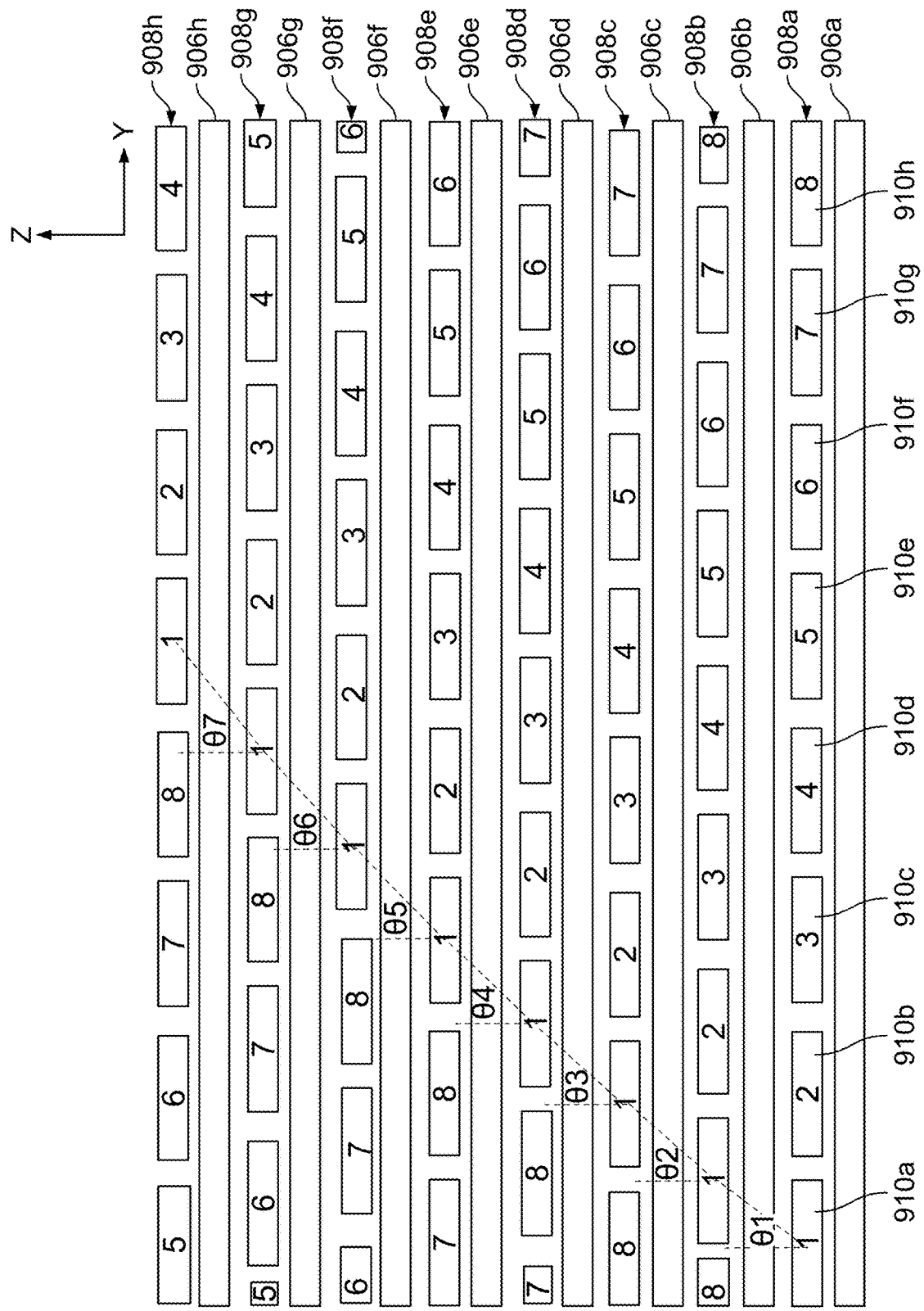
FIG. 34 is a detailed view of Section 34-34 of FIG. 33 showing a block of electrodes of the 2D SLIM filter of FIG. 33.

FIG. 34 is a detailed view of Section 34-34 of FIG. 33 showing a block of electrodes of the 2D SLIM filter 900 of FIG. 33, and illustrating the foregoing phase shift in greater detail. The Section 34-34 includes a plurality of continuous electrodes 906a-h and a plurality of segmented electrode arrays 908a-h. Each of the segmented electrode arrays 908a-h can include a plurality of individual electrodes 910a-h. Similarly to the 2D SLIM filter 700 shown and described in connection with FIG. 30, in the 2D SLIM filter 900 shown in FIG. 34, each of the segmented electrode arrays 908a-h can be TW electrodes such that each of the individual electrodes 910a-h (electrodes 1-8) thereof receives a voltage signal that is simultaneously applied to all individual electrodes 910a-h, but phase shifted between adjacent electrodes 910a-h along the y-axis of FIG. 34. However, in this example, each of the segmented electrode arrays 908a-h will be arranged in a staggered manner with the segmented electrode array 908a-h in an immediately adjacent row immediately below, such that phase shift can start at 20° and progress linearly to 70° across thirty segmented electrode array rows 906 as shown in FIG. 33. That is, adjacent rows of segmented electrode arrays 908a-h are offset such that the individual electrodes 910a-h that receive the same phase of the traveling wave voltage signal are offset by an angle, shown as angle θ1-θ7 in FIG. 42, which varies from row to row. In the z-axis direction, the n+1th segmented electrode array row is phase shifted from the nth segmented electrode array row by 20+(n−1)*1.78°.

Accordingly, in this example the first individual electrodes 910a (electrodes labelled "1") of each of the segmented electrode arrays 908a-h receive the 0° phase of the traveling wave voltage signal and are offset from adjacent first individual electrodes 910a as follows:

(1) the first individual electrodes 910a of the second segmented electrode array 908b are at an angle of 20° (θ1) with respect to the first individual electrodes 910a of the adjacent first segmented electrode array 908a immediately therebelow;

(2) the first individual electrodes 910a of the third segmented electrode array 908c are at an angle of 21.786° (θ2) with respect to the first individual electrodes 910a of the adjacent second segmented electrode array 908b immediately therebelow;

(3) the first individual electrodes 910a of the fourth segmented electrode array 908d are at an angle of 23.572° (θ3) with respect to the first individual electrodes 910a of the adjacent third segmented electrode array 908c immediately therebelow;

(4) the first individual electrodes 910a of the fifth segmented electrode array 908e are at an angle of 25.358° (θ4) with respect to the first individual electrodes 910a of the adjacent fourth segmented electrode array 908d immediately therebelow;

(5) the first individual electrodes 910a of the sixth segmented electrode array 908f are at an angle of 27.144° (θ5) with respect to the first individual electrodes 910a of the adjacent fifth segmented electrode array 908e immediately therebelow;

(6) the first individual electrodes 910a of the seventh segmented electrode array 908g are at an angle of 28.93° (θ6) with respect to the first individual electrodes 910a of the adjacent sixth segmented electrode array 908f immediately therebelow; and (7) the first individual electrodes 910a of the eighth segmented electrode array 908h are at an angle of 30.716° (θ6) with respect to the first individual electrodes 910a of the adjacent seventh segmented electrode array 908g immediately therebelow.

The following arrangement similarly holds true for the second individual electrodes 910b, third individual electrodes 910c, fourth individual electrodes 910d, fifth individual electrodes 910e, sixth individual electrodes 910f, seventh individual electrodes 910g, and eighth individual electrodes 910h, and need not be expanded upon. Additionally, the foregoing holds true for the entirety of ion separation section 904b.

Like the 2D SLIM filter 400 of FIG. 14, the 2D SLIM filter 700 of FIG. 29, the 2D SLIM filter 800 of FIG. 31, and/or the 2D SLIM filter 900 of FIG. 33 can have a DC gradient applied along the z-axis in addition to the electric field produced by the individual electrodes 710a-h, 810a-h, and 910a-h, respectively, e.g., due to the traveling wave voltage signal applied thereto. The DC gradient can be in addition to or in place of the gas flow previously discussed. In particular, in the 2D SLIM filter 700 of FIG. 29, the controller 108 can apply a DC gradient to the plurality of continuous electrodes 706 and the plurality of segmented electrode arrays 708 to cause a potential difference in each of the RF electrodes, e.g., the plurality of continuous electrodes 706, and in each of the plurality of segmented electrode arrays 708, thus forming a DC field having a potential energy field strength that decreases or increases along the z-axis, e.g., from the second side 716 to the first side 714, as shown in FIG. 29. This can be done in similar fashion to the embodiments shown in, and discussed in connection with, FIGS. 4-11 and 14, for example. Additionally, the DC amplitude can be configured to decrease or increase along the z-axis depending on whether the ions are positively or negatively charged.

Figure 35:
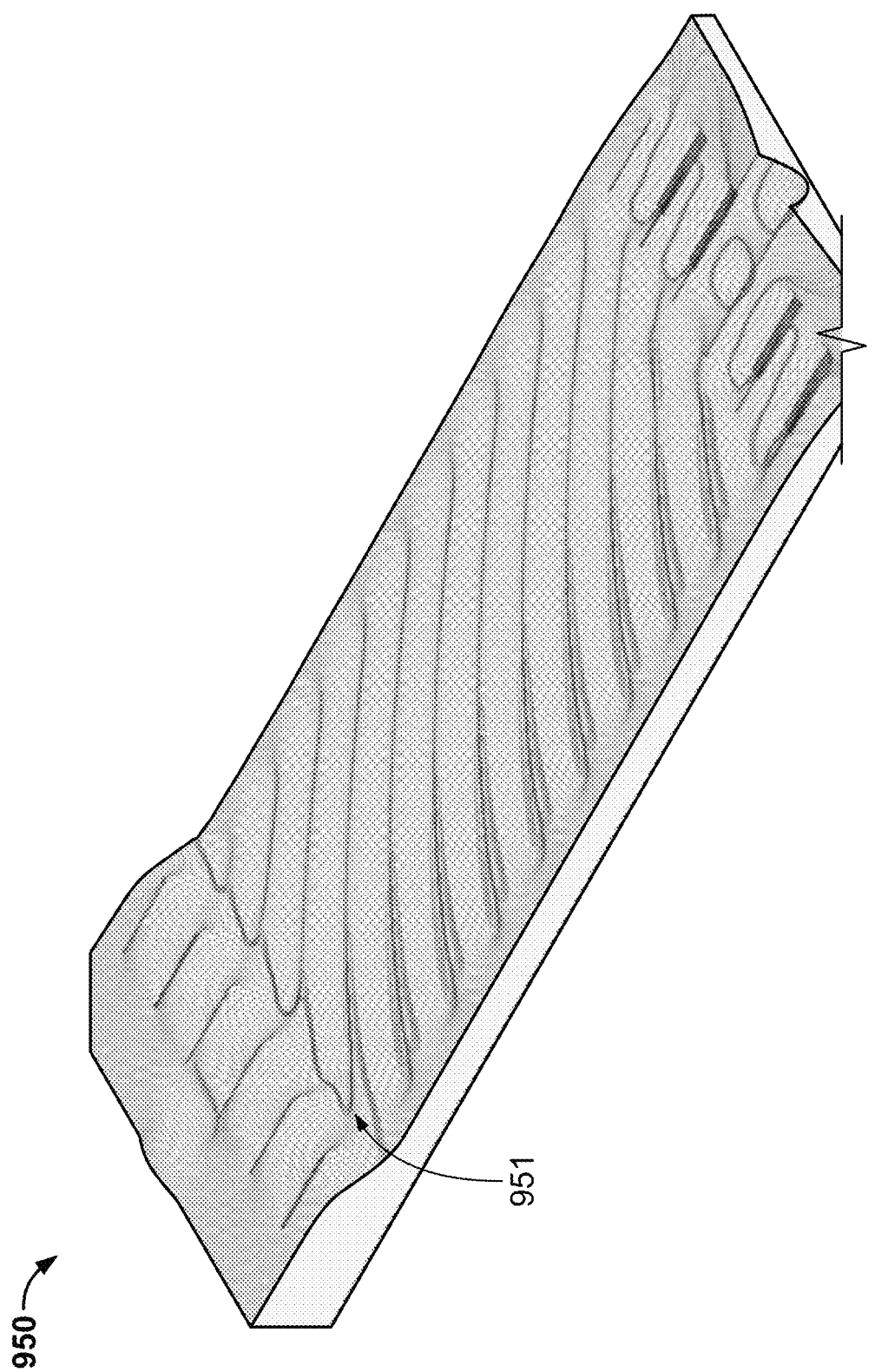
FIG. 35 is a plot showing potential energy surfaces of the 2D SLIM filter of FIG. 33.

FIG. 35 is a plot 950 showing a potential energy surface within the 2D SLIM filter 900 of FIG. 33. The red lines 951 shown in the plot 950 are equipotential contours at 1.5 to 1.9 volts. As can be seen from the plot 950 of FIG. 35, as the phase shift becomes larger between segmented electrode array rows, the constructive addition of the traveling wave becomes less effective and the peak amplitude of the traveling wave decreases.

Figure 36:
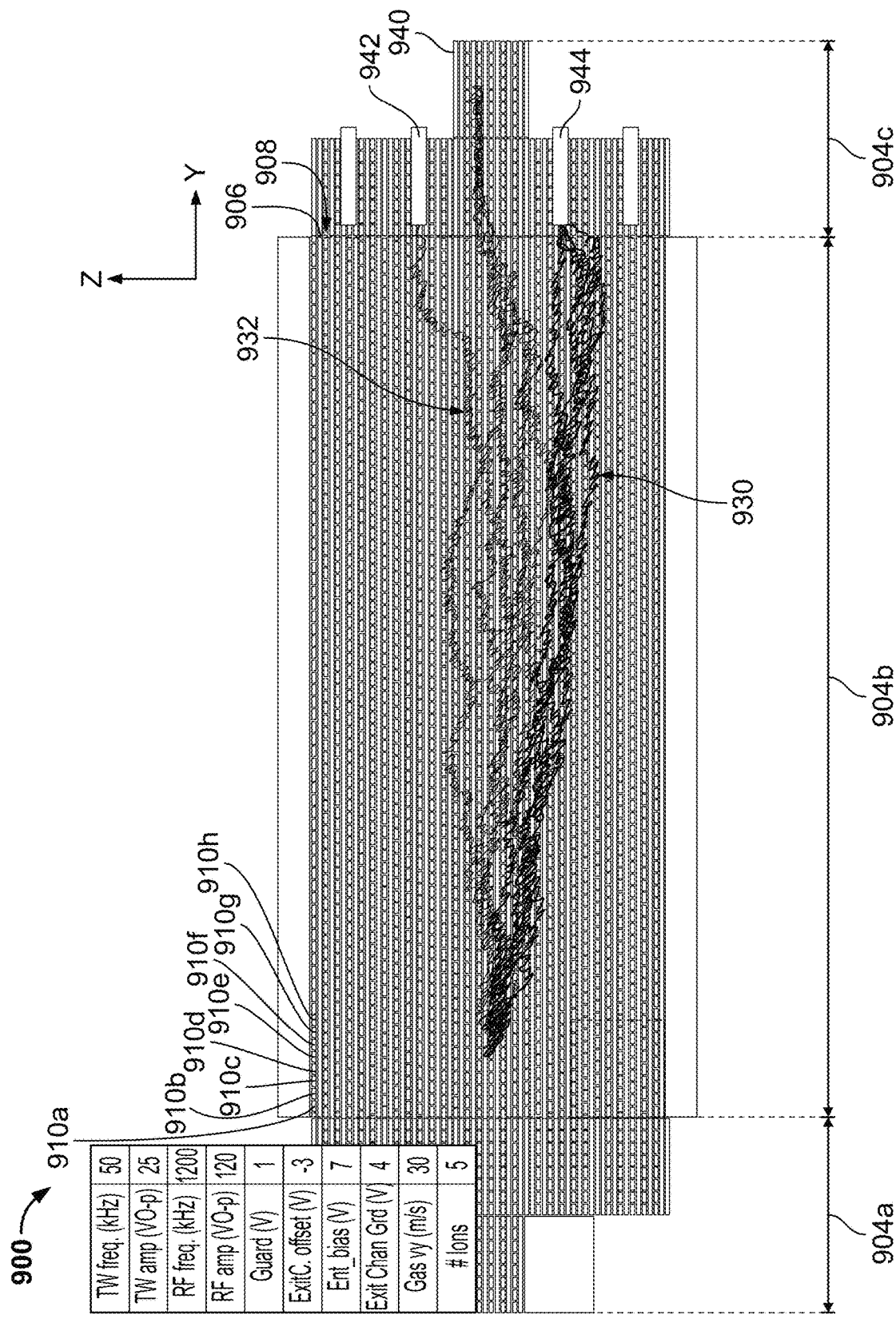
FIG. 36 is a plot of computer simulation results showing the path of travel through the 2D SLIM filter of FIG. 33 for first 322 m/z ions having a 153.73 Å$^2$ CCS and second 322.1 m/z ions having a 169.10 Å$^2$ CCS.

FIG. 36 is a plot of computer simulation results showing the path of travel through the 2D SLIM filter 900 of FIG. 33 for first 322 m/z ions 930 having a 153.73 Å$^2$ CCS 930 and second 322.1 m/z ions 932 having a 169.10 Å$^2$ CCS. The computer simulation of FIG. 36 was performed under the following conditions:

traveling wave frequency=50 kHz;
traveling wave amplitude=25 (VO-p);
RF frequency=1200 kHz;
RF amplitude=120 (VO-p);
guard voltage=1 V;
exit offset voltage=−3 V;
entrance bias voltage=7 V;
exit channel grid voltage=4 V;
gas flow velocity along the z-axis=30 m/s; and
# of ions=5.

As can be seen in FIG. 36, the electrical field force, e.g., generated by the electrodes 906, 908, 910a-h, and the gas force causes the first ions 930 having the first CCS to be pushed along the z-axis in the negative direction as they are transferred along the y-axis toward the exit section 904c and the second ions 932 having a second CCS to be generally maintained in alignment with the exit section 904c as they are transferred along the y-axis toward the exit section 904c. Accordingly, the second ions 932 are separated from the group of ions that were provided to the 2D SLIM filter 900, and extracted therefrom through the exit sections where they can be transferred to a detector, such as a mass spectrometer, for detection. It should be understood that the traveling wave signals applied to the electrodes 908 and the pressure and/or velocity of the gas provided the 2D SLIM filter 900 can be adjusted to differently alter the paths of the ions 930 and 932, e.g., to extract the ions. For example, the velocity of the gas be between 20 m/s, 50 m/s, 75 m/s, or any other velocity as desired. Moreover, additional exit sections 942 and 944 can be provided to extract more than one type of ion.

It is additionally noted that the guard potential applied to the exit section 704c, 804c, 904c can be modified based on implementation. For example, the guard potential can be between 2 V and 4 V, though higher or lower potentials can be implemented. Additionally, it should be understood that the frequency and amplitude of the traveling wave voltage signal can be adjusted based on implementation to obtain optimal ion transmission. For example, the following traveling wave conditions have been found to have high transmission efficiency: (1) frequency=28 kHz and amplitude=17 (VO-p); (2) frequency=38 kHz and amplitude=20 (VO-p); (3) frequency=43 kHz and amplitude=21 (VO-p); (4) frequency=46 kHz and amplitude=22 (VO-p); and (5) frequency=50 kHz and amplitude=23 (VO-p). However, it should be understood that other TW conditions can be implemented.

2D SLIM Filter Utilizing a DC Electric Field and Gas Flow

Figure 37:
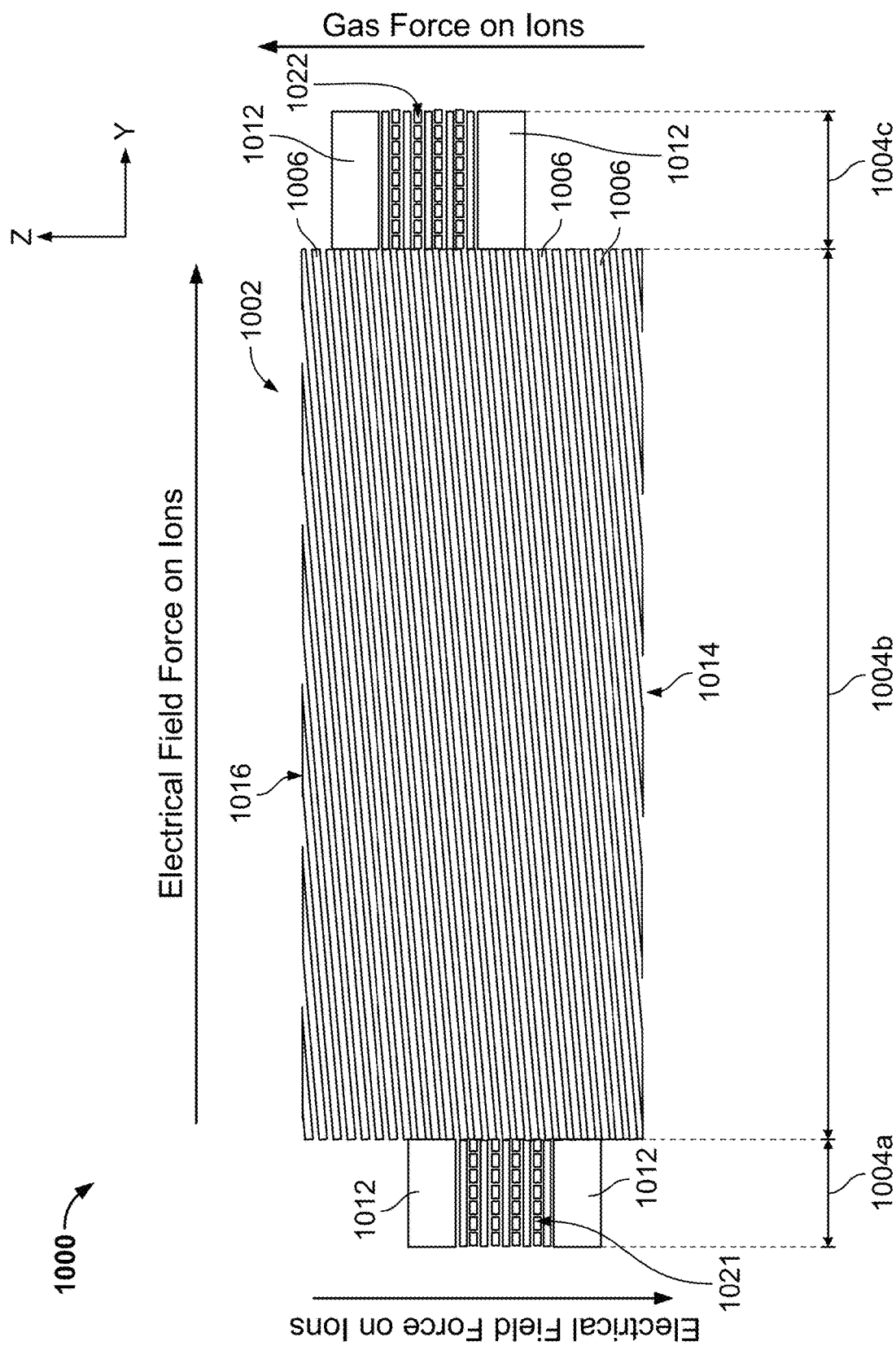
FIG. 37 is a schematic diagram illustrating another exemplary 2D SLIM filter of the present disclosure.

FIG. 37 is a schematic diagram illustrating another exemplary 2D SLIM separator/filter 1000 of the present disclosure, which utilizes a DC electric field to both oppose the gas flow forces on the ions and to move the ions across the device from entrance to exit instead of a traveling wave. Accordingly, compared to the 2D SLIM filter 700 of FIG. 29, the 2D SLIM filter 1000 has a simpler construction, eliminates the traveling wave interaction with the trapping RF field, is simpler to operate and tune, and requires fewer power supplies to operate.

In particular, the 2D SLIM filter 1000 includes an electrode array 1002 that is generally disposed on first and second surfaces that are positioned parallel to each other, e.g., such as the first and second surfaces 202a, 202b of the 2D SLIM filter 200 shown and discussed in connection with FIGS. 4-6. The electrode array 1002 includes an inlet section 1004a, an ion separation section 1004b, and an outlet section 1004c. A typical SLIM device, such as the devices disclosed and described in U.S. Pat. No. 8,835,839 entitled "Method and Apparatus for ion Mobility Separations Utilizing Alternating Current Waveforms" and U.S. Pat. No. 10,317,364 entitled "Ion Manipulation Device," both of which are incorporated herein by reference in their entirety, can be utilized for the inlet and outlet sections 1004a, 1004c to provide ions to the ion separation section 1004b.

The electrode array 1002 is generally positioned in the ion separation section 1004b and includes a plurality of continuous electrodes 1006. The plurality of continuous electrodes 1006 extend in a direction oriented at an angle with respect to the direction in which the y-axis shown in FIG. 37 extends, e.g., an "extending direction," and each of the plurality of electrodes 1006 is distributed and spaced apart from an adjacent electrode 1006 along a direction generally perpendicular to the direction in which the plurality of electrodes 1006 extend, e.g., a "distribution direction." The angle between the plurality of continuous electrodes 1006 and the y-axis direction can be any angle greater than 0° and less than 90°, for example, 5°. It is noted that only some of the continuous electrodes 1006 are labelled in FIG. 37 for the sake of clarity. Additionally, the inlet section 1004a can be offset from the outlet section 1004c along the z-axis so that the angled continuous electrodes 1006 adjacent the inlet section 1004a extend from the inlet section 1004a to the outlet section 1004c.

The plurality of continuous electrodes 1006 can be formed and function substantially in accordance with the plurality of continuous electrodes 204a-k shown and described in connection with FIGS. 4-6 and the plurality of continuous electrodes 408a-k shown and described in connection with FIG. 14. Thus, the plurality of continuous electrodes 1006 can receive RF voltage signals, or can be connected to ground potential, and can generate a pseudopotential that can prevent or inhibit ions from approaching the surface on which they are mounted. The RF voltage applied to adjacent continuous electrodes 1006 can be 180° out of phase, respectively. Additionally, the continuous electrodes 1006 also have a constant DC voltage applied thereto in order to generate a DC voltage gradient, as described in greater detail below.

The electrode array 1002 can also include guard electrodes 1012 positioned on lateral sides of the inlet section 1004a and the outlet section 1004c. The guard electrodes 1012 can be substantially similar to the guard electrodes 110 shown and described in connection with FIG. 3. Accordingly, the guard electrodes 1012 can receive a voltage signal (e.g., DC voltage signal from a DC control circuit) and generate a guard potential that can confine ions within the inlet section 1004a and the outlet section 1004c between the guard electrodes 1012 along the lateral direction.

Additionally, the 2D SLIM filter 1000 can include a gas diffuser or other apparatus that receives gas from a gas source and is positioned adjacent and provides gas to a first side 1014 of the 2D SLIM filter 1000, e.g., in similar fashion to the 2D SLIM filter 400 shown and described in connection with FIGS. 13-15. Additionally, a vacuum pump can be provided in fluidic communication with the 2D SLIM filter 1000 opposite the gas diffuser or gas source, e.g., adjacent the second side 1016. The vacuum pump can be implemented to apply a pressure differential in the lateral direction, such that the gas will flow across the 2D SLIM filter 1000. Accordingly, the gas will flow in a lateral direction across the electrode array 1002, e.g., along the z-axis of FIG. 37, from the first side 1014 to an opposing second side 1016.

Like the 2D SLIM filter 400 of FIG. 14, the 2D SLIM filter 1000 of FIG. 37 has a DC gradient applied along the z-axis. In particular, the controller 108 can apply a DC gradient to the plurality of continuous electrodes 1006 to cause a potential difference in each of the continuous electrodes 1006, thus forming a DC field having a potential energy field strength that decreases along the distribution direction of the plurality of electrodes 1006. However, since the continuous electrodes 1006 are at an angle, the potential energy field strength along the distribution direction will have both a y-axis component and a z-axis component into which it can be decomposed. In this regard, the y-axis component of the potential energy field strength decreases along the y-axis in the positive direction and the z-axis component of the potential energy field strength decreases along the z-axis in the negative direction, e.g., from the second side 1016 to the first side 1014, as shown in FIG. 37. This can be in similar fashion to the embodiments shown in, and discussed in connection with, FIGS. 4-11 and 14, for example. Additionally, it should be understood that the DC amplitude can be configured to decrease or increase along the distribution direction of the plurality of electrodes 1006 depending on whether the ions to be separated are positively or negatively charged.

As the ions move along the y-axis, they will be subject to influences of the gas and the electric fields (e.g., the DC gradient, the RF waveform, etc.), which, as noted above, will cause the ions to move at different speeds based on their mobility. Specifically, the DC field influences and urges the ions to move in the direction of decreasing potential energy, e.g., along the z-axis in the negative direction, while the gas flow causes the ions to move along the z-axis in the positive direction. For example, where the ions are positively charged the DC amplitude would be configured to increase along the z-axis, whereas for negatively charged ions the DC amplitude would be configured to decrease along the z-axis. In this arrangement, ions will drift in the direction of the decreasing potential energy. As such, the influence of the gas flow and the influence of the DC field oppose each other. However, gas collisions will be more frequent for ions having a larger CCS than ions having a smaller CCS. Thus, the gas flow will force the larger CCS ions further along the z-direction, e.g., toward the second side 1016, than ions of lesser CCS. If a nonlinear voltage gradient is applied, then ions will drift in the positive or negative z-direction until the force on the ions due to gas collisions effectively matches the force due to the electric field strength. This allows for ions having a specific ion mobility to be filtered from a feedstock. For example, the magnitude of the gas flow and the DC field can be specifically selected so that ions having the desired mobility or CCS flow along the y-axis in a path, direction, or trajectory toward the outlet section 1004c, while undesired ions are drawn off course and do not flow into the outlet section 1004c. In this regard, the electrode array 1002 can include a barrier that is configured to neutralize the undesired ions. Alternatively, the electrode array 1002 can include multiple outlet sections 1004c that are each configured to receive ions having a different mobility or CCS. Thus, ions having the targeted mobility are filtered from the feedstock as they pass through the outlet section 1004c, after which point they can be directed to a detector (e.g., one of the first and second detectors 106a, 106b) for detection. The outlet section 1004c can receive the desired ions and extract the ions or transfer the ions to another device, such as another 2D SLIM filter, a SLIM device, a quadrupole mass analyzer, an orbitrap mass spectrometer, a time of flight mass spectrometer, collision cell, or other detector 106a, 106b, etc.

Figure 38:
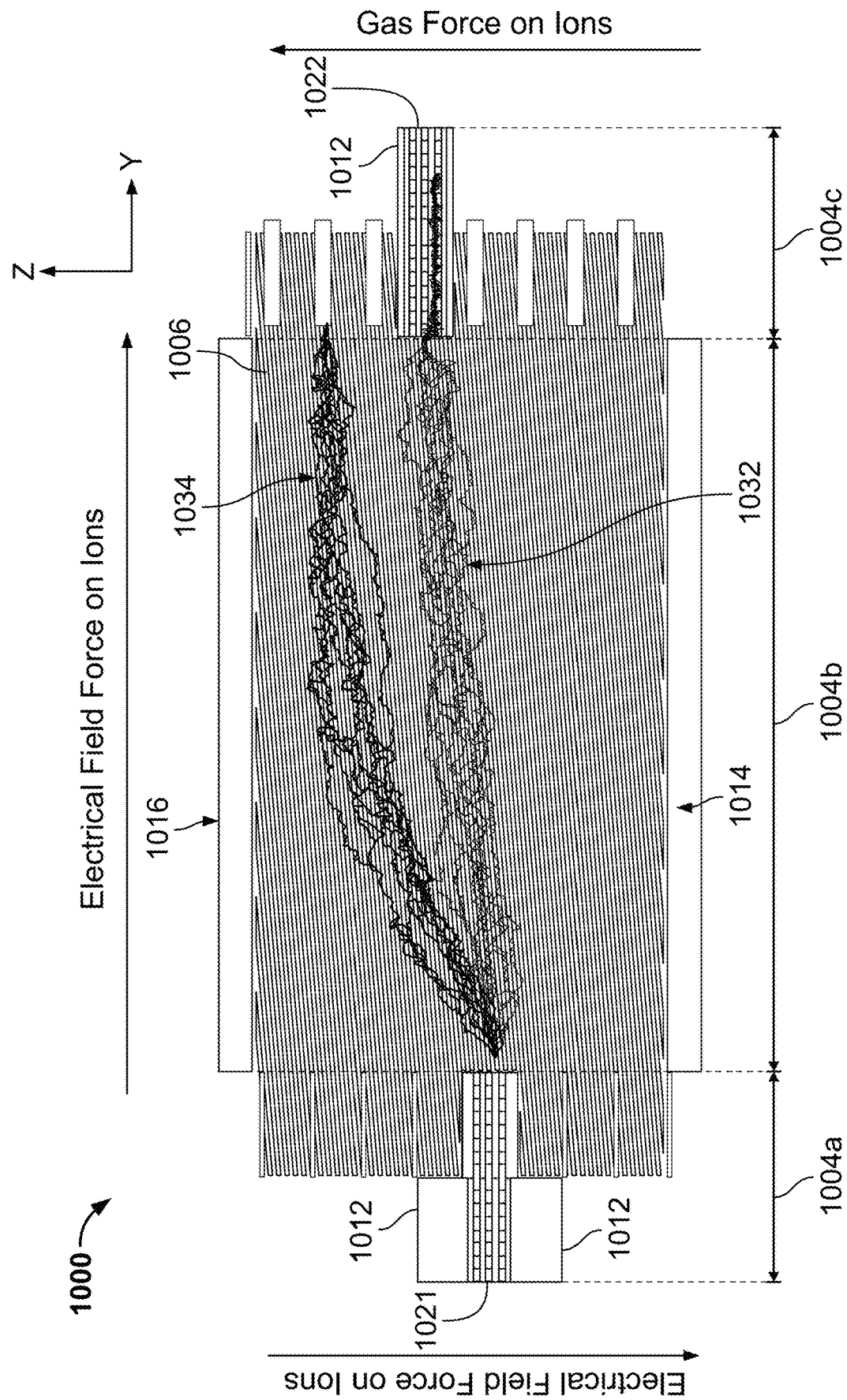
FIG. 38 is a plot of computer simulation results showing the path of travel through the 2D SLIM filter of FIG. 37 for first 321.9 m/z ions and second 322 m/z ions having a 5% difference in CCS.

FIG. 38 is a plot of computer simulation results showing the path of travel through the 2D SLIM filter 1000 of FIG. 37 for first 321.9 m/z ions 1032 and second 322 m/z ions 1034 having a 5% difference in CCS. The computer simulation of FIG. 38 was performed under the following conditions:

exit bias voltage=0 V;
    traveling wave frequency=5 kHz;
    traveling wave amplitude=5 (VO-p);
    traveling wave type=sine wave;
    RF frequency=1200 kHz;
    RF amplitude=120 (VO-p);
    guard voltage=2 V;
    exit offset voltage=−10 V;
    entrance bias voltage=2 V;
    separation RF amplitude=60 V;
    z-axis component of the electric field=−2.73 V/mm;
    gas flow velocity along the z-axis=140 m/s;
    # of ions=100;
    width of RF electrodes 1006=0.50 mm; and
    gap between RF electrodes 1006=0.25 mm.

As can be seen in FIG. 38, the electrical field force, e.g., generated by the electrodes 1006 due to the DC voltage signal applied thereto, and the gas force causes the second ions 1034 to be pushed along the z-axis in the positive direction as they are transferred along the y-axis toward the exit section 1004c, and the first ions 1032 to be maintained on course to the exit section 1004c as they are transferred generally along the extending direction of the electrodes 1006 toward the exit section 1004c. Accordingly, the first ions 1032 are separated from the group of ions that were provided to the 2D SLIM filter 1000, and extracted therefrom through the exit section 1004c where they can be transferred to a detector, such as a mass spectrometer, for detection. It should be understood that the DC voltage signals applied to the electrodes 1006 and the pressure and/or velocity of the gas provided the 2D SLIM filter 1000 can be adjusted to differently alter the paths of the ions 1032, 1034, e.g., to extract the second ions 1034.

Further, each of the foregoing embodiments can be operated in a transmission mode in which the applied voltage signals are changed to avoid mobility separation and transmit all the ions regardless of mobility. Additionally, the gas flow can be turned off in this transmission or other modes of operation based on varying needs.

Moreover, additional exit sections can be provided to extract more than one type of ion, for example, the 2D SLIM filter 1000 can include more than one outlet aligned with different ions, e.g., a first outlet can be aligned with a first path corresponding to a first ion and a second outlet can be aligned with a second path corresponding to a second ion. Additionally, the length, width, thickness, spacing, and/or angle of the electrodes 1006 can be adjusted to optimize the 2D SLIM filter 1000. For example, the electrodes 1006 can have a width of 0.50 mm or 0.75 mm, and can be spaced by 0.25 mm or 0.375 mm. Moreover, it is noted that the voltage signal applied to the electrodes 1006 can be adjusted to modify the electric field and adjust the field gradient, which can result in different ion separations. For example, a smaller field gradient can result in a greater separation of ion streams such that there is less overlap of ion mobility peaks for ions having different collision cross sections compared to a larger field gradient.

Further, an inlet SLIM device 1021 of the inlet section 1004a and an outlet SLIM device 1022 of the outlet section 1004c can be roughly at the same potential. For example, the offset between inlet SLIM device 1021 and the outlet SLIM device 1022 can be about 5°. The field strength created across the RF electrodes is nonlinear and ions moving in the z-axis direction will be moved into the appropriate field strength that balances the gas flow, at which point the ions will reach an equilibrium point. After the ion reaches equilibrium in the z-axis direction, the ion will travel along the same electrode and exit through the outlet SLIM device 1022. As such, the inlet SLIM device 1021 and the outlet SLIM device 1022 can be roughly at the same potential.

In addition, the 2D SLIM filter 1000 may include a plurality of outlet SLIM devices and each of the plurality of outlet SLIM devices can have a detector associated therewith to detect the ions simultaneously. Ions with different mobility will hit different positions of the outlet section 1004c and are detected by the corresponding detector.

Moreover, the strength of the DC gradient field can be changed, e.g., ramped or sequentially increased, over time in order to cause ions having different mobilities to exit the 2D SLIM filter 1000 via the outlet SLIM device 1022 and be detected by the detector. Accordingly, the 2D SLIM filter 1000 can be utilized to scan through different mobilities and generate a mobility spectrum to illustrate the transmission rate of ions with different mobilities at the corresponding DC gradient field strength.

Alternatively, in another embodiment, the plurality of continuous electrodes 1006 can extend along the y-axis of FIG. 37, e.g., not at an angle, and a resistor chain can be electrically connected to the plurality of electrodes 1006. DC voltage signals can be applied to the plurality of electrodes 1006 through the resistor chain, and the plurality of electrodes 1006 can generate an electric field based on the applied DC voltage signals such that the electric field has an effective potential that decreases along a length of the electrodes 1006. For example, each of the plurality of continuous electrodes 1006 can be a resistive pad on a PCB and connected between an entrance resistor chain and an exit resistor chain, such that a voltage gradient is generated across the length of each electrode 1006. The entrance resistor chain can have a plurality of entrance resistors connected between first and second power supplies providing first and second voltages, and the exist resistor chain can have a plurality of exit resistors connected between third and fourth power supplies providing third and fourth voltages. This configuration results in a voltage gradient along the length of each electrode 1006. Additionally, the entrance resistors and the exit resistors can create the voltage drop on each electrode 1006 row moving from top to bottom. Furthermore, it should be understood that each of the plurality of continuous electrodes 1006 could also be replaced with a series of segmented electrodes connected by a series of resistors to create a voltage gradient across the length of the row.

As previously explained, in this configuration, the generated electric potential energy decreases along the y-axis in the positive direction, such that ions will drift in the direction of the decreasing potential energy, e.g., along the y-axis toward the outlet section 1004c. Accordingly, this configuration functions in similar fashion to the 2D SLIM filter 1000 having angled electrodes 1006 as discussed above, but instead motivates ions along the y-axis with the electric potential gradient generated by the resistive electrodes or chain.

Other embodiments are within the scope and spirit of the disclosed subject matter. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor can receive instructions and data from a read-only memory or a random access memory or both. The essential elements of a computer are a processor for executing instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The invention claimed is:

1. A system for separating ions, comprising:
a first surface extending along a first direction and a second direction perpendicular to the first direction;
a second surface extending along the first direction and the second direction;
an ion channel defined between the first surface and the second surface, the ion channel configured to receive a stream of ions;
a first array of electrodes associated with the first surface and a second array of electrodes associated with the second surface, each of the first and second arrays of electrodes including a first plurality of electrodes extending in a third direction; and
means for causing gas to flow across the ion channel in a fourth direction, the fourth direction being substantially opposite the first direction; and
a controller configured to apply a DC voltage gradient to the first array of electrodes and the second array of electrodes, the first and second arrays of electrodes configured to generate an electric field based on the DC voltage gradient,
wherein the electric field and the flow of gas are configured to direct a first portion of the stream of ions having ions with mobilities in a first mobility range along a first path and a second portion of the stream of ions having ions with mobilities in a second mobility range along a second path.

2. The system of claim 1, wherein the third direction is oriented at an angle with respect to the first direction.

3. The system of claim 2, wherein an effective potential of the electric field decreases along the first direction and decreases along the second direction.

4. The system of claim 1, wherein only ions of the first mobility range being directed along the first path are detected or transmitted to an ion detector.

5. The system of claim 1, wherein the first plurality of electrodes includes a first electrode and a second electrode spaced apart from the first electrode along a fifth direction, the fifth direction being perpendicular to the third direction.

6. The system of claim 5, wherein the DC voltage gradient is applied to the first electrode and the second electrode,
wherein the first electrode and the second electrode are configured to generate, based on the DC voltage gradient, the electric field, and
wherein an effective potential of the electric field decreases along the first direction.

7. The system of claim 1, wherein an effective potential of the electric field decreases along the first direction.

8. The system of claim 1, wherein the electric field causes the first portion of the stream of ions to assume a first equilibrium position along the fourth direction and the second portion of the stream of ions to assume a second equilibrium position along the fourth direction.

9. The system of claim 8, wherein at least a portion of the first path and at least a portion of the second path are substantially parallel.

10. The system of claim 1, wherein the DC voltage gradient is non-linear.

11. The system of claim 1, wherein the third direction is the same as the second direction,
wherein a second DC voltage gradient is applied to the first plurality of electrodes, the first plurality of electrodes being configured to generate a second electric field based on the second DC voltage gradient, and
wherein an effective potential of the second electric field decreases along the second direction.

12. The system of claim 11, comprising at least one resistor chain electrically connected to the first plurality of electrodes,
wherein the second DC voltage gradient applied to the first plurality of electrodes is generated by the at least one resistor chain.

13. The system of claim 1, comprising an inlet and an outlet, the inlet being offset from the outlet along the first direction.

14. The system of claim 1, wherein a DC voltage signal is applied to at least one of the first plurality of electrodes, and
wherein the at least one of the first plurality of electrodes is configured to generate a blocking potential based on the DC voltage signal, the blocking potential preventing ions from passing.

15. The system of claim 1, comprising an inlet and at least two outlets, a first outlet of the at least two outlets being aligned with the first path and a second outlet of the at least two outlets being aligned with the second path.

16. A method of separating ions, comprising:
introducing a stream of ions into an ion channel of an ion separation device, the ion separation device including:
a first surface extending along a first direction and a second direction perpendicular to the first direction,
a second surface extending along the first direction and the second direction, the ion channel defined between the first surface and the second surface, and
a first array of electrodes associated with the first surface and a second array of electrodes associated with the second surface, each of the first and second arrays of electrodes including a first plurality of electrodes extending in a third direction;
discharging gas into the ion channel;
causing the gas to flow across the ion channel in a fourth direction opposite the first direction;
applying a DC voltage gradient to the first array of electrodes and the second array of electrodes;
generating, by the first and second arrays of electrodes, an electric field based on the DC voltage gradient;
directing a first portion of the stream of ions having ions with mobilities in a first mobility range along a first path with the electric field and the flow of gas; and
directing a second portion of the stream of ions having ions with mobilities in a second mobility range along a second path with the electric field and the flow of gas.

17. The method of claim 16, wherein the third direction is oriented at an angle with respect to the first direction.

18. The method of claim 17, wherein an effective potential of the electric field decreases along the first direction and decreases along the second direction.

19. The method of claim 16, comprising:
detecting or transmitting to an ion detector only ions of the first mobility range directed along the first path.

20. The method of claim 16, wherein the first plurality of electrodes includes a first electrode and a second electrode spaced apart from the first electrode along a fifth direction, the fifth direction being perpendicular to the third direction.

21. The method of claim 20, comprising:
applying the DC voltage gradient to the first electrode and the second electrode; and
generating, by the first electrode and the second electrode, the electric field based on the DC voltage gradient, wherein an effective potential of the electric field decreases along the first direction.

22. The method of claim 16, wherein an effective potential of the electric field decreases along the first direction.

23. The method of claim 16, comprising:
causing, by the electric field, the first portion of the stream of ions to assume a first equilibrium position along the fourth direction and the second portion of the stream of ions to assume a second equilibrium position along the fourth direction.

24. The method of claim 23, wherein at least a portion of the first path and at least a portion of the second path are substantially parallel.

25. The method of claim 16, wherein the DC voltage gradient is non-linear.

26. The method of claim 16, wherein the third direction is the same as the second direction,
wherein a second DC voltage gradient is applied to the first plurality of electrodes, the first plurality of electrodes being configured to generate a second electric field based on the second DC voltage gradient, and
wherein an effective potential of the second electric field decreases along the second direction.

27. The method of claim 26, wherein the ion separation device includes at least one resistor chain electrically connected to the first plurality of electrodes, and
the second DC voltage gradient is applied to the first plurality of electrodes through the resistor chain.

28. The method of claim 16, wherein the ion separation device includes an inlet and an outlet, the inlet being offset from the outlet along the first direction.

29. The method of claim 16, comprising:
applying a DC voltage signal to at least one of the first plurality of electrodes, and
generating, by the at least one of the first plurality of electrodes, a blocking potential based on the DC voltage signal, the blocking potential preventing ions from passing.

30. The method of claim 16, wherein the ion separation device includes an inlet and at least two outlets, a first outlet of the at least two outlets being aligned with the first path and a second outlet of the at least two outlets being aligned with the second path.

* * * * *